(12) United States Patent
Send et al.

(10) Patent No.: US 11,041,718 B2
(45) Date of Patent: Jun. 22, 2021

(54) DETECTOR FOR DETERMINING A POSITION OF AT LEAST ONE OBJECT

(71) Applicant: BASF SE, Ludwigshafen (DE)

(72) Inventors: Robert Send, Karlsruhe (DE); Ingmar Bruder, Neuleiningen (DE); Stephan Irle, Siegen (DE); Erwin Thiel, Siegen (DE)

(73) Assignee: BASF SE, Ludwigshafen am Rhein (DE)

( * ) Notice: Subject to any disclaimer, the term of this patent is extended or adjusted under 35 U.S.C. 154(b) by 1014 days.

(21) Appl. No.: 15/324,223

(22) PCT Filed: Jul. 7, 2015

(86) PCT No.: PCT/IB2015/055121
§ 371 (c)(1),
(2) Date: Jan. 5, 2017

(87) PCT Pub. No.: WO2016/005893
PCT Pub. Date: Jan. 14, 2016

(65) Prior Publication Data
US 2017/0205230 A1    Jul. 20, 2017

(30) Foreign Application Priority Data
Jul. 8, 2014    (EP) .................................... 14176112

(51) Int. Cl.
*G01C 3/08* (2006.01)
*G01C 3/32* (2006.01)
(Continued)

(52) U.S. Cl.
CPC .............. *G01C 3/32* (2013.01); *G01B 11/026* (2013.01); *G01S 7/481* (2013.01); *G01S 17/46* (2013.01);
(Continued)

(58) Field of Classification Search
CPC .......... G01S 17/89; G01S 17/46; G01S 17/86; G01S 17/931; G01S 7/481; G01C 3/32; G01B 11/026
(Continued)

(56) References Cited

U.S. PATENT DOCUMENTS 3,035,176 A    5/1962    Kis et al.
3,112,197 A    11/1963    Neugebauer et al.
(Continued)

FOREIGN PATENT DOCUMENTS

CA    1065054         10/1979
CA    2196563 A1    12/1996
(Continued)

OTHER PUBLICATIONS

Office Action dated Mar. 5, 2018, in corresponding Chinese Patent Application No. 201480056299.0.
(Continued)

*Primary Examiner* — Mark Hellner
(74) *Attorney, Agent, or Firm* — Armstrong Teasdale LLP

(57) ABSTRACT

A detector (110) for determining a position of at least one object (112), the detector (110) comprising: at least one transfer device (114) for imaging the object (112) into an image plane (116), the transfer device (114) having a focal plane (118), at least one longitudinal optical sensor (122), wherein the longitudinal optical sensor (122) has at least one sensor region (124), wherein the longitudinal optical sensor (122) is at least partially transparent, wherein the longitudinal optical sensor (122) is designed to generate at least one longitudinal sensor signal in a manner dependent on an illumination of sensor region (124) by at least one light beam propagating from the object to the detector (110), wherein the longitudinal sensor signal, given the same total power of the illumination, is dependent on a beam cross-section of the (Continued)

light beam in the sensor region (124); and at least one evaluation device (129), wherein the evaluation device (129) is designed to generate at least one item of information on a longitudinal position of the object (112) by evaluating the longitudinal sensor signal. Herein the at least one longitudinal optical sensor (122) comprises a focal longitudinal optical sensor (136), wherein the focal longitudinal optical sensor (136) at least substantially is arranged in the focal plane (118).

30 Claims, 3 Drawing Sheets

(51) Int. Cl.
  *G01S 17/89* (2020.01)
  *G01B 11/02* (2006.01)
  *G01S 17/46* (2006.01)
  *G01S 7/481* (2006.01)
  *G01S 17/86* (2020.01)
  *G01S 17/931* (2020.01)

(52) U.S. Cl.
  CPC .............. *G01S 17/86* (2020.01); *G01S 17/89* (2013.01); *G01S 17/931* (2020.01)

(58) Field of Classification Search
  USPC ............................................. 356/3.01–5.15
  See application file for complete search history.

(56) References Cited

U.S. PATENT DOCUMENTS

| | | |
|---|---|---|
| 3,384,752 A | 5/1968 | Odone |
| 3,562,785 A | 2/1971 | Craig |
| 3,564,268 A | 2/1971 | Bayne et al. |
| 3,873,823 A | 3/1975 | Northrup et al. |
| 3,937,950 A | 2/1976 | Hosoe et al. |
| 3,954,340 A | 5/1976 | Blomqvist et al. |
| 4,023,033 A | 5/1977 | Bricot et al. |
| 4,053,240 A | 10/1977 | Aizawa et al. |
| 4,079,247 A | 3/1978 | Briscot et al. |
| 4,256,513 A | 3/1981 | Yoshida |
| 4,286,035 A | 8/1981 | Nishizima et al. |
| 4,346,293 A | 8/1982 | Fetzer |
| 4,469,945 A | 9/1984 | Hoeberechts et al. |
| 4,524,276 A | 6/1985 | Ohtombe |
| 4,565,761 A | 1/1986 | Katagiri et al. |
| 4,584,704 A | 4/1986 | Ferren |
| 4,593,187 A | 6/1986 | Grotts et al. |
| 4,602,158 A | 7/1986 | Barrett |
| 4,603,258 A | 7/1986 | Sher et al. |
| 4,647,193 A | 3/1987 | Rosenfeld |
| 4,675,535 A | 6/1987 | Tsunekawa et al. |
| 4,694,172 A | 9/1987 | Powell et al. |
| 4,760,004 A | 7/1988 | Rochat et al. |
| 4,760,151 A | 7/1988 | Rochat et al. |
| 4,767,211 A | 8/1988 | Munakata et al. |
| 4,773,751 A | 9/1988 | Matsuda et al. |
| 4,927,721 A | 5/1990 | Gratzel et al. |
| 4,952,472 A | 8/1990 | Baranyi et al. |
| 5,082,363 A | 1/1992 | Nakanishi et al. |
| 5,216,476 A | 6/1993 | Lanckton |
| 5,227,985 A | 7/1993 | Dementhon et al. |
| 5,235,377 A | 8/1993 | Ide et al. |
| 5,291,066 A | 3/1994 | Neugebauer et al. |
| 5,343,291 A | 8/1994 | Ohwada et al. |
| 5,350,644 A | 9/1994 | Graetzel et al. |
| 5,355,241 A | 10/1994 | Kelley |
| 5,375,008 A | 12/1994 | Guerreri |
| 5,512,997 A | 4/1996 | Ogawa |
| 5,576,975 A | 11/1996 | Sasaki et al. |
| 5,589,928 A | 12/1996 | Babbitt et al. |
| 5,856,844 A | 1/1999 | Batterman et al. |
| 6,061,122 A | 5/2000 | Hoshino et al. |
| 6,163,371 A | 12/2000 | Kato et al. |
| 6,191,881 B1 | 2/2001 | Tajima |
| 6,229,913 B1 | 5/2001 | Nayar et al. |
| 6,266,142 B1 | 7/2001 | Junkins et al. |
| 6,359,211 B1 | 3/2002 | Spitler et al. |
| 6,417,836 B1 | 7/2002 | Kumar et al. |
| 6,448,572 B1 * | 9/2002 | Tennant ................ G01S 7/4863 250/559.38 |
| 6,512,233 B1 | 1/2003 | Sato et al. |
| 6,785,028 B1 | 8/2004 | Atsuumi et al. |
| 6,930,297 B1 | 8/2005 | Nakamura |
| 6,947,459 B2 | 9/2005 | Kurtz et al. |
| 6,995,445 B2 | 2/2006 | Forrest et al. |
| 7,022,966 B2 | 4/2006 | Gonzo et al. |
| 7,049,601 B2 | 5/2006 | Agano |
| 7,196,317 B1 | 3/2007 | Meissner et al. |
| 7,247,851 B2 | 7/2007 | Okada et al. |
| 7,301,608 B1 | 11/2007 | Mendenhall et al. |
| 7,417,716 B2 | 8/2008 | Nagasaka et al. |
| 7,626,569 B2 | 12/2009 | Lanier |
| 7,677,742 B2 | 3/2010 | Hillmer et al. |
| 7,768,498 B2 | 8/2010 | Wey |
| 7,773,070 B2 | 8/2010 | Trisnadi et al. |
| 7,939,932 B2 | 5/2011 | Martin |
| 8,013,901 B2 | 9/2011 | Fukuhara et al. |
| 8,019,166 B2 | 9/2011 | Cheng et al. |
| 8,107,056 B1 | 1/2012 | Riza |
| 8,144,173 B2 | 3/2012 | Baba |
| 8,228,299 B1 | 7/2012 | Maloney et al. |
| 8,231,809 B2 | 7/2012 | Pschirer et al. |
| 8,345,003 B1 | 1/2013 | Trisnadi et al. |
| 8,363,526 B2 | 1/2013 | Hotta et al. |
| 8,390,793 B2 | 3/2013 | Yamaguchi et al. |
| 8,411,289 B2 | 4/2013 | Takahashi |
| 8,477,580 B2 | 7/2013 | Yamamoto et al. |
| 8,563,855 B2 | 10/2013 | Pschirer et al. |
| 8,593,565 B2 | 11/2013 | Shuster |
| 8,902,354 B2 | 12/2014 | Shuster |
| 8,908,157 B2 | 12/2014 | Eisele et al. |
| 9,104,910 B2 | 8/2015 | Huang |
| 9,385,326 B2 | 7/2016 | Wonneberger et al. |
| 9,389,315 B2 | 7/2016 | Bruder et al. |
| 9,428,518 B2 | 8/2016 | Wonneberger et al. |
| 9,646,365 B1 | 5/2017 | Hinkel et al. |
| 9,665,182 B2 | 5/2017 | Send et al. |
| 9,741,954 B2 | 8/2017 | Bruder et al. |
| 9,787,899 B1 | 10/2017 | Hinkel et al. |
| 9,829,564 B2 | 11/2017 | Bruder et al. |
| 9,919,999 B2 | 3/2018 | Koenemann et al. |
| 9,958,535 B2 | 5/2018 | Send et al. |
| 9,989,623 B2 | 6/2018 | Send et al. |
| 10,012,532 B2 | 7/2018 | Send et al. |
| 10,094,927 B2 | 10/2018 | Send et al. |
| 10,120,078 B2 | 11/2018 | Bruder et al. |
| 10,290,817 B2 | 5/2019 | Battagliarin et al. |
| 10,412,283 B2 | 9/2019 | Send et al. |
| 2001/0025938 A1 | 10/2001 | Imai |
| 2002/0011576 A1 | 1/2002 | Cho et al. |
| 2003/0017360 A1 | 1/2003 | Tai et al. |
| 2003/0094607 A1 | 5/2003 | Guenther et al. |
| 2003/0128351 A1 | 7/2003 | Schmidt |
| 2003/0132391 A1 | 7/2003 | Agano |
| 2003/0227635 A1 | 12/2003 | Muller |
| 2004/0178325 A1 | 9/2004 | Forrest et al. |
| 2004/0190117 A1 | 9/2004 | Kubaink |
| 2004/0216625 A1 | 11/2004 | Birnstock et al. |
| 2005/0052120 A1 | 3/2005 | Gupta et al. |
| 2005/0061957 A1 | 3/2005 | Kase |
| 2005/0122308 A1 | 6/2005 | Bell et al. |
| 2005/0184301 A1 | 8/2005 | Nagasaka et al. |
| 2005/0217720 A1 | 10/2005 | Rey-Mermet et al. |
| 2005/0268957 A1 | 12/2005 | Enomoto et al. |
| 2005/0269616 A1 | 12/2005 | Andriessen |
| 2006/0044546 A1 | 3/2006 | Lewin et al. |
| 2006/0049397 A1 | 3/2006 | Pfeiffer et al. |
| 2006/0065833 A1 | 3/2006 | Craig et al. |
| 2006/0075585 A1 | 4/2006 | Krieger et al. |

(56) References Cited

U.S. PATENT DOCUMENTS

| | | |
|---|---|---|
| 2006/0082546 A1* | 4/2006 | Wey .................. G06F 3/0346 345/156 |
| 2007/0008515 A1 | 1/2007 | Otani et al. |
| 2007/0010924 A1 | 1/2007 | Otani et al. |
| 2007/0046625 A1 | 3/2007 | Yee |
| 2007/0080925 A1 | 4/2007 | Radivojevic et al. |
| 2007/0109558 A1 | 5/2007 | Harding |
| 2007/0122927 A1 | 5/2007 | Li et al. |
| 2007/0176165 A1 | 8/2007 | Forrest et al. |
| 2007/0183047 A1 | 8/2007 | Phillips et al. |
| 2007/0206181 A1 | 9/2007 | Arenberg et al. |
| 2008/0013005 A1 | 1/2008 | Deane |
| 2008/0080789 A1 | 4/2008 | Marks |
| 2008/0157965 A1 | 7/2008 | Shahar |
| 2008/0170750 A1 | 7/2008 | Gordon |
| 2008/0259310 A1 | 10/2008 | Wada |
| 2008/0269482 A1 | 10/2008 | Pschirer et al. |
| 2008/0284925 A1 | 11/2008 | Han |
| 2008/0297487 A1 | 12/2008 | Hotelling et al. |
| 2009/0009747 A1 | 1/2009 | Wolf |
| 2009/0046543 A1 | 2/2009 | De Hoog et al. |
| 2009/0097010 A1 | 4/2009 | Yamaguchi |
| 2009/0147239 A1* | 6/2009 | Zhu ..................... G01S 7/285 356/3.12 |
| 2009/0153841 A1 | 6/2009 | Ophey et al. |
| 2009/0185158 A1 | 7/2009 | Wolf |
| 2009/0188547 A1 | 7/2009 | Hayashi et al. |
| 2009/0225319 A1 | 9/2009 | Lee |
| 2009/0231582 A1 | 9/2009 | Aebischer |
| 2009/0322677 A1 | 12/2009 | Lee et al. |
| 2010/0073462 A1 | 3/2010 | Lee et al. |
| 2010/0091263 A1 | 4/2010 | Kumagai et al. |
| 2010/0141927 A1 | 6/2010 | Hashimoto et al. |
| 2010/0141964 A1 | 6/2010 | Horsch |
| 2010/0194942 A1 | 8/2010 | Wada |
| 2010/0231513 A1 | 9/2010 | Deliwala |
| 2010/0258179 A1 | 10/2010 | Wieting |
| 2010/0279458 A1 | 11/2010 | Yeh |
| 2010/0282309 A1 | 11/2010 | Pschirer et al. |
| 2010/0283868 A1 | 11/2010 | Clark et al. |
| 2010/0297405 A1 | 11/2010 | Flores et al. |
| 2011/0032365 A1 | 2/2011 | Yett |
| 2011/0055846 A1 | 3/2011 | Perez et al. |
| 2011/0096319 A1 | 4/2011 | Otani et al. |
| 2011/0099105 A1 | 4/2011 | Mennie et al. |
| 2011/0103215 A1 | 5/2011 | Hotta et al. |
| 2011/0122287 A1 | 5/2011 | Kunishige et al. |
| 2011/0123188 A1 | 5/2011 | Cardwell et al. |
| 2011/0127788 A1 | 6/2011 | Nakanishi |
| 2011/0181553 A1 | 7/2011 | Brown et al. |
| 2011/0194097 A1 | 8/2011 | Yamaguchi et al. |
| 2011/0284756 A1 | 11/2011 | Miko et al. |
| 2011/0286661 A1 | 11/2011 | Lee et al. |
| 2011/0297235 A1 | 12/2011 | Bergmann |
| 2011/0306413 A1 | 12/2011 | Bickerstaff et al. |
| 2011/0317146 A1 | 12/2011 | Gu et al. |
| 2012/0013885 A1 | 1/2012 | Yang et al. |
| 2012/0061587 A1 | 3/2012 | Wu |
| 2012/0062517 A1 | 3/2012 | Lai et al. |
| 2012/0063287 A1 | 3/2012 | Yamamoto et al. |
| 2012/0105690 A1 | 5/2012 | Waqas et al. |
| 2012/0146028 A1 | 6/2012 | Oda et al. |
| 2012/0160298 A1 | 6/2012 | Kanamoto et al. |
| 2012/0162410 A1 | 6/2012 | Vaillant |
| 2012/0206336 A1 | 8/2012 | Bruder |
| 2012/0242867 A1 | 9/2012 | Shuster |
| 2012/0249998 A1 | 10/2012 | Eisele et al. |
| 2012/0250137 A1 | 10/2012 | Maxik et al. |
| 2012/0262365 A1 | 10/2012 | Mallinson |
| 2012/0262696 A1 | 10/2012 | Eisele et al. |
| 2012/0289672 A1 | 11/2012 | Kastler et al. |
| 2012/0293651 A1 | 11/2012 | Kawamata et al. |
| 2012/0320160 A1 | 12/2012 | Drazic |
| 2012/0328906 A1 | 12/2012 | Kwon et al. |
| 2013/0033579 A1 | 2/2013 | Wajs |
| 2013/0076695 A1 | 3/2013 | Gomez et al. |
| 2013/0135604 A1 | 5/2013 | Gogolla et al. |
| 2013/0201492 A1 | 8/2013 | Takahashi |
| 2013/0222551 A1 | 8/2013 | Shamir et al. |
| 2013/0235390 A1 | 9/2013 | Holzapfel et al. |
| 2013/0266210 A1 | 10/2013 | Morgan-Mar et al. |
| 2013/0271818 A1 | 10/2013 | Maxik et al. |
| 2013/0320302 A1 | 12/2013 | Park et al. |
| 2014/0015242 A1 | 1/2014 | Forrest |
| 2014/0043610 A1 | 2/2014 | Engel et al. |
| 2014/0066656 A1 | 3/2014 | Bruder et al. |
| 2014/0078376 A1 | 3/2014 | Shuster |
| 2014/0124782 A1 | 5/2014 | Jung et al. |
| 2014/0132724 A1 | 5/2014 | Choi et al. |
| 2014/0209789 A1 | 7/2014 | Hu |
| 2014/0211295 A1 | 7/2014 | Maxik et al. |
| 2014/0217329 A1 | 8/2014 | Hayoz et al. |
| 2014/0233028 A1 | 8/2014 | Englund |
| 2014/0291480 A1 | 10/2014 | Bruder et al. |
| 2014/0347442 A1 | 11/2014 | Wang et al. |
| 2014/0368726 A1 | 12/2014 | Gladnick |
| 2015/0029326 A1 | 1/2015 | Backman et al. |
| 2015/0085166 A1 | 3/2015 | Shuster |
| 2015/0111337 A1 | 4/2015 | Welker et al. |
| 2015/0124241 A1 | 5/2015 | Eisele et al. |
| 2015/0124268 A1 | 5/2015 | Bruder et al. |
| 2015/0132887 A1 | 5/2015 | Welker et al. |
| 2015/0170400 A1 | 6/2015 | Seitz et al. |
| 2015/0286340 A1 | 10/2015 | Send et al. |
| 2015/0346911 A1 | 12/2015 | Christiansson |
| 2015/0372046 A1 | 12/2015 | Kim et al. |
| 2016/0099429 A1 | 4/2016 | Bruder et al. |
| 2016/0124074 A1 | 5/2016 | Wonneberger et al. |
| 2016/0127664 A1 | 5/2016 | Bruder et al. |
| 2016/0139243 A1 | 5/2016 | Send et al. |
| 2016/0140786 A1 | 5/2016 | Wang |
| 2016/0155575 A1 | 6/2016 | Yamato et al. |
| 2016/0177177 A1 | 6/2016 | Koenemann et al. |
| 2016/0211464 A1 | 7/2016 | Tanabe et al. |
| 2016/0218302 A1 | 7/2016 | Hermes et al. |
| 2016/0224110 A1 | 8/2016 | Massonneau et al. |
| 2016/0248021 A1 | 8/2016 | Sundarraj et al. |
| 2016/0255323 A1 | 9/2016 | Wajs |
| 2016/0266257 A1 | 9/2016 | Bruder et al. |
| 2016/0286199 A1 | 9/2016 | Wajs et al. |
| 2016/0320489 A1 | 11/2016 | Send et al. |
| 2016/0364015 A1 | 12/2016 | Send et al. |
| 2017/0039793 A1 | 2/2017 | Send et al. |
| 2017/0074652 A1 | 3/2017 | Send et al. |
| 2017/0082426 A1 | 3/2017 | Bruder et al. |
| 2017/0082486 A1 | 3/2017 | Send et al. |
| 2017/0123593 A1 | 5/2017 | Send et al. |
| 2017/0183295 A1 | 6/2017 | Koenemann et al. |
| 2017/0205230 A1 | 7/2017 | Send et al. |
| 2017/0219694 A1 | 8/2017 | Send et al. |
| 2017/0219709 A1 | 8/2017 | Send et al. |
| 2017/0237926 A1 | 8/2017 | Bruder et al. |
| 2017/0250334 A1 | 8/2017 | Hermes et al. |
| 2017/0263868 A1 | 9/2017 | Tanabe et al. |
| 2017/0309828 A1 | 10/2017 | Tanabe et al. |
| 2017/0363465 A1 | 12/2017 | Send et al. |
| 2017/0363741 A1 | 12/2017 | Send et al. |
| 2018/0003993 A1 | 1/2018 | Send et al. |
| 2018/0007343 A1 | 1/2018 | Send et al. |
| 2018/0017679 A1 | 1/2018 | Valouch et al. |
| 2018/0031672 A1 | 2/2018 | Bruder et al. |
| 2018/0044357 A1 | 2/2018 | Spielmann et al. |
| 2018/0067213 A1 | 3/2018 | Send et al. |
| 2018/0136319 A1 | 5/2018 | Send et al. |
| 2018/0182980 A1 | 6/2018 | Lennartz et al. |
| 2018/0210064 A1 | 7/2018 | Send et al. |
| 2018/0231376 A1 | 8/2018 | Send et al. |
| 2018/0238993 A1 | 8/2018 | Send et al. |
| 2018/0243045 A1 | 8/2018 | Franjic et al. |
| 2018/0249051 A1 | 8/2018 | Send et al. |
| 2018/0276843 A1 | 9/2018 | Send et al. |
| 2018/0329024 A1 | 11/2018 | Send et al. |
| 2018/0356501 A1 | 12/2018 | Send et al. |
| 2019/0129035 A1 | 5/2019 | Valouch et al. |

(56) References Cited

U.S. PATENT DOCUMENTS

| | | | |
|---|---|---|---|
| 2019/0129036 A1 | 5/2019 | Valouch et al. |
| 2019/0140129 A1 | 5/2019 | Valouch et al. |
| 2019/0157470 A1 | 5/2019 | Send et al. |
| 2019/0170849 A1 | 6/2019 | Hermes et al. |
| 2019/0172964 A1 | 6/2019 | Hermes et al. |
| 2019/0198206 A1 | 6/2019 | Ter Maat et al. |
| 2019/0277703 A1 | 9/2019 | Valouch et al. |
| 2020/0003899 A1 | 1/2020 | Lungenschmied et al. |

FOREIGN PATENT DOCUMENTS

| | | |
|---|---|---|
| CN | 1270706 | 10/2000 |
| CN | 1677053 A | 10/2005 |
| CN | 1723564 A | 1/2006 |
| CN | 1777859 | 5/2006 |
| CN | 1809801 A | 7/2006 |
| CN | 1894976 | 1/2007 |
| CN | 1896686 A | 1/2007 |
| CN | 101129074 | 2/2008 |
| CN | 101290348 A | 10/2008 |
| CN | 101449181 | 6/2009 |
| CN | 101650173 A | 2/2010 |
| CN | 101655350 | 2/2010 |
| CN | 101859439 A | 10/2010 |
| CN | 102096962 | 6/2011 |
| CN | 201897828 | 7/2011 |
| CN | 102435136 | 5/2012 |
| CN | 102506754 A | 6/2012 |
| CN | 102549380 | 7/2012 |
| CN | 102549381 A | 7/2012 |
| CN | 102737435 | 10/2012 |
| CN | 102833569 | 12/2012 |
| CN | 103106411 A | 5/2013 |
| CN | 103322910 A | 9/2013 |
| CN | 103403494 | 11/2013 |
| CN | 103492835 A | 1/2014 |
| CN | 103649677 | 3/2014 |
| CN | 103650478 | 3/2014 |
| DE | 2 417 854 | 10/1974 |
| DE | 2501124 A1 | 8/1975 |
| DE | 3225372 A1 | 2/1983 |
| DE | 42 11 875 | 10/1993 |
| DE | 196 04 856 | 8/1997 |
| DE | 10146752 | 4/2002 |
| DE | 10 2005 043 627 A1 | 3/2007 |
| DE | 102005053995 A1 | 5/2007 |
| DE | 10 2007 037 875 A1 | 2/2009 |
| DE | 10 2010 042 278 | 4/2012 |
| DE | 20 2012 009 070 | 1/2013 |
| DE | 10 2014 108 353 A1 | 12/2014 |
| EP | 0 112 169 A2 | 6/1984 |
| EP | 0 185 450 A2 | 6/1986 |
| EP | 0 309 631 | 4/1989 |
| EP | 0 754 930 A2 | 1/1997 |
| EP | 1176646 A1 | 1/2002 |
| EP | 1 191 819 | 3/2002 |
| EP | 1 330 117 | 7/2003 |
| EP | 1 373 272 | 1/2004 |
| EP | 1 667 246 A1 | 6/2006 |
| EP | 1 832 910 | 9/2007 |
| EP | 1 947 477 | 7/2008 |
| EP | 2205657 | 7/2010 |
| EP | 2220141 | 8/2010 |
| EP | 2507286 | 10/2012 |
| EP | 2 527 866 A1 | 11/2012 |
| EP | 2 725 617 A1 | 4/2014 |
| EP | 2 735 542 | 5/2014 |
| EP | 2 813 324 | 12/2014 |
| EP | 2 818 493 A1 | 12/2014 |
| EP | 15 153 215 | 1/2015 |
| EP | 2 831 180 | 2/2015 |
| EP | 15 157 363 | 3/2015 |
| EP | 15 164 653 | 4/2015 |
| EP | 2 884 303 A1 | 6/2015 |
| EP | 15 177 275 | 7/2015 |
| EP | 15 180 353 | 8/2015 |
| EP | 15 180 354 | 8/2015 |
| EP | 15 185 005 | 9/2015 |
| EP | 15 191 960 | 10/2015 |
| EP | 15 196 238 | 11/2015 |
| EP | 15 196 239 | 11/2015 |
| EP | 15 197 744 | 12/2015 |
| EP | 15 155 835 | 2/2016 |
| EP | 16 155 834 | 2/2016 |
| EP | 16 155 845 | 2/2016 |
| EP | 3 008 421 | 4/2016 |
| EP | 3 008 757 | 4/2016 |
| EP | 3 036 503 | 6/2016 |
| GB | 2 432 723 | 5/2007 |
| JP | S59-50579 | 3/1984 |
| JP | 59-79805 | 5/1984 |
| JP | 61-89501 | 5/1986 |
| JP | S61-135280 | 6/1986 |
| JP | 61-186804 | 8/1986 |
| JP | 61-245579 | 10/1986 |
| JP | 64-17485 | 1/1989 |
| JP | H02-170004 | 6/1990 |
| JP | 04-240817 | 8/1992 |
| JP | 5-48833 A | 2/1993 |
| JP | 05-240640 | 9/1993 |
| JP | 6-133321 | 5/1994 |
| JP | 7-146113 | 6/1995 |
| JP | 7-318630 | 12/1995 |
| JP | 8-159714 A | 6/1996 |
| JP | 8-292586 A | 11/1996 |
| JP | 10-26513 A | 1/1998 |
| JP | 10-221064 A | 8/1998 |
| JP | H11-230860 | 8/1999 |
| JP | 11-257917 | 9/1999 |
| JP | 11-325825 | 11/1999 |
| JP | 3110095 | 11/2000 |
| JP | 2001-516150 | 9/2001 |
| JP | 2002-176191 | 6/2002 |
| JP | 2003-307407 | 10/2003 |
| JP | 2004-508691 | 3/2004 |
| JP | 2005-509909 | 4/2005 |
| JP | 2005-189087 | 7/2005 |
| JP | 2005-241340 A | 9/2005 |
| JP | 2005-296268 | 10/2005 |
| JP | 2006-514366 | 4/2006 |
| JP | 2006-337254 | 12/2006 |
| JP | 2007-521559 | 8/2007 |
| JP | 2007-530978 | 11/2007 |
| JP | 2008-522418 | 6/2008 |
| JP | 2008-164538 | 7/2008 |
| JP | 2009-257890 | 11/2009 |
| JP | 2010-081002 | 4/2010 |
| JP | 2010-218770 | 9/2010 |
| JP | 2010-531520 | 9/2010 |
| JP | 2011-503673 | 1/2011 |
| JP | 2011-027707 | 2/2011 |
| JP | 2012-519584 | 8/2012 |
| JP | 2012-522248 | 9/2012 |
| JP | 2012-229964 | 11/2012 |
| JP | 2012-231154 | 11/2012 |
| JP | 2013-051674 | 3/2013 |
| TW | 2011-40111 A | 11/2011 |
| WO | 99-09603 | 2/1999 |
| WO | WO 01/29576 A1 | 4/2001 |
| WO | WO 02/076988 | 10/2002 |
| WO | 02/101838 A1 | 12/2002 |
| WO | 03/012371 A1 | 2/2003 |
| WO | WO 03/098617 | 11/2003 |
| WO | WO 2004/072909 | 8/2004 |
| WO | WO 2004/114112 A1 | 12/2004 |
| WO | WO 2005/106965 A1 | 11/2005 |
| WO | 2006/134370 A1 | 12/2006 |
| WO | WO 2007/006717 | 1/2007 |
| WO | 2007/054470 A1 | 5/2007 |
| WO | WO 2008/122531 | 10/2008 |
| WO | WO 2008/145172 | 12/2008 |
| WO | 2009/013282 A1 | 1/2009 |
| WO | WO 2009/021859 | 2/2009 |
| WO | WO 2009/053291 A1 | 4/2009 |

(56) References Cited

FOREIGN PATENT DOCUMENTS

| | | |
|---|---|---|
| WO | WO 2009/058115 A1 | 5/2009 |
| WO | WO 2009/105801 | 9/2009 |
| WO | 2010/088032 A2 | 8/2010 |
| WO | 2010/094636 A1 | 8/2010 |
| WO | WO 2010/118409 | 10/2010 |
| WO | WO 2010/118450 | 10/2010 |
| WO | WO 2011/067192 A2 | 6/2011 |
| WO | WO 2011/083722 | 7/2011 |
| WO | WO 2011/091967 A2 | 8/2011 |
| WO | WO 2012/001628 A1 | 1/2012 |
| WO | WO 2012/046181 A1 | 4/2012 |
| WO | WO 2012/049038 A1 | 4/2012 |
| WO | 2012/085803 A1 | 6/2012 |
| WO | WO 2012/091814 | 7/2012 |
| WO | 2012/110924 A1 | 8/2012 |
| WO | WO 2012/115593 | 8/2012 |
| WO | WO 2012/139354 | 10/2012 |
| WO | 2012/152812 A1 | 11/2012 |
| WO | 2012/168395 A1 | 12/2012 |
| WO | WO 2013/009676 | 1/2013 |
| WO | WO 2013/090960 | 6/2013 |
| WO | WO 2013/091016 A1 | 6/2013 |
| WO | 2013/118037 A1 | 8/2013 |
| WO | WO 2013/116883 | 8/2013 |
| WO | 2013/144177 A1 | 10/2013 |
| WO | WO 2013/156101 A1 | 10/2013 |
| WO | 2013/170982 A1 | 11/2013 |
| WO | 2014/086722 A1 | 6/2014 |
| WO | 2014/097181 A1 | 6/2014 |
| WO | 2014/097489 A1 | 6/2014 |
| WO | WO 2014/123522 | 8/2014 |
| WO | 2014/178923 A2 | 11/2014 |
| WO | 2014/198623 A1 | 12/2014 |
| WO | 2014/198625 A1 | 12/2014 |
| WO | 2014/198626 A1 | 12/2014 |
| WO | 2014/198629 A1 | 12/2014 |
| WO | 2015/024871 A1 | 2/2015 |
| WO | WO 2015/081362 | 6/2015 |
| WO | WO 2015/091607 | 6/2015 |
| WO | WO 2015/150989 | 10/2015 |
| WO | WO 2015/159192 | 10/2015 |
| WO | WO 2015/161989 | 10/2015 |
| WO | WO 2015/162528 | 10/2015 |
| WO | WO 2015/176981 | 11/2015 |
| WO | WO 2015/177784 A2 | 11/2015 |
| WO | 2015/193804 A2 | 12/2015 |
| WO | 2016/005893 A1 | 1/2016 |
| WO | WO 2016/012274 | 1/2016 |
| WO | 2016/051323 A1 | 4/2016 |
| WO | WO 2016/066494 | 5/2016 |
| WO | 2016/092449 A1 | 6/2016 |
| WO | 2016/092454 A1 | 6/2016 |
| WO | WO 2016/083914 | 6/2016 |
| WO | WO 2016/146725 | 9/2016 |
| WO | WO 2017/089553 | 6/2017 |
| WO | WO 2017/144401 | 8/2017 |
| WO | WO 2018/096083 | 5/2018 |
| WO | WO 2018/115073 | 6/2018 |
| WO | WO 2018/146138 | 8/2018 |
| WO | WO 2018/146146 | 8/2018 |
| WO | WO 2018/167215 | 9/2018 |
| WO | WO 2018/193045 | 10/2018 |
| WO | WO 2019/002199 | 1/2019 |
| WO | WO 2019/011803 | 1/2019 |
| WO | WO 2019/038354 | 2/2019 |
| WO | WO 2019/042956 | 3/2019 |
| WO | WO 2019/042959 | 3/2019 |

OTHER PUBLICATIONS

International Preliminary Report on Patentability and Written Opinion dated Feb. 22, 2018 in PCT/EP2016/069049).

Office Action dated Dec. 18, 2018, in Japanese Patent Application No. 2016-518930.

A.G. Pattantyus-Abraham, I.J. Kramer, A.R. Barkhouse, X. Wang, G. Konstantatos, R. Debnath, L. Levina, I. Raabe, M.K. Nazeeruddin, M. Grätzel, and E.H. Sargent, *Depleted-Heterojunction Colloidal Quantum Dot Solar Cells*, ACS Nano 4 (6), May 24, 2010.

R. Martins and E. Fortunato, *Thin Film Position Sensitive Detectors: from 1D to 3D Applications*, Chap. 8 in R. A. Street (Ed.), *Technology and Applications of Amorphous Silicon*, Springer, 2010.

International Search Report dated Oct. 20, 2017 in PCT/EP2017/068956 filed on Jul. 27, 2017.

Leskela, M. et al., "Preparation of lead sulfide thin films by the atomic layer epitaxy process," Pergamon Press plc, Vacuum/vol. 41/Nos. 4-6, pp. 1457-1459 (1990).

Dasgupta, N. et al., "Fabrication and Characterization of Lead Sulfide Thin Films by Atomic Layer Deposition," The Electrochemical Society, ECS Transactions, 16 (4) 29-36 (2008), Total 8 pages.

Dasgupta, N. et al., "Design of an atomic layer deposition reactor for hydrogen sulfide compatibility," Review of Scientific Instruments 81, 044102 (2010), Total 6 pages.

Xu, J. et al., "Atomic layer deposition of absorbing thin films on nanostructured electrodes for short-wavelength infrared photosensing," AIP Publishing, Applied Physics Letters 107, 153105 (2015), Total 5 pages.

Blount, G., et al., "Photoconductive properties of chemically deposited PbS with dielectric overcoatings," AIP Publishing, Journal of Applied Physics 46, 3489 (1975), Total 12 pages.

Groner, M. et al., "Low-Temperature Al2O3 Atomic Layer Deposition," American Chemical Society, Chem. Mater., vol. 16, No. 4, 2004, pp. 639-645.

Yoon, W. et al., "Electrical Measurement Under Atmospheric Conditions of PbSe Nanocrystal Thin Films Passivated by Remote Plasma Atomic Layer Deposition of Al2O3," IEEE Transactions on Nanotechnology, vol. 12, No. 2, Mar. 2013, pp. 146-151.

Hu, C., et al., "Air-stable short-wave infrared PbS colloidal quantum dot photoconductors passivated with Al2O3 atomic layer deposition," AIP Publishing, Applied Physics Letters 105, 171110 (2014), Total 5 pages.

Liu, Y., et al., "Robust, Functional Nanocrystal Solids by Infilling with Atomic Layer Deposition," ACS Publications, American Chemical Society, Nano Letters 2011, 11, pp. 5349-5355.

Liu, Y., et al., "PbSe Quantum Dot Field-Effect Transistors with Air-Stable Electron Mobilities above 7 $cm^2$ $V^{-1}$ $s^{-1}$," ACS Publications, American Chemical Society, Nano Letters 2013, 13, pp. 1578-1587.

George, S., "Atomic Layer Deposition: An Overview," American Chemical Society, Chem. Rev. 2010, 110, pp. 111-131.

Konstantatos, G., et al., "Engineering the Temporal Response of Photoconductive Photodetectors via Selective Introduction of Surface Trap States," American Chemical Society, Nano Letters 2008, vol. 8, No. 5, pp. 1446-1450.

Soci, C., et al., "ZnO Nanowire UV Photodetectors with High Internal Gain," American Chemical Society, Nano Letters 2007, vol. 7, No. 4, pp. 1003-1009.

List of integrated circuit packaging types (Wikipedia article, downloaded Jan. 15, 2019 from https://en.wikipedia.org/wiki/List_of_integrated_circuit_packaging_types).

List of integrated circuit packaging types, Dimension Reference (Wikipedia article, downloaded Jan. 15, 2019 from https://en.wikipedia.org/wiki/List_of_integrated_circuit_packaging_types#PIN-PITCH).

International Search Report and Written Opinion dated May 27, 2016, in PCT/EP2016/051817, filed Jan. 28, 2016.

International Preliminary Report on Patentability and Written Opinion dated Aug. 22, 2019 in PCT/EP2018/053057.

U.S. Appl. No. 16/461,654, filed May 16, 2019, Schildknecht, et al.

J. Robertson, "High Dielectric Constant Oxides", *European Physical Journal Applied Physics*, vol. 28, No. 3, pp. 265-291, 2004.

J.A. Kittl et al., "High-k Dielectrics for Future Generation Memory Devices", *Microelectronic Engineering*, Vo. 86 (2009) 1789-1795.

Serap Günes, et al., "Hybrid Solar Cells", *Inorganica Chimica Acta* 361, (2008), p. 581-588.

Jchn E. Anthony, et al., "n-Type Organic Semiconductors in Organic Electronics", *Adv. Mater.* 2010, 22, pp. 3876-3892.

(56) References Cited

OTHER PUBLICATIONS

Tian-yi Li, et al., "Small Molecule Near-Infrared Boron Dipyrromethene Donors for Organic Tandem Solar Cells", *J. Am. Chem. Soc.* 2017, 139, 13636-13639.
Christian Ulrich et al., "Organic Thin-Film Photovoltaic Cells Based on Oligothiophenes with Reduced Bandgap", *Adv. Funct. Mater.* 2007, 17, pp. 2991-2999.
Ronald Gresser, et al., "Synthesis and Characterization of Near-Infrared Absorbing Benzannulated Aza-BODIPY Dyes", *Chem. Eur. J.* 2011, 17, pp. 2939-2947.
Amaresh Mishra, et al., "Small Molecule Organic Semiconductors on the Move: Promises for Future Solar Energy Technology", *Angew. Chem. Int. Ed.* 2012, 51, 2020-2067.
Huifeng Yao, et al., "Molecular Design of Benzodithiophene-Based Organic Photovoltaic Materials", *Chem. Rev.* 2016, 116, 7397-7457.
Moritz Riede, et al., "Efficient Organic Tandem Solar Cells based on Small Molecules", *Adv. Funct. Mater.* 2011, 21, pp. 3019-3028.
Rico Schueppel, et al., "Controlled Current Matching in Small Molecule Organic Tandem Solar Cells Using Doped Spacer Layers", *J. Appl. Phys.* 107, 044503, 2010.
Jan Meiss et al., "Fluorinated Zinc Phthalocyanine as Donor for Efficient Vacuum-Deposited Organic Solar Cells," *Adv. Funct. Mater.* 2012, 22, pp. 405-414.
U.S. Appl. No. 16/500,113, filed Oct. 2, 2019, Altenbeck, et al.
U.S. Appl. No. 16/623,557, filed Dec. 17, 2019, Lungenschmied, et al.
International Search Report and Written Opinion dated Nov. 17, 2016, in PCT/EP2016/071628, filed Sep. 14, 2016.
"Telezentrisches Objektiv" Retrieved from the Internet: https://de.wikipedia.org/wiki/Telezentrisches_Objektiv. Date of retrieval: Sep. 11, 2015, 3 Pages (Cited on p. 53, line No. 40 in the Specification of related case U.S. Appl. No. 15/758,135).
Benjamin F. Grewe, et al., "Fast Two-Layer Two-Photon Imaging of Neuronal Cell Populations Using an Electrically Tunable Lens," *Biomedical Optics Express*, vol. 2, No. 7, Jul. 1, 2011 (pp. 2035-2046).
Petr Bartu et al, "Conformable Large-AreaPposition-Sensitive Photodetectors Based on Luminescence-Collecting Silicone Waveguides," *Journal of Applied Physics*, 107, 123101 (2010).
Roland Stolarski, "Fluorescent Naphthalimide Dyes for Polyester Fibres," *Fibres & Textiles* in Eastern Europe, vol. 17, No. 2 (73) pp. 91-95 (2009).
Ayse Aktas et al., "Synthesis, Characterization, Electrochemical and Spectroelectrochemical Properties of Peripherally Tetra-Substituted Metal-Free and Metallophthalocyanines," *Dyes and Pigments*, 99, (2013) 613-619.
Hairong Li, et al., "Syntheses and Properties of Octa-, Tetra-, and Di-Hydroxy-Substituted Phthalocyanines," *Tetrahedron*, 65 (2009) 3357-3363.
"Methine Dyes and Pigments," *Ullmann's Encyclopedia of Industrial Chemistry*, vol. 23 (2012).
Jing Liu, et al., "Sulfone-Rhodamines: A New Class of Near-Infrared Fluorescent Dyes for Bioimagin," *ACS Applied Materials & Interfaces*, 8, 22953-22962 (2016).
E. Noelting et al., "Berichte der deutschen chemischen Gesellschaft", *Band*, 38, S. 3516-3527 (1905).
T. Nedelcev et al., "Preparation and Characterization of a New Derivative of Rhodamine B with an Alkoxysilane Moiety," *Dyes and Pigments*, 76 (2008), 550-556.
Aurore Loudet et al., "Bodipy Dyes and Their Derivatives: Syntheses and Spectroscopic Properties," *Chem.Rev.*, 107 (2007) 4981-4932.
Weili Zhao, et al., "Conformationally Restricted Aza-Bodipy: A Highly fluorescent, Stable, Near-Infrared-Absorbing Dye", *Angew. Chem. Int. Ed.*, 44 (2005) 1677-1679.
Georg M. Fischer, et al., "Near-Infrared Dyes and Fluorophores Based on Diketopyrrolopyrroles," *Angew. Chem. Int. Ed.* 46 (2007) 3750-3753.
Amaresh Mishra et al., "Small Molecule Organic Semiconductors on the Move: Promises for Future Solar Energy Technology," *Angew. Chem. Int. Ed.*, 51, (2012), 2020-2067.
G. Seybold et al., "New Perylene and Violanthrone Dyestuffs for Fluorescent Collectors," *Dyes and Pigments*, 11 (1989) 303-317.
Nam-Trung Nguyen, "Micro-Optofluidic Lenses: A Review", *Biomicrofluidics*, 4, (2010) 031501.
Uriel Levy et al., "Tunable Optofluidic Devices," *Microfluid Nanofluid* (2008) 4: 97-105.
Robert Koeppe et al., "Video-Speed Detection of the Absolute Position of a Light Point on a Large-Area Photodetector Based on Luminescent Waveguides," *Optics Express*, vol. 18, No. 3, (Feb. 1, 2010), 2209.
Bahaa E. A. Saleh, et al., "Fundamentals of Photonics" John Wiley & Sons, Inc., Chapter 3, 1991, pp. 80-107 (with Cover Page).
Baeg et al., "Organic Light Detectors: Photodiodes and Phototransistors", *Advanced Materials*, vol. 25, No. 31, Mar. 11, 2013, pp. 4267-4295.
Office Action dated Jan. 3, 2018, in Chinese Patent Application No. 201610552144.7 parallel to U.S. Appl. No. 15/364,680.
Chinese Office Action dated Jan. 29, 2019, in Chinese Patent Application No. 201580036919.9.
International Search Report and Written Opinion dated Jan. 18, 2016 in PCT/IB2015/057412 filed Sep. 28, 2015.
Street (Ed.): Technology and Applications of Amorphous Silicon, Springer-Verlag Heidelberg, 2010. pp. 346-349.
International Search Report dated Aug. 17, 2017, in corresponding PCT/EP2017/060057.
International Search Report dated Aug. 1, 2017, in corresponding PCT/EP2017/060058.
Walter Fuhs, "Hydrogenated Amorphous Silicon—Material Properties and Device Applications", in S. Baranovski, Charge Transport in Disordered Solids, Wiley, p. 97-147, 2006.
http://www.plenoptic.info/pages/refocusing.html.
C. Hahne, A. Aggoun, S. Haxha, V. Velisavljevic, and J. Fernández, "Light field geometry of a standard plenoptic camera," Opt. Express 22, 26659-26673 (2014).
C. Hahne, A. Aggoun, S. Haxha, V. Velisavljevic, and J. Fernández, "Baseline of virtual cameras acquired by a standard plenoptic camera setup," in 3D-TV-Conference: The True Vision—Capture, Transmission and Display of 3D Video (3DTV-CON), Jul. 2-4, 2014.
C. Hahne, A. Aggoun, and V. Velisavljevic, "The refocusing distance of a standard plenoptic photograph," in 3D-TV-Conference: The True Vision—Capture, Transmission and Display of 3D Video (3DTV-CON), Jul. 8-10, 2015.
C. Hahne and A. Aggoun, "Embedded FIR filter design for real-time refocusing using a standard plenoptic video camera," Proc. SPIE 9023, in Digital Photography X, 902305 (Mar. 7, 2014).
R. M. Schaffert, "A New High-Sensitivity Organic Photoconductor for Electrophotography", *IBM J. Res. Develop.*, 1971, p. 75-89.
P. Gregory, Ed., *Chemistry and Technology of printing and imaging systems*, Chapman & Hall, 1996, Chap. 4, R.S. Gairns, *Electrophotography*, p. 76-112.
Japanese Office Action dated Nov. 5, 2019, in corresponding Japanese Patent Application No. 2017-558775 w/English translation.
Wikipedia—Printed Circuit Board: https://en.wikipedia.org/wiki/Printed_circuit_board (25 pages).
ISO 21348 Definitions of Solar Irradiance Spectral Categories, http://SpaceWx.com.
International Search Report dated Mar. 21, 2016, in PCT/IB2015/059406.
International Search Report and Written Opinion in PCT/IB2015/059411 dated Mar. 16, 2016 filed Dec. 7, 2015.
Nam-Trung Nguyen, "Micro-optofluidic Lenses: A review", Biomicrofluidics, 2010, vol. 4, 031501-15.
Uriel Levy et al., "Tunable optofluidic devices", Microfluid Nanofluid, 2008, vol. 4, pp. 97-105.
International Search Report and Written Opinion dated Mar. 15, 2016 in PCT/IB2015/059404 filed Dec. 7, 2015.
International Search Report and Written Opinion dated Mar. 21, 2016, in PCT/IB2015/059403, filed Dec. 7, 2015.

(56) References Cited

OTHER PUBLICATIONS

International Search Report dated Mar. 22, 2016 in PCT/IB2015/059408 filed Dec. 7, 2015.
Pekkola et al., "Focus-Induced Photoresponse: a novel way to measure distances with photodetectors", *Scientific Reports* (2018) 8:9208, 8 pages.
L. Pintilie, et al., "Field-effect-assisted photoconductivity in PbS films deposited on silicon dioxide", *J. Appl. Phys.* 91, p. 5782, 2002.
International Search Report dated Nov. 7, 2017, in corresponding PCT/EP2017/057867.
International Search Report dated Jul. 7, 2017, in corresponding PCT/EP2017/057825.
Kurt Konolige et al., "A Low-Cost Laser Distance Sensor", *2008 IEEE International Conference on Robotics and Automation*, Pasadena, CA, May 19-23, 2008.
X. Jiang et al., Dreidimensionales Computersehen, Chapter 2, Springer, Berlin Heidelberg (1997).
International Search Report dated May 20, 2016, in PCT/EP2016/054532.
International Preliminary Report on Patentability dated Aug. 1, 2017, in PCT/EP2016/051817.
Linyi Bian, et al., "Recent Progress in the Design of Narrow Bandgap Conjugated Polymers for High-Efficiency Organic Solar Cells", Progress in Polymer Science, vol. 37, 2012, pp. 1292-1331.
Antonio Facchetti, "Polymer donor-polymer acceptor (all-polymer) solar Cells", Materials Today, vol. 16 No. 4, Apr. 2013, pp. 123-132.
Graham H. Carey, et al., "Colloidal Quantum Dot Solar Cells", Chemical Reviews, vol. 115 No. 23, 2015, pp. 12732-12763.
Jason P. Clifford, et al., "Fast, Sensitive and Spectrally Tunable Colloidal Quantum-Dot Photodetectors", Nature Nanotechnology, Jan. 2009, pp. 1-5.
Kotaro Fukushima, et al., "Crystal Structures and Photocarrier Generation of Thioindigo Derivatives", Journal of Physical Chemistry B, vol. 102 No. 31, 1998, pp. 5985-5990.
Serap Günes, et al., "Hybrid Solar Cells", Inorganica Chimica Acta, vol. 361, 2008, pp. 581-588.
R. S. Mane, et al., "Chemical Deposition Method for Metal Chalcogenide Thin Films", Materials Chemistry and Physics, vol. 65, 2000, pp. 1-31.
Wilfried Hermes, "Emerging Thin-Film Photovoltaic Technologies", Chemie Ingenieur Technik, 2015, vol. 87 No. 4, pp. 376-389.
Paul H. Keck, "Photoconductivity in Vacuum Coated Selenium Films", Journal Optical Society of America, vol. 42 No. 4, Apr. 1952, pp. 221-225, with cover page.
Frank H. Moser, et al., "Phthalocyanine Compounds", Reinhold Publishing Corporation, 1963, p. 69-76 with cover pages.
M. Popescu, "Disordered Chalcogenide Optoelectronic Materials: Phenomena and Applications", Journal of Optoelectronics and Advanced Materials, vol. 7 No. 4, Aug. 2005, pp. 2189-2210.
Friedrich Andreas Sperlich, "Electron Paramagnetic Resonance Spectroscopy of Conjugated Polymers and Fullerenes for Organic Photovoltaics", Julius-Maximilians-Universität Würzburg, 2013, pp. 1-127.
F. Stöckmann, "Superlinear Photoconductivity", Physica Status Solidi, vol. 34, 1969, pp. 751-757.
Evangelos Theocharous, "Absolute Linearity Measurements on a PbS Detector in the Infrared", Applied Optics, vol. 45 No. 11, Apr. 10, 2006, pp. 2381-2386.
Evangelos Theocharous, et al., "Absolute Linearity Measurements on HgCdTe Detectors in the Infrared Region", Applied Optics, vol. 43 No. 21, Jul. 20, 2004, pp. 4182-4188.
Arthur L.Thomas, "Phthalocyanine Research and Applications", CRC Press, 1990, pp. 253-271 with cover pages.
Ikeoka, et al., "Real-Time Depth Estimation with Wide Detectable Range Using Horizontal Planes of Sharp Focus Proceedings", ACIVS 2011: Advanced Concepts for Intelligent Vision Systems, pp. 669-680 (with partial English translation) (https://link.springer.com/chapter/10.1007/978-3-642-23687-7_60).
Office Action dated Jul. 9, 2018, in Japanese Patent Application No. 2017-007544.
Xing Lin, et al., "Coded focal stack photography", Computational Photography (ICCP), 2013 IEEE International Conference On, Apr. 19, 2013, XP032424246, pp. 1-9.
Nabeel A. Riza, et al., "Noncontact distance sensor using spatial signal processing", Optics Letters, Optical Society of America, vol. 34, No. 4, Feb. 15, 2009, XP001522006, pp. 434-436.
Nabeel A. Riza, et al., "Smart agile lens remote optical sensor for three-dimensional object shape measurements", Applied Optics, Optical Society of America, vol. 49, No. 7, Mar. 1, 2010, XP001552714, pp. 1139-1150.
Wikipedia, Article denoted, "Thermocouple", retrieved Jul. 20, 2016.
Wang, Feng-Peng et al., "Distance Measurement using Digital Cameras Based on Laser Spot Detection", published on Jun. 30, 2011, School of Physics and Electronic Information, Gannan Normal University, Ganzhou 341000, China (with English Abstract).
International Search Report dated Nov. 27, 2015, in PCT/IB2015/055121, filed Jul. 7, 2015.
Extended Search Report dated Aug. 23, 2011 in Europe Application No. 11154531.5 (With English Translation of Category of Cited Documents).
Erwin Bacher, et al., "Synthesis and Characterization of Photo-Cross-Linkable Hole-Conducting Polymers", Macromolecules, vol. 38, 2005, pp. 1640-1647.
H. Bruce Goodbrand, et al., "Ligand-Accelerated Catalysis of the Ullmann Condensation: Application to Hole Conducting Triarylamines", J. Org. Chem., vol. 64, 1999, pp. 670-674.
Felix E. Goodson, et al., "Palladium-Catalyzed Synthesis of Pure, Regiodefined Polymeric Triarylamines", J. Am. Chem. Soc., vol. 121, 1999, pp. 7527-7539.
John F. Hartwig, "Transition Metal Catalyzed Synthesis of Arylamines and Aryl Ethers from Aryl Halides and Triflates: Scope and Mechanism", Angew. Chem. Int. Ed., vol. 37, 1998, pp. 2046-2067.
Sheila I. Hauck, et al., "Tetraazacyclophanes by Palladium-Catalyzed Aromatic Amination. Geometrically Defined, Stable, High-Spin Diradicals", Organic Letters, vol. 1, No. 13, 1999, pp. 2057-2060.
Ping-Hsin Huang, et al., "Synthesis and Characterization of new fluorescent two-photon absorption chromophores", J. Mater. Chem., vol. 16, 2006, pp. 850-857.
Qinglan Huang, et al., "Molecularly 'Engineered' Anode Adsorbates for Probing OLED Interfacial Structure—Charge Injection/Luminance Relationships: Large, Structure-Dependent Effects", J. Am. Chem. Soc., vol. 125, 2003, pp. 14704-14705.
A. Balionyte, et al., "Carbazolyl-substituted triphenyldiamine derivatives as novel photoconductive amorphous molecular materials", Journal of Photochemistry and Photobiology A: Chemistry, vol. 162, 2004, pp. 249-252.
G. R. A. Kumara, et al., "Fabrication of Dye-Sensitized Solar Cells Using Triethylamine Hydrothiocyanate as a CuI Crystal Growth Inhibitor", Langmuir, vol. 18, 2002, pp. 10493-10495.
Lukas Schmidt-Mende, et al., "Organic Dye for Highly Efficient Solid-State Dye-Sensitized Solar Cells", Adv. Mater., vol. 17, No. 7, 2005, pp. 813-815.
James Lindley, "Copper Assisted Nucleophilic Substitution of Aryl Halogen", Tetrahedron, vol. 40, No. 9, 1984, pp. 1433-1456.
Yunqi Liu, et al., "Synthesis and characterization of a novel bipolar polymer for light-emitting diodes", Chem. Commun., vol. 24, 1998, pp. 2747-2748.
Narukuni Hirata, et al., "Interface engineering for solid-state dye-sensitised nanocrystalline solar cells: the use of an organic redox cascade", Chem. Commun., vol. 5, 2006, pp. 535-537.
Qingjiang Yu, et al., "High-Efficiency Dye-Sensitized Solar Cells: The Influence of Lithium Ions on Exciton Dissociation, Charge Recombination, and Surface States", ACS Nano, vol. 4, No. 10, 2010, pp. 6032-6038.
Bin Peng, et al., "Systematic investigation of the role of compact $TiO_2$ solar cells", Coordination Chemistry Reviews, vol. 248, 2004, pp. 1479-1489.
Jiun Yi Shen, et al., "High $T_g$ blue emitting materials for electroluminescent devices", J. Mater. Chem., vol. 15, 2005, pp. 2455-2463.

(56) References Cited

OTHER PUBLICATIONS

Tobat P. I. Saragi, et al., "Comparison of Charge-Carrier Transport in Thin Films of Spiro-Linked Compounds and Their Corresponding Parent Compounds", Adv. Funct. Mater., vol. 16, 2006, pp. 966-974.
V. P. S. Perera, et al., "Dye-Sensitized Solid-State Photovoltaic Cells Based on Dye Multilayer-Semiconductor Nanostructures", J. Phys. Chem. B, vol. 107, 2003, pp. 13758-13761.
U. Bach, et al., "Solid-state dye-sensitized mesoporous $TiO_2$ solar cells with high photon-to-electron conversion efficiencies", Nature, vol. 395, 1998, pp. 583-585.
John P. Wolfe, et al., "Rational Development of Practical Catalysts for Aromatic Carbon-Nitrogen Bond Formation", Acc. Chem. Res. vol. 31, 1998, pp. 805-818.
Bryant H. Yang, et al., "Palladium-Catalyzed amination of aryl halides and sulfonates", Journal of Organometallic Chemistry, vol. 576, 1999, pp. 125-146.
Zhong Hui Li, et al., "Synthesis and Functional Properties of Strongly Luminescent Diphenylamino End-Capped Oligophenylenes", J. Org. Chem., vol. 69, 2004, pp. 921-927.
Brian O'Regan, et al., "A low-cost, high-efficiency solar cell based on dye-sensitized colloidal $TiO_2$ films", Letters to Nature, vol. 353, 1991, pp. 737-740.
International Search Report dated Sep. 24, 2014 in PCT/EP2014/061682.
International Preliminary Report on Patentability and Written Opinion dated Dec. 15, 2015 in PCT/EP2014/061682.
International Preliminary Report on Patentability and Written Opinion dated Dec. 23, 2015 in PCT/EP2014/061695.
International Search Report and Written Opinion dated May 31, 2012 in PCT/IB2012/050592 filed on Feb. 9, 2012.
Supplementary European Search Report dated Nov. 19, 2014, issued in corresponding European Patent Application No. EP 12 74 6808.
Volker Viereck, et al., Large-area applications of optical MEMS: micromirror arrays guide daylight, optimize indoor illumination, Optical Components, Photonik International 2, 2009, pp. 48-49.
C.U. Murade, et al., "High speed adaptive liquid microlens array", Optics Express, vol. 20, No. 16, Jul. 2012, pp. 18180-18187.
Jason Heikenfeld, et al., "Recent Progress in Arrayed Electrowetting Optics", Optics & Photonics News, Jan. 2009, 7 pages, www.osa-opn.org.
Tao Peng, "Algorithms and models for 3-D shape measurement using digital fringe projections", Dissertation, University of Maryland (College Park, Md.), Jan. 16, 2007, 268 pages (http://drum.lib.umd.edu//handle/1903/6654; http://en.wikipedia.org/wiki/Gray_code; http://en.wikipedia.org/wiki/Structured-light_3D_scanner).
Jie-Ci Yang et al., "An Intelligent Automated Door Control System Based on a Smart", Sensors, 2013, 13(5), pp. 5923-5936; doi:10.3390/s130505923 www.mdpi.com/journal/sensors.
Tomas Leijtens, et al., "Hole Transport Materials with Low Glass Transition Temperatures and High Solubility for Application in Solid-State Dye-Sensitized Solar Cells", ACS Nano, vol. 6, No. 2, 2012, pp. 1455-1462 www.acsnano.org.
International Search Report and Written Opinion dated Oct. 31, 2014 in PCT/EP2014/067466 filed Aug. 15, 2014.
Paul Pargas, "Phenomena of Image Sharpness Recognition of CdS and CdSe Photoconductors" Journal of the Optical Society of America, vol. 54, No. 4, Apr. 1964, pp. 516-519.
Paul Pargas, "A Lens Measuring Method Using Photoconductive Cells" Journal of the SMPTE, vol. 74, Jun. 1965, pp. 501-504.
Jack T. Billings, "An Improved Method for Critical Focus of Motion-Picture Optical Printers" Journal of the SMPTE, vol. 80, Aug. 1971, pp. 624-628.
International Search Report dated Sep. 9, 2014 in PCT/EP2014/061688 filed Jun. 5, 2014.
Written Opinion of the International Searching Authority dated Sep. 9, 2014 in PCT/EP2014/061688 filed Jun. 5, 2014.
International Search Report and Written Opinion of the International Searching Authority dated Mar. 12, 2015 in PCT/EP2014/078155 Filed Dec. 17, 2014.
International Search Report and Written Opinion of the International Searching Authority dated May 16, 2014 in PCT/IB2013/061095.
Seigo Ito, et al., "High-Efficiency Organic-Dye-Sensitized Solar Cells Controlled by Nanocrystalline-$TiO_2$ Electrode Thickness", Adv. Mater., vol. 18, 2006, pp. 1202-1205.
Atte Haapalinna, et al., "Measurement of the Absolute Linearity of Photodetectors with a Diode Laser," Meas. Sci. Technol., 10, (1999) 1075-1078.
M. R. Andersen, et al., "Kinect Depth Sensor Evaluation for Computer Vision Applications",Electrical and Computer Engineering, Technical Report ECE-TR-6, Aarhus University, 2012, 39 pages.
Takumi Kinoshita, et al., "Wideband dye-sensitized solar cells employing a phosphine-coordinated ruthenium sensitizer", Nature Photonics, vol. 7, 2013, pp. 535-239.
Office Action dated Apr. 22, 2015 in Chinese Patent Application No. 201280018328.5 (submitting English translation only).
International Search Report and Written Opinion dated Sep. 3, 2014 in PCT/EP2014/061691.
International Preliminary Report on Patentability dated Sep. 25, 2015 in PCT/EP2014/061691.
Kuthirumal, S., et al., "Flexible Depth of Field Photography," IEEE Transactions on Pattern Analysis and Machine Intelligence, vol. 33, No. 1 (2011), pp. 58-71.
Hiura Shinsaku et al., "Depth Measurement by the Multi-Focus Camera," Computer Vision and Pattern Recognition, 1998. Proceedings. 1998 IEEE Computer Society Conference on Santa Barbara, CA, USA, Jun. 23-25, 1998, pp. 953-959.
D. Scaramuzza, et al., "Extrinsic Self Calibration of a Camera and a 3D Laser Range Finder from Natural Scenes" 2007 IEEE/RSJ International Conference on Intelligent Robots and Systems, 2007, 8 pages.
International Preliminary Report on Patentability and Written Opinion dated Dec. 23, 2015 in PCT/EP2014/061688.
Denis Klimentjew, et al., "Multi Sensor Fusion of Camera and 3D Laser Range Finder for Object Recognition" 2010 IEEE International Conference on Multisensor Fusion and Integration for Intelligent Systems, 2010, pp. 236-241.
"New—Ultra-Compact Pockels Cells with Brewster Polarizer and Waveplate for Laser Q-Switching" Leysop Ltd, Manfacturers and Suppliers of Electro-Optic Components—http://www.leysop.com/integrated_pockels_cell.htm, Aug. 4, 2013, 2 Pages.
International Search Report and Written Opinion dated Nov. 21, 2014 in PCT/EP2014/067465.
"So funktioniert die DLP-Technologie" DLP-Technologie—www.dlp.com/de/technology/how-dlp-works, 2014, 2 Pages.
International Search Report dated Aug. 28, 2015, in PCT/IB2015/052769, filed Apr. 16, 2015.
International Search Report and Written Opinion dated Jun. 30, 2015 in PCT/IB15/052233 Filed Mar. 26, 2015.
International Search Report dated Sep. 22, 2015, in Application No. PCT/IB2015/052785, filed on Apr. 16, 2015.
International Search Report and Written Opinion dated Mar. 29, 2016, in PCT/IB2015/054536, filed Jun. 16, 2015.

\* cited by examiner

DETECTOR FOR DETERMINING A POSITION OF AT LEAST ONE OBJECT

FIELD OF THE INVENTION

The invention relates to a detector for determining a position of at least one object, a human-machine interface, an entertainment device for carrying out at least one entertainment function, a tracking system, a camera, a method for determining a position of at least one object and various uses of the detector. Such devices and such methods can be employed for example in various areas of daily life, traffic technology, production technology, security technology, medical technology, entertainment technology or in the sciences. Additionally or alternatively, the application may be applied in the field of mapping of spaces, such as for generating maps of one or more rooms, one or more buildings or one or more streets. Further, the detector may form a camera or may be part of a camera for imaging at least one object. However, other applications are also possible in principle.

PRIOR ART

A large number of detectors configured to determine a position of an object are known from the prior art. Such detectors for determining the position of the object are known on the basis of optical sensors and photovoltaic devices.

While photovoltaic devices are generally used to convert electromagnetic radiation, for example, ultraviolet, visible or infrared light, into electrical signals or electrical energy, optical detectors are generally used for picking up image information and/or for detecting at least one optical parameter, for example, a brightness. In general, optical sensors can be based on the use of inorganic and/or organic sensor materials. Examples of such sensors are disclosed in US 2007/0176165 A1, U.S. Pat. No. 6,995,445 B2, DE 2501124 A1, DE 3225372 A1 or else in numerous other prior art documents. To an increasing extent, in particular for cost reasons and for reasons of large-area processing, sensors comprising at least one organic sensor material are being used, as described for example in US 2007/0176165 A1. In particular, so-called dye solar cells are increasingly of importance here, which are described generally, for example in WO 2009/013282 A1.

The detectors based on such optical sensors for determining a position of at least one object can be embodied in diverse ways, depending on the respective purpose of use. Examples of such detectors are imaging devices, for example, cameras and/or microscopes. High-resolution confocal microscopes are known, for example, which can be used in particular in the field of medical technology and biology in order to examine biological samples with high optical resolution. Further examples of detectors for optically detecting objects are triangulation systems, by means of which a distance measurement can be carried out.

Further examples of detectors for optically detecting at least one object are distance measuring devices based, for example, on propagation time methods of corresponding optical signals, for example laser pulses. In general, these detectors may comprise an illumination source, e.g. a lamp or a laser, and a light-detecting device. The illumination source may emit light, in particular one or more light beams, which are focused by a lens and/or a lens system. The emitted light may be reflected by the object. The reflected light may be detected by the light-detecting device. In general, these detectors may use techniques as time-of-flight analysis, structure light analysis or a plurality of detectors for example for performing triangulation methods, for determining a position of an object. Other methods are based in turn on complex pulse sequences, such as, for example, distance measurements by means of laser pulses.

Various position detectors are known in the art. Thus, in JP 8-159714 A, a distance measurement device is disclosed. Therein, by using a detector and a shadow-forming element, a distance between an object and the detector is determined based on the fact that shadow formation of objects depends on the distance. In US 2008/0259310 A1, an optical position detector is disclosed. The position of a transmission system is determined by using a variety of known distances and measured angles. In US 2005/0184301 A1, a distance measurement device is disclosed. The measurement device makes use of a plurality of light-emitting diodes having different wavelengths. In CN 101650173 A, a position detector is disclosed which is based on the use of geometric principles. Further, in JP 10-221064 A, a complex optical setup is disclosed which is similar to optical setups used in holography.

In U.S. Pat. No. 4,767,211, a device and a method for optical measurement and imaging are disclosed. Therein, a ratio of reflected light traveling along an optical axis and reflected light traveling off-axis is determined by using different photo-detectors and a divider. By using this principal, depressions in a sample may be detected.

In U.S. Pat. No. 4,647,193, a range of a target object is determined by using a detector having multiple components. The detector is placed away from a focal plane of a lens. The size of a light spot of light from the object varies with the range of the object and, thus, is dependent on the range of the object. By using different photo-detectors, the size of the light spot and, thus, the range of the object may be determined by comparing signals generated by the photo-detectors.

In U.S. Pat. No. 6,995,445 and US 2007/0176165 A1, a position sensitive organic detector is disclosed. Therein, a resistive bottom electrode, is used which is electrically contacted by using at least two electrical contacts. By forming a current ratio of the currents from the electric contacts, a position of a light spot on the organic detector may be detected.

In WO 2010/088032 A2 and US 2011/0055846 A1, a capture device configured to obtain depth images of one or more targets is proposed. The capture device may include a depth camera, a video camera, stereo cameras, and/or other suitable capture devices. The capture device may include an image camera component, which may include an IR light component, a three-dimensional (3-D) camera, and/or an RGB camera. In WO 2010/088032 A2, the capture device may be configured to capture videos with depth information by any suitable technique (e.g., time-of-flight, structured light, stereo image, etc.). In addition to the techniques used in WO 2010/088032 A2, in US 2011/0055846 A1, the phase of the outgoing light wave may be compared to the phase of the incoming light wave to determine a phase shift, which is used to determine a physical distance of the object.

Further it is generally known in the art to use transparent or at least partially transparent position detectors. WO 2012/110924 A1, the content of which is herewith included by reference, discloses a detector for optically detecting at least one object. The detector comprises at least one optical sensor. The optical sensor has at least one sensor region. The optical sensor is designed to generate at least one sensor signal in a manner dependent on an illumination of the sensor region. The sensor signal, given the same total power of the illumination, is dependent on a geometry of the illumination, in particular on a beam cross section of the illumination on the sensor area. The detector furthermore has at least one evaluation device. The evaluation device is designed to generate at least one item of geometrical information from the sensor signal, in particular at least one item of geometrical information about the illumination and/or the object.

However, the usage of only one transparent or partially transparent position sensor in order to determine a longitudinal position of the object may yield to the problem of ambiguity of the measurement of the longitudinal position, in particular if the object is positioned before or behind a focus point or area. To overcome the ambiguity problem, the usage of multiple transparent or partially transparent position sensors, respectively sensor stacks, are known from prior art.

U.S. provisional applications 61/739,173, filed on Dec. 19, 2012, 61/749,964, filed on Jan. 8, 2013, and 61/867,169, filed on Aug. 19, 2013, and international patent application PCT/IB2013/061095, published under WO2014/097181 A1, filed on Dec. 18, 2013, the full content of all of which is herewith included by reference, disclose a method and a detector for determining a position of at least one object, by using at least one transversal optical sensor and at least one optical sensor. Specifically, the use of sensor stacks is disclosed, in order to determine a longitudinal position of the object with a high degree of accuracy and without ambiguity.

European patent application number EP 13171898.3, filed on Jun. 13, 2013, German patent application number 10 2014 007 775.6, filed on Mar. 12, 2014 and international patent application number PCT/EP2014/061695, filed on Jun. 5, 2014, the full content of all of which is herewith included by reference, disclose an optical detector comprising an optical sensor having a substrate and at least one photosensitive layer setup disposed thereon. The photosensitive layer setup has at least one first electrode at least one second electrode and at least one photovoltaic material sandwiched in between the first electrode and the second electrode. The photovoltaic material comprises at least one organic material. The first electrode comprises a plurality of first electrode stripes, and the second electrode comprises a plurality of second electrode stripes, wherein the first electrode stripes and the second electrode stripes intersect such that a matrix of pixels is formed at intersections of the first electrode stripes and the second electrode stripes. The optical detector further comprises at least one readout device, the readout device comprising a plurality of electrical measurement devices being connected to the second electrode stripes and a switching device for subsequently connecting the first electrode stripes to the electrical measurement devices.

European patent application number EP 13171900.7, filed on Jun. 13, 2013, European patent application number 14155161.4, filed on Feb. 14, 2014, and international patent application number PCT/EP2014/061691, filed on Jun. 5, 2014, the full content of all of which is herewith included by reference, disclose a detector device for determining an orientation of at least one object, comprising at least two beacon devices being adapted to be at least one of attached to the object, held by the object and integrated into the object, the beacon devices each being adapted to direct light beams towards a detector, and the beacon devices having predetermined coordinates in a coordinate system of the object. The detector device further comprises at least one detector adapted to detect the light beams traveling from the beacon devices towards the detector and at least one evaluation device, the evaluation device being adapted to determine longitudinal coordinates of each of the beacon devices in a coordinate system of the detector. The evaluation device is further adapted to determine an orientation of the object in the coordinate system of the detector by using the longitudinal coordinates of the beacon devices.

European patent application number EP 13171901.5, filed on Jun. 13, 2013, German patent application number 10 2014 006 280.5, filed on Mar. 12, 2014, and international patent application number PCT/EP2014/061695, filed on Jun. 5, 2014, the full content of all of which is herewith included by reference, disclose a detector for determining a position of at least one object. The detector comprises at least one optical sensor being adapted to detect a light beam traveling from the object towards the detector, the optical sensor having at least one matrix of pixels. The detector further comprises at least one evaluation device, the evaluation device being adapted to determine a number N of pixels of the optical sensor which are illuminated by the light beam. The evaluation device is further adapted to determine at least one longitudinal coordinate of the object by using the number N of pixels which are illuminated by the light beam.

However, the usage of multiple, in particular three or more, longitudinal optical sensors to measure the longitudinal position of the object to achieve a high degree of accuracy and an unambiguous measurement, may be resource and cost intensive. Thus, it would be desirable to determine the longitudinal position of the object with a minimal amount of optical sensors needed.

PROBLEM ADDRESSED BY THE INVENTION

Therefore, a problem addressed by the present invention is that of specifying devices and a method for determining a position of at least one object which at least substantially avoid the disadvantages of known devices and methods of this type. In particular, the proposed devices and methods are intended to make it possible to determine the position of the at least one object with a high degree of accuracy and without ambiguity, at a low technical effort.

DISCLOSURE OF THE INVENTION

This problem is solved by a detector, a human-machine-interface, a tracking system, a method with the features of the independent patent claims. Preferred embodiments which might be realized in an isolated fashion or in arbitrary combination are listed in the dependent claims.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may refer to a situation in which, besides B, no other element is present in A (i.e. a situation in which A solely and exclusively consists of B) and to a situation in which, besides B, one or more further elements are present in entity A, such as element C, elements C and D or even further elements.

Further, as used in the following, the terms "preferably", "more preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of the invention a detector for determining a position of at least one object is proposed. The detector comprises:

- at least one transfer device for imaging the object into an image plane, the transfer device having a focal plane,
- at least one longitudinal optical sensor, wherein the longitudinal optical sensor has at least one sensor region, wherein the longitudinal optical sensor is at least partially transparent, wherein the longitudinal optical sensor is designed to generate at least one longitudinal sensor signal in a manner dependent on an illumination of the sensor region by at least one light beam traveling from the object to the detector, wherein the longitudinal sensor signal, given the same total power of the illumination, is dependent on a beam cross-section of the light beam in the sensor region; and
- at least one evaluation device, wherein the evaluation device is designed to generate at least one item of information on a longitudinal position of the object by evaluating the longitudinal sensor signal.

Herein, the at least one longitudinal optical sensor comprises a focal longitudinal optical sensor. The focal longitudinal optical sensor at least substantially is arranged in the focal plane.

As used herein, a detector generally refers to a device which is capable of generating at least one detector signal and/or at least one image, in response to an illumination by one or more illumination sources and/or in response to optical properties of a surrounding of the detector. Thus, the detector may be an arbitrary device adapted for performing at least one of an optical measurement and imaging process.

Specifically, the detector is adapted for determining a position of at least one object. As used herein, the term position generally refers to at least one item of information regarding a location and/or orientation of the object and/or at least one part of the object in space. The at least one item of information may imply at least one distance between at least one point of the object and the at least one detector. As will be outlined in further detail below, the distance may be a longitudinal coordinate or may contribute to determine a longitudinal coordinate of the point of the object. Additionally or alternatively, one or more other items of information regarding the location and/or orientation of the object and/or at least one part of the object may be determined. As an example, at least one transversal coordinate of the object and/or at least one part of the object may be determined. Thus, the position of the object may imply at least one longitudinal coordinate of the object and/or at least one part of the object. Additionally or alternatively, the position of the object may imply at least one transversal coordinate of the object and/or at least one part of the object. Additionally or alternatively, the position of the object may imply at least one orientation information of the object, indicating an orientation of the object in space. The position may relate to the entire object or else only a part, for example a point, an area or a region of the object. Said part can be arranged on a surface of the object or else at least partly within the object.

For this purpose, as an example, one or more coordinate systems may be used, and the position of the object may be determined by using one, two, three or more coordinates. As an example, one or more Cartesian coordinate systems and/or other types of coordinate systems may be used. In one example, the coordinate system may be a coordinate system of the detector in which the detector has a predetermined position and/or orientation. As will be outlined in further detail below, the detector may have an optical axis, which may constitute a main direction of view of the detector. The optical axis may form an axis of the coordinate system, such as a z-axis. Further, one or more additional axes may be provided, preferably perpendicular to the z-axis.

Thus, as an example, the detector may constitute a coordinate system in which the optical axis forms the z-axis and in which, additionally, an x-axis and a y-axis may be provided which are perpendicular to the z-axis and which are perpendicular to each other. As an example, the detector and/or a part of the detector may rest at a specific point in this coordinate system, such as at the origin of this coordinate system. In this coordinate system, a direction parallel or antiparallel to the z-axis may be regarded as a longitudinal direction, and a coordinate along the z-axis may be considered a longitudinal coordinate. An arbitrary direction perpendicular to the longitudinal direction may be considered a transversal direction, and an x- and/or y-coordinate may be considered a transversal coordinate.

Alternatively, other types of coordinate systems may be used. Thus, as an example, a polar coordinate system may be used in which the optical axis forms a z-axis and in which a distance from the z-axis and a polar angle may be used as additional coordinates. Again, a direction parallel or anti-parallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate.

The object generally may be an arbitrary object. In one embodiment, the object may be a rigid object. Other embodiments are feasible, such as embodiments in which the object is a non-rigid object or an object which may change its shape. The object can be detected completely or partly by means of the detector. The object generally may be an arbitrary object, chosen from a living object and a non-living object. Thus, as an example, the at least one object may comprise one or more articles and/or one or more parts of an article. Additionally or alternatively, the object may be or may comprise one or more living beings and/or one or more parts thereof, such as one or more body parts of a human being, e.g. a user, and/or an animal.

As will be outlined in further detail below, the present invention may specifically be used for tracking positions and/or motions of a person, such as for the purpose of controlling machines, gaming or simulation of sports. In this or other embodiments, specifically, the object may be selected from the group consisting of: an article of sports equipment, preferably an article selected from the group consisting of a racket, a club, a bat; an article of clothing; a hat; a shoe.

The detector comprises at least one transfer device for imaging the object into an image plane. As used herein, a transfer device generally is a device, specifically an optical device, having one or both of a focusing or a defocussing effect onto light originating from the at least one object, for example light from the at least one object due to illumination by one or more illumination sources and/or in response to optical properties of a surrounding of the object. The optical device may comprise at least one element selected from the group consisting of: a lens, in particular a focusing and/or a defocusing lens; a focusing mirror; a defocusing mirror. The at least one transfer device may fully or partially be positioned in a beam path between the longitudinal optical sensor and the object and may be adapted such that the light beam traveling from the object to the detector passes through the transfer device. As used herein, the term "beam path" refers to the path on which the light beam travels or propagates.

Further, as used herein, an image plane generally is a plane, which is preferably situated perpendicular to an optical axis of the transfer device and/or the longitudinal optical sensor, on which the object is imaged by the transfer device. Thus, the image plane comprises the picture of the object. The optical axis may be parallel to the z-axis and/or parallel to the main direction of view of the detector. Strictly speaking, this definition only holds true for two-dimensional objects without an expansion in a dimension of an object distance. With respect to 3-dimensional objects, an image plane generally is a plane perpendicular to an optical axis of the transfer device and/or the longitudinal optical sensor, on which at least one point of the object, in particular of the surface of the object, is imaged. As used herein, "imaging the object" refers to one or more of projecting, focusing and defocussing of the object, in particular light originating from the at least one object, for example light from the at least one object due to illumination by one or more illumination sources and/or in response to optical properties of a surrounding of the object.

The transfer device has a focal plane. As used herein, "focal plane" refers to a plane which comprises a focus, also referred to as focal point, of the transfer device and which preferably is orthogonal to the optical axis of the transfer device and/or the longitudinal optical sensor. As used herein, "focus" or "image point" refers to the point where light, in particular light rays, originating from at least one point of the object converge.

In this context, it should be carefully noted that the focal plane of the transfer device, such as of the lens or combination of lenses, not necessarily has to be identical to an image plane of the detector, even though in photography the terms "focal plane" and "image plane" often are used as synonyms. The focal plane is the plane comprising the focal point of the transfer device, which preferably is orthogonal to the optical axis of the transfer device and/or the optical axis of the detector. Contrarily, the image plane is the plane in which the actual image of at least one object is created by the transfer device. In case the object is shifted towards an infinite distance from the transfer device, the image plane is shifted towards the focal plane.

The detector comprises at least one longitudinal optical sensor. As used herein, a longitudinal optical sensor generally is a device which is designed to generate at least one longitudinal sensor signal in a manner dependent on an illumination of the sensor region by at least one light beam traveling from the object to the detector. The longitudinal sensor signal, given the same total power of the illumination, is dependent on a beam cross-section of the light beam in the sensor region. For potential setups of the at least one longitudinal optical sensor, reference may be made to WO 2012/110924 A1 and/or WO2014/097181 A1. Still, other embodiments are feasible.

The longitudinal optical sensor comprises at least one focal longitudinal optical sensor. For example, the longitudinal optical sensor may comprise exactly one focal longitudinal optical sensor. As used herein, "focal longitudinal optical sensor" refers to a longitudinal optical sensor which at least substantially is arranged in the focal plane of the transfer device. The focal longitudinal optical sensor preferably is located within the focal plane. However, the focal longitudinal optical sensor may be spaced apart from the focal plane by a distance ±ε, wherein $|\varepsilon| \leq 0.2 \cdot f$, with f being the focal length of the transfer device. The distance may be $|\varepsilon| \leq 0.1 \cdot f$, preferably $|\varepsilon| \leq 0.05 \cdot f$, more preferably $|\varepsilon| \leq 0.02 \cdot f$, and most preferably $|\varepsilon| \leq 0.01 \cdot f$. The focal longitudinal optical sensor may be arranged such that the sensor region of the focal longitudinal optical sensor is oriented essentially perpendicularly to the optical axis of the detector. Thus, as used herein, the term "is at least substantially arranged in the focal plane" generally refers to a placement in the focal plane, with a tolerance of ±ε, wherein $|\varepsilon| \leq 0.2 \cdot f$.

The at least one longitudinal optical sensor, besides the focal longitudinal optical sensor, may comprise at least one further longitudinal optical sensor. The at least one longitudinal optical sensor may comprise a sensor stack of longitudinal optical sensors. The focal longitudinal optical sensor may form part of the stack of longitudinal optical sensors. The stack of longitudinal optical sensors may comprise no more than three longitudinal optical sensors. The sensor stack may be composed of longitudinal optical sensors being arranged such that the sensor regions of the longitudinal optical sensors are oriented essentially perpendicular to an optical axis of the detector.

In case a plurality of longitudinal optical sensors is comprised, e. g. a stack of longitudinal optical sensors, the longitudinal optical sensors may be identical or may be different such that at least two different types of optical sensors may be comprised. As outlined in further detail below, the at least one longitudinal optical sensor may comprise at least one of an inorganic optical sensor and an organic optical sensor. As used herein, an organic optical sensor generally refers to an optical sensor having at least one organic material included therein, preferably at least one organic photosensitive material. Further, hybrid optical sensors may be used including both inorganic and organic materials.

For potential embodiments of the longitudinal optical sensor, reference may be made to the optical sensor as disclosed in WO 2012/110924 A1. Preferably, however, as will be outlined in further detail below, the detector according to the present invention may comprise a plurality of optical sensors, such as a plurality of optical sensors as disclosed in WO 2012/110924 A1, preferably as a sensor stack. Thus, as an example, the detector according to the present invention may comprise a stack of optical sensors as disclosed in WO 2012/110924 A1.

In case the detector comprises at least one stack of optical sensors, the stack comprising at least two longitudinal optical sensors, the stack optionally may partially or fully be immersed in one or more transparent immersion matrices, such as in one or more immersion liquids, such as in one or more of: an oil; a liquid to avoid and/or decrease reflections at interfaces; a resin, a polymer. The immersion matrix generally may be adapted to avoid and/or decrease reflections at interfaces and/or may be adapted to fully or partially stabilize the stack mechanically and/or may be adapted to fully or partially protect the stack from external influences such as mechanical, chemical or environmental influences.

Thus, at least one of the optical sensors of the stack may fully or partially be immersed in the at least one immersion matrix and/or may fully or partially be embedded in the at least one immersion matrix.

As will further be outlined below, preferably, the longitudinal optical sensor may comprise one or more photo detectors, preferably one or more organic photodetectors and, most preferably, one or more dye-sensitized organic solar cells (DSCs, also referred to as dye solar cells), such as one or more solid dye-sensitized organic solar cells (s-DSCs). Thus, preferably, the detector may comprise one or more DSCs (such as one or more sDSCs) acting as the at least one longitudinal optical sensor and one or more DSCs (such as one or more sDSCs) acting as the at least one longitudinal optical sensor, preferably a stack of a plurality of DSCs (preferably a stack of a plurality of sDSCs) acting as the at least one longitudinal optical sensor.

The longitudinal optical sensor has at least one sensor region. Preferably, the sensor region of the longitudinal optical sensor may be formed by one continuous sensor region, such as one continuous sensor area or sensor surface per device. Thus, preferably, the sensor region of the longitudinal optical sensor or, in case a plurality of longitudinal optical sensors is provided (such as a stack of longitudinal optical sensors), each sensor region of the longitudinal optical sensor, may be formed by exactly one continuous sensor region.

The at least one longitudinal optical sensor may have a sensor region providing a sensitive area, also referred to as a sensor area, of at least 1 mm$^2$, preferably of at least 5 mm$^2$, such as a sensor area of 5 mm$^2$ to 1000 cm$^2$, preferably a sensor area of 7 mm$^2$ to 100 cm$^2$, more preferably a sensor area of 1 cm$^2$. The sensor area preferably has a rectangular geometry, such as a square geometry. However, other geometries and/or sensor areas are feasible.

Preferably, the longitudinal optical sensor may be a thin film device, having a layer setup of layers including electrode and photovoltaic material, the layer setup having a thickness of preferably no more than 1 mm, more preferably of at most 100 µm, at most 5 µm or even less. Thus, the sensor region of the longitudinal optical sensor preferably may be or may comprise a sensor area, which may be formed by a surface of the respective device facing towards the object.

The longitudinal optical sensor is at least partially transparent. Thus, generally, the longitudinal optical sensor may comprise at least one at least partially transparent optical sensor such that the light beam at least partially may pass through the longitudinal optical sensor. As used herein, the term "at least partially transparent" may both refer to the option that the entire longitudinal optical sensor is transparent or a part (such as a sensitive region) of the longitudinal optical sensor is transparent and/or to the option that the longitudinal optical sensor or at least a transparent part of the longitudinal optical sensor may transmit the light beam in an attenuated or non-attenuated fashion. Thus, as an example, the transparent longitudinal optical sensor may have a transparency of at least 10%, preferably at least 20%, at least 40%, at least 50% or at least 70%. In order to provide a sensory effect, generally, the longitudinal optical sensor typically has to provide some sort of interaction between the light beam and the longitudinal optical sensor which typically results in a loss of transparency. The transparency of the longitudinal optical sensor may be dependent on a wavelength of the light beam, resulting in a spectral profile of a sensitivity, an absorption or a transparency of the longitudinal optical sensor. In case a plurality of longitudinal optical sensors is provided, such as a stack of longitudinal optical sensors, preferably all longitudinal optical sensors of the plurality and/or the stack are transparent.

As outlined above, in case a plurality of longitudinal optical sensors is provided, the spectral properties of the optical sensors not necessarily have to be identical. Thus, one of the longitudinal optical sensors may provide a strong absorption (such as absorption peak) in the red spectral region, another one of the longitudinal optical sensors may provide a strong absorption in the green spectral region, and another one may provide a strong absorption in the blue spectral region. Other embodiments are feasible. As used herein, the term light generally refers to electromagnetic radiation in one or more of the visible spectral range, the ultraviolet spectral range and the infrared spectral range. Therein, the term visible spectral range generally refers to a spectral range of 380 nm to 780 nm. The term infrared spectral range generally refers to electromagnetic radiation in the range of 780 nm to 1 mm, preferably in the range of 780 nm to 3.0 micrometers. The term ultraviolet spectral range generally refers to electromagnetic radiation in the range of 1 nm to 380 nm, preferably in the range of 100 nm to 380 nm. Further, the spectral range of 600 nm to 780 nm may be defined as the red spectral range, the range of 490 nm to 600 nm as the green spectral range, and the range of 380 nm to 490 nm as the blue spectral range.

The longitudinal sensor signal preferably may be selected from the group consisting of a current (such as a photocurrent) and a voltage (such as a photovoltage). Further, the longitudinal sensor signal may be preprocessed, in order to derive refined sensor signals from raw sensor signals, such as by averaging and/or filtering. The longitudinal sensor signal may, additionally or alternatively, depend on other properties of the light beam such as a width of the light beam. The longitudinal sensor signal preferably may be an electrical signal, such as an electrical current and/or an electric voltage. The longitudinal sensor signal may be a continuous or discontinuous signal. Further, the longitudinal sensor signal may be an analogue signal or a digital signal. Further, the longitudinal optical sensor, by itself and/or in conjunction with other components of the longitudinal optical sensor, may be adapted to process or preprocess the longitudinal sensor signal, such as by filtering and/or averaging, in order to provide a processed longitudinal sensor signal. Thus, as an example, a bandpass filter may be used in order to transmit only longitudinal sensor signals of a specific frequency range. Other types of preprocessing are feasible. In the following, when referring to the longitudinal sensor signal, no difference will be made between the case in which the raw longitudinal sensor signal is used and the case in which a preprocessed longitudinal sensor signal is used for further evaluation.

As used herein, a "light beam" generally is an amount of light traveling into more or less the same direction. Thus, preferably, a light beam may refer to a Gaussian light beam, as known to the skilled person. However, other light beams, such as non-Gaussian light beams, are possible. As outlined in further detail below, the light beam may be emitted and/or reflected by an object. Further, the light beam may be reflected and/or emitted. The light beam may at least partially propagate substantially parallel to the optical axis of the detector. As used herein, "substantially parallel" refers to a beam axis which deviates not more than ±20°, preferably not more than ±10°, more preferably not more than ±5°, from the optical axis.

As outlined above, the at least one longitudinal sensor signal, given the same total power of the illumination by the light beam, is dependent on a beam cross-section of the light beam in the sensor region of the at least one longitudinal optical sensor. As used herein, the term "beam cross-section" generally refers to a lateral extension of the light beam or a light spot generated by the light beam at a specific location. In case a circular light spot is generated, a radius, a diameter or a Gaussian beam waist or twice the Gaussian beam waist may function as a measure of the beam cross-section. In case non-circular light-spots are generated, the cross-section may be determined in any other feasible way, such as by determining the cross-section of a circle having the same area as the non-circular light spot, which is also referred to as the equivalent beam cross-section.

Thus, given the same total power of the illumination of the sensor region by the light beam, a light beam having a first beam diameter or beam cross-section may generate a first longitudinal sensor signal, whereas a light beam having a second beam diameter or beam-cross section being different from the first beam diameter or beam cross-section generates a second longitudinal sensor signal being different from the first longitudinal sensor signal. Thus, by comparing the longitudinal sensor signals, an information or at least one item of information on the beam cross-section, specifically on the beam diameter, may be generated. For details of this effect, reference may be made to WO 2012/110924 A1.

In the following, this effect generally will be referred to as the FiP-effect, since, given the same total power p of illumination, the sensor signal i is dependent on a flux F of photons, i.e. the number of photons per unit area.

This effect, which is further disclosed in U.S. provisional applications 61/739,173 and 61/749,964, may be used for determining a longitudinal position of an object from which the light beam travels towards the detector. Thus, since the sensor signal of the longitudinal optical sensor depends on a width, such as a diameter or radius, of the light beam on the sensor region, which again depends on a distance between the detector and the object, the longitudinal sensor signal may be used for determining a longitudinal coordinate of the object. The sensor region preferably may be a non-pixelated sensor region. Thus, as an example, the evaluation device may be adapted to use a predetermined relationship between a longitudinal coordinate of the object and a sensor signal in order to determine the longitudinal coordinate. The predetermined relationship may be derived by using empiric calibration measurements and/or by using known beam propagation properties, such as Gaussian beam propagation properties. For further details, reference may be made to WO 2012/110924 A1 and/or U.S. provisional applications 61/739,173 and 61/749,964.

For details of this FiP effect, reference may be made to one or more of WO 2012/110924 A1 or U.S. provisional applications 61/739,173, filed on Dec. 19, 2012, 61/749,964, filed on Jan. 8, 2013, and 61/867,169, filed on Aug. 19, 2013, and WO2014/097181 A1. Specifically in case one or more beam properties of the light beam propagating from the object to the detector are known, the at least one item of information on the longitudinal position of the object may thus be derived from a known relationship between the at least one longitudinal sensor signal and a longitudinal position of the object. The known relationship may be stored in the evaluation device as an algorithm and/or as one or more calibration curves. As an example, specifically for Gaussian beams, a relationship between a beam diameter or beam waist and a position of the object may easily be derived by using the Gaussian relationship between the beam waist and a longitudinal coordinate.

The detector comprises at least one longitudinal optical sensor. Thus, the detector may comprise one or more of the longitudinal optical sensors. In case a plurality of two or more longitudinal optical sensors are provided, the longitudinal optical sensors may be arranged in various ways, such as by providing a sensor stack comprising two or more of the longitudinal optical sensors in a stacked fashion.

Besides the at least one longitudinal optical sensor, the detector may, optionally, comprise one or more additional optical sensors which are not longitudinal optical sensors according to the definition given herein. Thus, as an example, the detector may comprise a stack of optical sensors, wherein at least one of the optical sensors is a longitudinal optical sensor and wherein at least another one of the optical sensors is a different type of optical sensor, such as a transversal optical sensor and/or an imaging device, such as an organic imaging sensor and/or an inorganic imaging sensor like a CCD and/or CMOS chip.

Thus, the detector may further comprise at least one transversal optical sensor, the transversal optical sensor being adapted to determine a transversal position of at least one light beam traveling from the object to the detector, the transversal position being a position in at least one dimension perpendicular an optical axis of the detector, the transversal optical sensor being adapted to generate at least one transversal sensor signal. The evaluation device may be designed to generate at least one item of information on a transversal position of the object by evaluating the transversal sensor signal.

As used herein, the term transversal optical sensor generally refers to a device which is adapted to determine a transversal position of at least one light beam traveling from the object to the detector. With regard to the term transversal position, reference may be made to the definition given above. Thus, preferably, the transversal position may be or may comprise at least one coordinate in at least one dimension perpendicular to an optical axis of the detector. As an example, the transversal position may be a position of a light spot generated by the light beam in a plane perpendicular to the optical axis, such as on a light-sensitive sensor surface of the transversal optical sensor. As an example, the position in the plane may be given in Cartesian coordinates and/or polar coordinates. Other embodiments are feasible.

For potential embodiments of the transversal optical sensor, reference may be made to the position sensitive organic detector as disclosed in U.S. Pat. No. 6,995,445 and US 2007/0176165 A1. Further, reference may be made to WO2014/097181 A1, and one or more of the embodiments of the transversal optical sensors disclosed therein may also be used in the context of the present invention. However, other embodiments are feasible and will be outlined in further detail below.

It shall be noted that the at least one optional transversal optical sensor may be embodied as at least one separate component of the detector, which may form an independent component separate from the at least one longitudinal optical sensor. Additionally or alternatively, however, the at least one transversal optical sensor may also be fully or partially embodied identical and/or to the at least one longitudinal optical sensor and/or may fully or partially be integrated into the at least one longitudinal optical sensor.

The at least one transversal sensor signal generally may be an arbitrary signal indicative of the transversal position. As an example, the transversal sensor signal may be or may comprise a digital and/or an analog signal. As an example, the transversal sensor signal may be or may comprise a voltage signal and/or a current signal. Additionally or alternatively, the transversal sensor signal may be or may comprise digital data. The transversal sensor signal may comprise a single signal value and/or a series of signal values. The transversal sensor signal may further comprise an arbitrary signal which is derived by combining two or more individual signals, such as by averaging two or more signals and/or by forming a quotient of two or more signals, as will be outlined in further detail below.

Thus, as an example, the detector according to the present invention may comprise a stack of optical sensors as disclosed in WO 2012/110924 A1, in combination with one or more transversal optical sensors. As an example, one or more transversal optical sensors may be disposed on a side of the stack of longitudinal optical sensors facing towards the object. Alternatively or additionally, one or more transversal optical sensors may be disposed on a side of the stack of longitudinal optical sensors facing away from the object. Again, additionally or alternatively, one or more transversal optical sensors may be interposed in between the longitudinal optical sensors of the stack.

As will further be outlined below, preferably, both the at least one transversal optical sensor longitudinal optical sensor and the at least one longitudinal optical sensor may comprise one or more photo detectors, preferably one or more organic photodetectors and, most preferably, one or more dye-sensitized organic solar cells (DSCs, also referred to as dye solar cells), such as one or more solid dye-sensitized organic solar cells (sDSCs). Thus, preferably, the detector may comprise one or more DSCs (such as one or more sDSCs) acting as the at least one transversal optical sensor and one or more DSCs (such as one or more sDSCs) acting as the at least one longitudinal optical sensor, preferably a stack of a plurality of DSCs (preferably a stack of a plurality of sDSCs) acting as the at least one longitudinal optical sensor.

In case at least one transversal optical sensor is provided, preferably, the transversal optical sensor is a photo detector having at least one first electrode, at least one second electrode and at least one photovoltaic material, wherein the photovoltaic material is embedded in between the first electrode and the second electrode. As used herein, a photovoltaic material generally is a material or combination of materials adapted to generate electric charges in response to an illumination of the photovoltaic material with light.

Preferably, the second electrode of the transversal optical sensor may be a split electrode having at least two partial electrodes, wherein the transversal optical sensor has a sensor area, wherein the at least one transversal sensor signal indicates a position of the light beam in the sensor area. Thus, as outlined above, the transversal optical sensor may be or may comprise one or more photo detectors, preferably one or more organic photo detectors, more preferably one or more DSCs or sDSCs. The sensor area may be a surface of the photo detector facing towards the object. The sensor area preferably may be oriented perpendicular to the optical axis. Thus, the transversal sensor signal may indicate a position of a light spot generated by the light beam in a plane of the sensor area of the transversal optical sensor.

Generally, as used herein, the term partial electrode refers to an electrode out of a plurality of electrodes, adapted for measuring at least one current and/or voltage signal, preferably independent from other partial electrodes. Thus, in case a plurality of partial electrodes is provided, the second electrode is adapted to provide a plurality of electric potentials and/or electric currents and/or voltages via the at least two partial electrodes, which may be measured and/or used independently.

When using at least one transversal optical sensor having at least one split electrode having two or more partial electrodes as a second electrode, currents through the partial electrodes may be dependent on a position of the light beam in the sensor area. This may generally be due to the fact that Ohmic losses or resistive losses may occur on the way from a location of generation of electrical charges due to the impinging light to the partial electrodes. Thus, besides the partial electrodes, the second electrode may comprise one or more additional electrode materials connected to the partial electrodes, wherein the one or more additional electrode materials provide an electrical resistance. Thus, due to the Ohmic losses on the way from the location of generation of the electric charges to the partial electrodes through with the one or more additional electrode materials, the currents through the partial electrodes depend on the location of the generation of the electric charges and, thus, to the position of the light beam in the sensor area. For details of this principle of determining the position of the light beam in the sensor area, reference may be made to the preferred embodiments below and/or to the physical principles and device options as disclosed e.g. in U.S. Pat. No. 6,995,445 and/or US 2007/0176165 A1.

The transversal optical sensor may further be adapted to generate the transversal sensor signal in accordance with the electrical currents through the partial electrodes. Thus, a ratio of electric currents through two horizontal partial electrodes may be formed, thereby generating an x-coordinate, and/or a ratio of electric currents through to vertical partial electrodes may be formed, thereby generating a y-coordinate. The detector, preferably the transversal optical sensor and/or the evaluation device, may be adapted to derive the information on the transversal position of the object from at least one ratio of the currents through the partial electrodes. Other ways of generating position coordinates by comparing currents through the partial electrodes are feasible.

The partial electrodes generally may be defined in various ways, in order to determine a position of the light beam in the sensor area. Thus, two or more horizontal partial electrodes may be provided in order to determine a horizontal coordinate or x-coordinate, and two or more vertical partial electrodes may be provided in order to determine a vertical coordinate or y-coordinate. Thus, the partial electrodes may be provided at a rim of the sensor area, wherein an interior space of the sensor area remains free and may be covered by one or more additional electrode materials. As will be outlined in further detail below, the additional electrode material preferably may be a transparent additional electrode material, such as a transparent metal and/or a transparent conductive oxide and/or, most preferably, a transparent conductive polymer.

Further preferred embodiments may refer to the photovoltaic material. Thus, the photovoltaic material of the transversal optical sensor may comprise at least one organic photovoltaic material. Thus, generally, the transversal optical sensor may be an organic photo detector. Preferably, the organic photo detector may be a dye-sensitized solar cell. The dye-sensitized solar cell preferably may be a solid dye-sensitized solar cell, comprising a layer setup embedded in between the first electrode and the second electrode, the layer setup comprising at least one n-semiconducting metal oxide, at least one dye, and at least one solid p-semiconducting organic material. Further details and optional embodiments of the dye-sensitized solar cell (DSC) will be disclosed below.

The at least one first electrode of the transversal optical sensor preferably is transparent. As used in the present invention, the term transparent generally refers to the fact that the intensity of light after transmission through the transparent object equals to or exceeds 10%, preferably 40% and, more preferably, 60% of the intensity of light before transmission through the transparent object. More preferably, the at least one first electrode of the transversal optical sensor may fully or partially be made of at least one transparent conductive oxide (TCO). As an example, indium-doped tin oxide (ITO) and/or fluorine-doped tin oxide (FTO) may be named. Further examples will be given below.

Further, the at least one second electrode of the transversal optical sensor preferably may fully or partially be transparent. Thus, specifically, the at least one second electrode may comprise two or more partial electrodes and at least one additional electrode material contacting the two or more partial electrodes. The two or more partial electrodes may be intransparent. It may be especially preferable to make the final electrode intransparent, as this electrode can then be optimized to convert all remaining light into a sensor signal. Herein, the "final" electrode may be the electrode of the at least one transversal optical sensor facing away from the object. Generally, intransparent electrodes are more efficient than transparent electrodes.

Thus, it is generally beneficial to reduce the number of transparent sensors and/or the number of transparent electrodes to a minimum. In this context, as an example, reference may be made to the potential setups of the at least one transversal optical sensor as shown in WO2014/097181 A1. Other setups, however, are feasible.

As an example, the two or more partial electrodes may fully or partially be made of a metal. Thus, the two or more partial electrodes preferably are located at a rim of the sensor area. The two or more partial electrodes, however, may electrically be connected by the at least one additional electrode material which, preferably, is transparent. Thus, the second electrode may comprise an intransparent rim having the two or more partial electrodes and a transparent inner area having the at least one transparent additional electrode material. More preferably, the at least one second electrode of the transversal optical sensor, such as the above-mentioned at least one additional electrode material, may fully or partially be made of at least one conductive polymer, preferably a transparent conductive polymer. As an example, conductive polymers having an electrical conductivity of at least 0.01 S/cm may be used, preferably of at least 0.1 S/cm or, more preferably, of at least 1 S/cm or even at least 10 S/cm or at least 100 S/cm. As an example, the at least one conductive polymer may be selected from the group consisting of: a poly-3,4-ethylenedioxythiophene (PEDOT), preferably PEDOT being electrically doped with at least one counter ion, more preferably PEDOT doped with sodium polystyrene sulfonate (PEDOT:PSS); a polyaniline (PANI); a polythiophene.

As outlined above, the conductive polymer may provide an electrical connection between the at least two partial electrodes. The conductive polymer may provide an Ohmic resistivity, allowing for determining the position of charge generation. Preferably, the conductive polymer provides an electric resistivity of 0.1-20 kΩ between the partial electrodes, preferably an electric resistivity of 0.5-5.0 kΩ and, more preferably, an electric resistivity of 1.0-3.0 kΩ.

Generally, as used herein, a conductive material may be a material which have a specific electrical resistance of less than $10^4$, less than $10^3$, less than $10^2$, or of less than 10 Ωm. Preferably, the conductive material has a specific electrical resistance of less than $10^{-1}$, less than $10^{-2}$, less than $10^{-3}$, less than $10^{-5}$, or less than $10^{-6}$ Ωm. Most preferably, the specific electrical resistance of the conductive material is less than $5\times10^{-7}$ Ωm or is less than $1\times10^{-7}$ Ωm, particularly in the range of the specific electrical resistance of aluminum.

As outlined above, preferably, at least one of the transversal optical sensor and the longitudinal optical sensor is a transparent optical sensor. Thus, the at least one transversal optical sensor may be a transparent transversal optical sensor and/or may comprise at least one transparent transversal optical sensor. Additionally or alternatively, the at least one longitudinal optical sensor may be a transparent longitudinal optical sensor and/or may comprise at least one transparent longitudinal optical sensor. In case a plurality of longitudinal optical sensors is provided, such as a stack of longitudinal optical sensors, preferably all longitudinal optical sensors of the plurality and/or the stack or all longitudinal optical sensors of the plurality and/or the stack but one longitudinal optical sensor are transparent. As an example, in case a stack of longitudinal optical sensors is provided, wherein the longitudinal optical sensors are arranged along the optical axis of the detector, preferably all longitudinal optical sensors but the last longitudinal optical sensor facing away from the object may be transparent longitudinal optical sensors. The last longitudinal optical sensor, i.e. the longitudinal optical sensor on the side of the stack facing away from the object, may be a transparent longitudinal optical sensor or an intransparent longitudinal optical sensor. Exemplary embodiments will be given below.

The light beam may pass through the transparent optical sensor before impinging on the other one of the transversal optical sensor and the longitudinal optical sensor. Thus, the light beam from the object may subsequently reach the transversal optical sensor and the longitudinal optical sensor or vice versa.

Preferably, specifically in case one or more of the longitudinal optical sensors provides that the above-mentioned FiP-effect, the at least one longitudinal optical sensor or, in case a plurality of longitudinal optical sensors provided, one or more of the longitudinal optical sensors, may be or may comprise a DSC, preferably a sDSC. As used herein, a DSC generally refers to a setup having at least two electrodes, wherein at least one of the electrodes is at least partially transparent, wherein at least one n-semiconducting metal oxide, at least one dye and at least one electrolyte or p-semiconducting material is embedded in between the electrodes. In an sDSC, the electrolyte or p-semiconducting material is a solid material. Generally, for potential setups of sDSCs which may also be used for one or more of the optical sensors within the present invention, reference may be made to one or more of WO 2012/110924 A1, U.S. provisional applications 61/739,173 and 61/749,964, EP 13171898.3, EP 13171900.7 or EP 13171901.5. Other embodiments are feasible. The above-mentioned FiP-effect, as demonstrated in WO 2012/110924 A1, specifically may be present in sDSCs.

Thus, generally, the at least one longitudinal optical sensor may comprise at least one longitudinal optical sensor having a layer setup. The longitudinal optical sensor may comprise at least one first electrode, at least one n-semiconducting metal oxide, at least one dye, at least one p-semiconducting organic material, preferably a solid p-semiconducting organic material, and at least one second electrode. Both of the first electrode and the second electrode may be transparent.

As outlined above, the at least one longitudinal optical sensor or, in case a plurality of longitudinal optical sensors is provided, at least one of the longitudinal optical sensors may be an organic optical sensor comprising a photosensitive layer setup having at least two electrodes and at least one photovoltaic material embedded in between these electrodes. In the following, examples of a preferred setup of the photosensitive layer setup will be given, specifically with regard to materials which may be used within this photosensitive layer setup. The photosensitive layer setup preferably is a photosensitive layer setup of a solar cell, more preferably an organic solar cell and/or a dye-sensitized solar cell (DSC), more preferably a solid dye-sensitized solar cell (sDSC). Other embodiments, however, are feasible.

Preferably, the photosensitive layer setup comprises at least one photovoltaic material, such as at least one photovoltaic layer setup comprising at least two layers, sandwiched between the first electrode and the second electrode. Preferably, the photosensitive layer setup and the photovoltaic material comprise at least one layer of an n-semiconducting metal oxide, at least one dye and at least one p-semiconducting organic material. As an example, the photovoltaic material may comprise a layer setup having at least one dense layer of an n-semiconducting metal oxide such as titanium dioxide, at least one nano-porous layer of an n-semiconducting metal oxide contacting the dense layer of the n-semiconducting metal oxide, such as at least one nano-porous layer of titanium dioxide, at least one dye sensitizing the nano-porous layer of the n-semiconducting metal oxide, preferably an organic dye, and at least one layer of at least one p-semiconducting organic material, contacting the dye and/or the nano-porous layer of the n-semiconducting metal oxide.

The dense layer of the n-semiconducting metal oxide, as will be explained in further detail below, may form at least one barrier layer in between the first electrode and the at least one layer of the nano-porous n-semiconducting metal oxide. It shall be noted, however, that other embodiments are feasible, such as embodiments having other types of buffer layers.

The at least two electrodes comprise at least one first electrode and at least one second electrode. The first electrode may be one of an anode or a cathode, preferably an anode. The second electrode may be the other one of an anode or a cathode, preferably a cathode. The first electrode preferably contacts the at least one layer of the n-semiconducting metal oxide, and the second electrode preferably contacts the at least one layer of the p-semiconducting organic material. The first electrode may be a bottom electrode, contacting a substrate, and the second electrode may be a top electrode facing away from the substrate. Alternatively, the second electrode may be a bottom electrode, contacting the substrate, and the first electrode may be the top electrode facing away from the substrate. Preferably, both the first electrode and the second electrode are transparent.

In the following, some options regarding the first electrode, the second electrode and the photovoltaic material, preferably the layer setup comprising two or more photovoltaic materials, will be disclosed. It shall be noted, however, that other embodiments are feasible.

a) Substrate, First Electrode and n-Semiconductive Metal Oxide

Generally, for preferred embodiments of the first electrode and the n-semiconductive metal oxide, reference may be made to WO 2012/110924 A1, U.S. provisional application No. 61/739,173 or U.S. provisional application No. 61/708,058, the full content of all of which is herewith included by reference. Other embodiments are feasible.

In the following, it shall be assumed that the first electrode is the bottom electrode directly or indirectly contacting the substrate. It shall be noted, however, that other setups are feasible, with the first electrode being the top electrode.

The n-semiconductive metal oxide which may be used in the photosensitive layer setup, such as in at least one dense film (also referred to as a solid film) of the n-semiconductive metal oxide and/or in at least one nano-porous film (also referred to as a nano-particulate film) of the n-semiconductive metal oxide, may be a single metal oxide or a mixture of different oxides. It is also possible to use mixed oxides. The n-semiconductive metal oxide may especially be porous and/or be used in the form of a nanoparticulate oxide, nanoparticles in this context being understood to mean particles which have an average particle size of less than 0.1 micrometer. A nanoparticulate oxide is typically applied to a conductive substrate (i.e. a carrier with a conductive layer as the first electrode) by a sintering process as a thin porous film with large surface area.

Preferably, the longitudinal optical sensor uses at least one transparent substrate. The substrate may be rigid or else flexible. Suitable substrates (also referred to hereinafter as carriers) are, as well as metal foils, in particular plastic sheets or films and especially glass sheets or glass films. Particularly suitable electrode materials, especially for the first electrode according to the above-described, preferred structure, are conductive materials, for example transparent conductive oxides (TCOs), for example fluorine- and/or indium-doped tin oxide (FTO or ITO) and/or aluminum-doped zinc oxide (AZO), carbon nanotubes or metal films. Alternatively or additionally, it would, however, also be possible to use thin metal films which still have a sufficient transparency.

The substrate can be covered or coated with these conductive materials. Since generally, only a single substrate is required in the structure proposed, the formation of flexible cells is also possible. This enables a multitude of end uses which would be achievable only with difficulty, if at all, with rigid substrates, for example use in bank cards, garments, etc.

The first electrode, especially the TCO layer, may additionally be covered or coated with a solid or dense metal oxide buffer layer (for example of thickness 10 to 200 nm), in order to prevent direct contact of the p-type semiconductor with the TCO layer (see Peng et al., Coord. Chem. Rev. 248, 1479 (2004)). The use of solid p-semiconducting electrolytes, in the case of which contact of the electrolyte with the first electrode is greatly reduced compared to liquid or gel-form electrolytes, however, makes this buffer layer unnecessary in many cases, such that it is possible in many cases to dispense with this layer, which also has a current-limiting effect and can also worsen the contact of the n-semiconducting metal oxide with the first electrode. This enhances the efficiency of the components. On the other hand, such a buffer layer can in turn be utilized in a controlled manner in order to match the current component of the dye solar cell to the current component of the organic solar cell. In addition, in the case of cells in which the buffer layer has been dispensed with, especially in solid cells, problems frequently occur with unwanted recombinations of charge carriers. In this respect, buffer layers are advantageous in many cases specifically in solid cells.

As is well known, thin layers or films of metal oxides are generally inexpensive solid semiconductor materials (n-type semiconductors), but the absorption thereof, due to large bandgaps, is typically not within the visible region of the electromagnetic spectrum, but rather usually in the ultraviolet spectral region. For use in solar cells, the metal oxides therefore generally, as is the case in the dye solar cells, have to be combined with a dye as a photosensitizer, which absorbs in the wavelength range of sunlight, i.e. at 300 to 2000 nm, and, in the electronically excited state, injects electrons into the conduction band of the semiconductor. With the aid of a solid p-type semiconductor used additionally in the cell as an electrolyte, which is in turn reduced at the counter electrode, electrons can be recycled to the sensitizer, such that it is regenerated.

Of particular interest for use in organic solar cells are the semiconductors zinc oxide, tin dioxide, titanium dioxide or mixtures of these metal oxides. The metal oxides can be used in the form of nanocrystalline porous layers. These layers have a large surface area which is coated with the dye as a sensitizer, such that a high absorption of sunlight is achieved. Metal oxide layers which are structured, for example nanorods, give advantages such as higher electron mobilities or improved pore filling by the dye.

The metal oxide semiconductors can be used alone or in the form of mixtures. It is also possible to coat a metal oxide with one or more other metal oxides. In addition, the metal oxides may also be applied as a coating to another semiconductor, for example GaP, ZnP or ZnS.

Particularly preferred semiconductors are zinc oxide and titanium dioxide in the anatase polymorph, which is preferably used in nanocrystalline form.

In addition, the sensitizers can advantageously be combined with all n-type semiconductors which typically find use in these solar cells. Preferred examples include metal oxides used in ceramics, such as titanium dioxide, zinc oxide, tin(IV) oxide, tungsten(VI) oxide, tantalum(V) oxide, niobium(V) oxide, cesium oxide, strontium titanate, zinc stannate, complex oxides of the perovskite type, for example barium titanate, and binary and ternary iron oxides, which may also be present in nanocrystalline or amorphous form.

Due to the strong absorption that customary organic dyes and ruthenium, phthalocyanines and porphyrins have, even thin layers or films of the n-semiconducting metal oxide are sufficient to absorb the required amount of dye. Thin metal oxide films in turn have the advantage that the probability of unwanted recombination processes falls and that the internal resistance of the dye subcell is reduced. For the n-semiconducting metal oxide, it is possible with preference to use layer thicknesses of 100 nm up to 20 micrometers, more preferably in the range between 500 nm and approx. 3 micrometers.

b) Dye

In the context of the present invention, as usual in particular for DSCs, the terms "dye", "sensitizer dye" and "sensitizer" are used essentially synonymously without any restriction of possible configurations. Numerous dyes which are usable in the context of the present invention are known from the prior art, and so, for possible material examples, reference may also be made to the above description of the prior art regarding dye solar cells. As a preferred example, one or more of the dyes disclosed in WO 2012/110924 A1, U.S. provisional application No. 61/739,173 or U.S. provisional application No. 61/708,058 may be used, the full content of all of which is herewith included by reference. Additionally or alternatively, one or more of the dyes as disclosed in WO 2007/054470 A1 and/or WO 2012/085803 A1 may be used, the full content of which is included by reference, too.

Dye-sensitized solar cells based on titanium dioxide as a semiconductor material are described, for example, in U.S. Pat. No. 4,927,721, Nature 353, p. 737-740 (1991) and U.S. Pat. No. 5,350,644, and also Nature 395, p. 583-585 (1998) and EP-A-1 176 646. The dyes described in these documents can in principle also be used advantageously in the context of the present invention. These dye solar cells preferably comprise monomolecular films of transition metal complexes, especially ruthenium complexes, which are bonded to the titanium dioxide layer via acid groups as sensitizers.

Many sensitizers which have been proposed include metal-free organic dyes, which are likewise also usable in the context of the present invention. High efficiencies of more than 4%, especially in solid dye solar cells, can be achieved, for example, with indoline dyes (see, for example, Schmidt-Mende et al., Adv. Mater. 2005, 17, 813). U.S. Pat. No. 6,359,211 describes the use, also implementable in the context of the present invention, of cyanine, oxazine, thiazine and acridine dyes which have carboxyl groups bonded via an alkylene radical for fixing to the titanium dioxide semiconductor.

Particularly preferred sensitizer dyes in the dye solar cell proposed are the perylene derivatives, terrylene derivatives and quaterrylene derivatives described in DE 10 2005 053 995 A1 or WO 2007/054470 A1. Further, as outlined above, one or more of the dyes as disclosed in WO 2012/085803 A1 may be used. Additionally or alternatively, one or more of the dyes as disclosed in WO 2013/144177 A1 may be used. The full content of WO 2013/144177 A1 and/or of EP 12162526.3 is herewith included by reference. Specifically, dye D-5 and/or dye R-3 may be used, which is also referred to as ID1338:

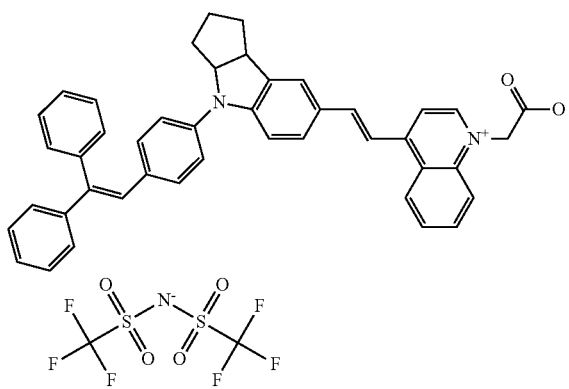

Preparation and properties of the Dye D-5 are disclosed in WO 2013/144177 A1.

The use of these dyes, which is also possible in the context of the present invention, leads to photovoltaic elements with high efficiencies and simultaneously high stabilities.

The rylenes exhibit strong absorption in the wavelength range of sunlight and can, depending on the length of the conjugated system, cover a range from about 400 nm (perylene derivatives I from DE 10 2005 053 995 A1) up to about 900 nm (quaterrylene derivatives I from DE 10 2005 053 995 A1). Rylene derivatives I based on terrylene absorb, according to the composition thereof, in the solid state adsorbed onto titanium dioxide, within a range from about 400 to 800 nm. In order to achieve very substantial utilization of the incident sunlight from the visible into the near infrared region, it is advantageous to use mixtures of different rylene derivatives I. Occasionally, it may also be advisable also to use different rylene homologs.

The rylene derivatives I can be fixed easily and in a permanent manner to the n-semiconducting metal oxide film. The bonding is effected via the anhydride function (x1) or the carboxyl groups —COOH or —COO— formed in situ, or via the acid groups A present in the imide or condensate radicals ((x2) or (x3)). The rylene derivatives I described in DE 10 2005 053 995 A1 have good suitability for use in dye-sensitized solar cells in the context of the present invention.

Especially preferred rylene dyes are ID1187:

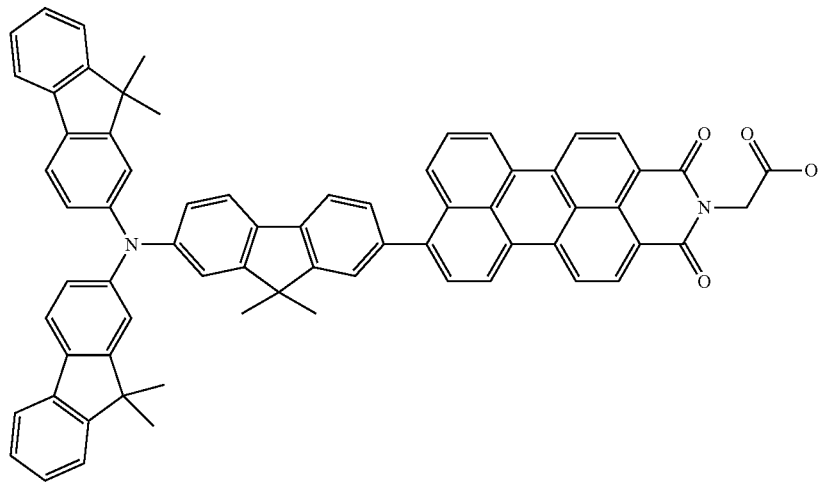 [SMILES: CC1(C)c2ccccc2-c2ccc(N(c3ccc4c(c3)C(C)(C)c3ccccc3-4)c3ccc4c(c3)C(C)(C)c3cc(-c5ccc6c7ccc8c9c(ccc(c%10cccc5c%106)c97)C(=O)N(CC(=O)O)C8=O)ccc3-4)cc21]

and/or ID1167:

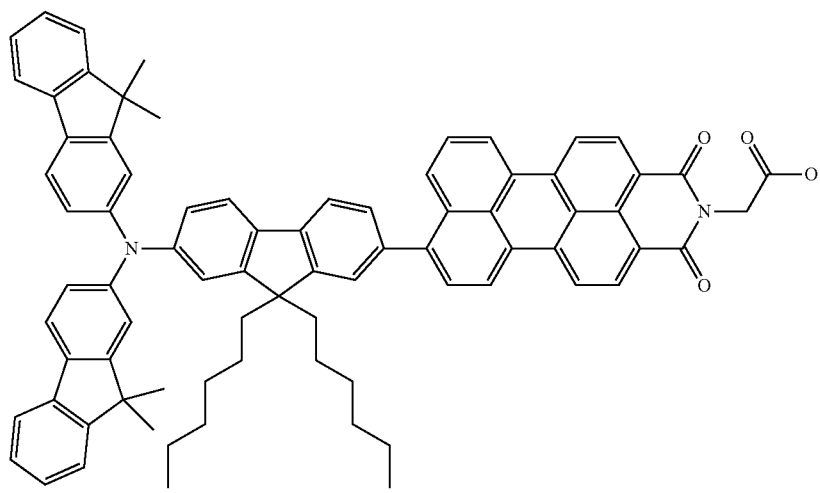 [SMILES: CCCCCCC1(CCCCCC)c2cc(-c3ccc4c5ccc6c7c(ccc(c8cccc3c84)c75)C(=O)N(CC(=O)O)C6=O)ccc2-c2ccc(N(c3ccc4c(c3)C(C)(C)c3ccccc3-4)c3ccc4c(c3)C(C)(C)c3ccccc3-4)cc21]

It is particularly preferred when the dyes, at one end of the molecule, have an anchor group which enables the fixing thereof to the n-type semiconductor film. At the other end of the molecule, the dyes preferably comprise electron donors Y which facilitate the regeneration of the dye after the electron release to the n-type semiconductor, and also prevent recombination with electrons already released to the semiconductor.

For further details regarding the possible selection of a suitable dye, it is possible, for example, again to refer to DE 10 2005 053 995 A1. By way of example, it is possible especially to use ruthenium complexes, porphyrins, other organic sensitizers, and preferably rylenes.

The dyes can be fixed onto or into the n-semiconducting metal oxide film, such as the nano-porous n-semiconducting metal oxide layer, in a simple manner. For example, the n-semiconducting metal oxide films can be contacted in the freshly sintered (still warm) state over a sufficient period (for example about 0.5 to 24 h) with a solution or suspension of the dye in a suitable organic solvent. This can be accomplished, for example, by immersing the metal oxide-coated substrate into the solution of the dye.

If combinations of different dyes are to be used, they may, for example, be applied successively from one or more solutions or suspensions which comprise one or more of the dyes. It is also possible to use two dyes which are separated by a layer of, for example, CuSCN (on this subject see, for example, Tennakone, K. J., Phys. Chem. B. 2003, 107, 13758). The most convenient method can be determined comparatively easily in the individual case.

In the selection of the dye and of the size of the oxide particles of the n-semiconducting metal oxide, the organic solar cell should be configured such that a maximum amount of light is absorbed. The oxide layers should be structured such that the solid p-type semiconductor can efficiently fill the pores. For instance, smaller particles have greater surface areas and are therefore capable of adsorbing a greater amount of dyes. On the other hand, larger particles generally have larger pores which enable better penetration through the p-conductor.

c) p-Semiconducting Organic Material

As described above, the at least one photosensitive layer setup, such as the photosensitive layer setup of the DSC or sDSC, can comprise in particular at least one p-semiconducting organic material, preferably at least one solid p-semiconducting material, which is also designated hereinafter as p-type semiconductor or p-type conductor. Hereinafter, a description is given of a series of preferred examples of such organic p-type semiconductors which can be used individually or else in any desired combination, for example in a combination of a plurality of layers with a respective p-type semiconductor, and/or in a combination of a plurality of p-type semiconductors in one layer.

In order to prevent recombination of the electrons in the n-semiconducting metal oxide with the solid p-conductor, it is possible to use, between the n-semiconducting metal oxide and the p-type semiconductor, at least one passivating layer which has a passivating material. This layer should be very thin and should as far as possible cover only the as yet uncovered sites of the n-semiconducting metal oxide. The passivation material may, under some circumstances, also be applied to the metal oxide before the dye. Preferred passivation materials are especially one or more of the following substances: $Al_2O_3$; silanes, for example $CH_3SiCl_3$; $Al^{3+}$; 4-tert-butylpyridine (TBP); MgO; GBA (4-guanidinobutyric acid) and similar derivatives; alkyl acids; hexadecylmalonic acid (HDMA).

As described above, preferably one or more solid organic p-type semiconductors are used—alone or else in combination with one or more further p-type semiconductors which are organic or inorganic in nature. In the context of the present invention, a p-type semiconductor is generally understood to mean a material, especially an organic material, which is capable of conducting holes, that is to say positive charge carriers. More particularly, it may be an organic material with an extensive π-electron system which can be oxidized stably at least once, for example to form what is called a free-radical cation. For example, the p-type semiconductor may comprise at least one organic matrix material which has the properties mentioned. Furthermore, the p-type semiconductor can optionally comprise one or a plurality of dopants which intensify the p-semiconducting properties. A significant parameter influencing the selection of the p-type semiconductor is the hole mobility, since this partly determines the hole diffusion length (cf. Kumara, G., Langmuir, 2002, 18, 10493-10495). A comparison of charge carrier mobilities in different spiro compounds can be found, for example, in T. Saragi, Adv. Funct. Mater. 2006, 16, 966-974.

Preferably, in the context of the present invention, organic semiconductors are used (i.e. one or more of low molecular weight, oligomeric or polymeric semiconductors or mixtures of such semiconductors). Particular preference is given to p-type semiconductors which can be processed from a liquid phase. Examples here are p-type semiconductors based on polymers such as polythiophene and polyarylamines, or on amorphous, reversibly oxidizable, nonpolymeric organic compounds, such as the spirobifluorenes mentioned at the outset (cf., for example, US 2006/0049397 and the spiro compounds disclosed therein as p-type semiconductors, which are also usable in the context of the present invention). Preference is also given to using low molecular weight organic semiconductors, such as the low molecular weight p-type semiconducting materials as disclosed in WO 2012/110924 A1, preferably spiro-MeOTAD, and/or one or more of the p-type semiconducting materials disclosed in Leijtens et al., ACS Nano, VOL. 6, NO. 2, 1455-1462 (2012). Additionally or alternatively, one or more of the p-type semiconducting materials as disclosed in WO 2010/094636 A1 may be used, the full content of which is herewith included by reference. In addition, reference may also be made to the remarks regarding the p-semiconducting materials and dopants from the above description of the prior art.

The p-type semiconductor is preferably producible or produced by applying at least one p-conducting organic material to at least one carrier element, wherein the application is effected for example by deposition from a liquid phase comprising the at least one p-conducting organic material. The deposition can in this case once again be effected, in principle, by any desired deposition process, for example by spin-coating, doctor blading, knife-coating, printing or combinations of the stated and/or other deposition methods.

The organic p-type semiconductor may especially comprise at least one spiro compound such as spiro-MeOTAD and/or at least one compound with the structural formula:

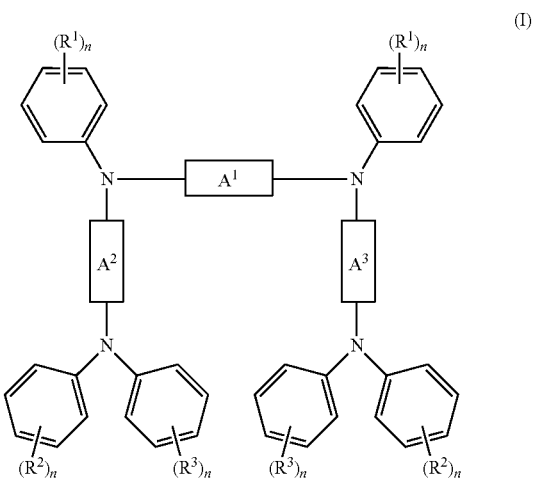

(I)

in which $A^1$, $A^2$, $A^3$ are each independently optionally substituted aryl groups or heteroaryl groups, $R^1$, $R^2$, $R^3$ are each independently selected from the group consisting of the substituents —R, —OR, —NR$_2$, -A$^4$-OR and -A$^4$-NR$_2$, where R is selected from the group consisting of alkyl, aryl and heteroaryl, and where $A^4$ is an aryl group or heteroaryl group, and where n at each instance in formula I is independently a value of 0, 1, 2 or 3, with the proviso that the sum of the individual n values is at least 2 and at least two of the $R^1$, $R^2$ and $R^3$ radicals are —OR and/or —NR$_2$.

Preferably, $A^2$ and $A^3$ are the same; accordingly, the compound of the formula (I) preferably has the following structure (Ia)

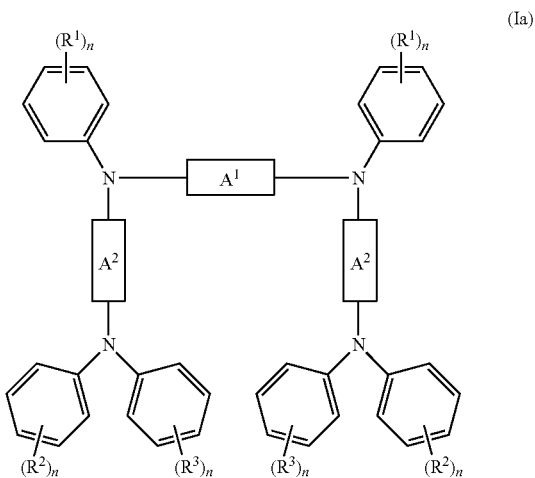

(Ia)

More particularly, as explained above, the p-type semiconductor may thus have at least one low molecular weight organic p-type semiconductor. A low molecular weight material is generally understood to mean a material which is present in monomeric, nonpolymerized or nonoligomerized form. The term "low molecular weight" as used in the present context preferably means that the p-type semiconductor has molecular weights in the range from 100 to 25 000 g/mol. Preferably, the low molecular weight substances have molecular weights of 500 to 2000 g/mol.

In general, in the context of the present invention, p-semiconducting properties are understood to mean the property of materials, especially of organic molecules, to form holes and to transport these holes and/or to pass them on to adjacent molecules. More particularly, stable oxidation of these molecules should be possible. In addition, the low molecular weight organic p-type semiconductors mentioned may especially have an extensive π-electron system. More particularly, the at least one low molecular weight p-type semiconductor may be processable from a solution. The low molecular weight p-type semiconductor may especially comprise at least one triphenylamine. It is particularly preferred when the low molecular weight organic p-type semiconductor comprises at least one spiro compound. A spiro compound is understood to mean polycyclic organic compounds whose rings are joined only at one atom, which is also referred to as the Spiro atom. More particularly, the spiro atom may be sp$^3$-hybridized, such that the constituents of the spiro compound connected to one another via the Spiro atom are, for example, arranged in different planes with respect to one another.

More preferably, the Spiro compound has a structure of the following formula:

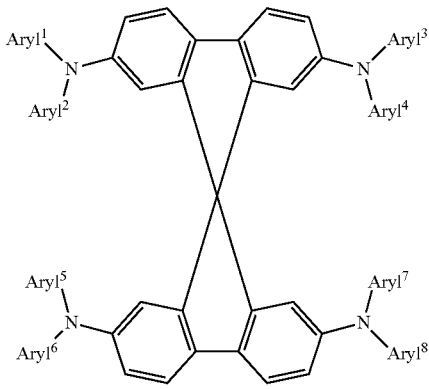

where the aryl$^1$, aryl$^2$, aryl$^3$, aryl$^4$, aryl$^5$, aryl$^6$, aryl$^7$ and aryl$^8$ radicals are each independently selected from substituted aryl radicals and heteroaryl radicals, especially from substituted phenyl radicals, where the aryl radicals and heteroaryl radicals, preferably the phenyl radicals, are each independently substituted, preferably in each case by one or more substituents selected from the group consisting of —O-alkyl, —OH, —F, —Cl, —Br and —I, where alkyl is preferably methyl, ethyl, propyl or isopropyl. More preferably, the phenyl radicals are each independently substituted, in each case by one or more substituents selected from the group consisting of —O-Me, —OH, —F, —Cl, —Br and —I.

Further preferably, the spiro compound is a compound of the following formula:

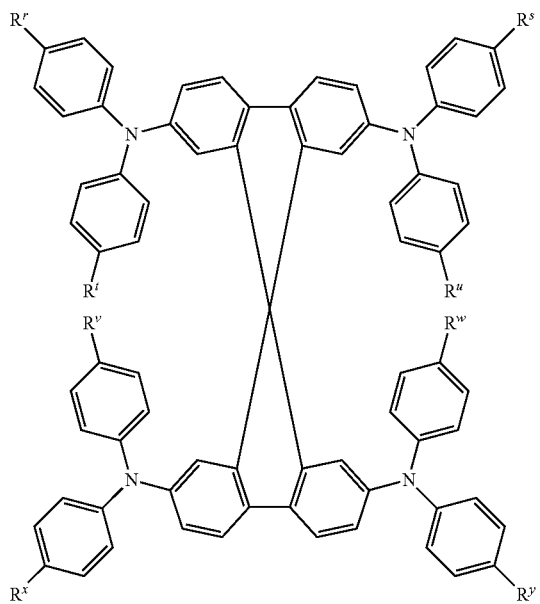

where R$^r$, R$^s$, R$^t$, R$^u$, R$^v$, R$^w$, R$^x$ and R$^y$ are each independently selected from the group consisting of —O-alkyl, —OH, —F, —Cl, —Br and —I, where alkyl is preferably methyl, ethyl, propyl or isopropyl. More preferably, R$^r$, R$^s$, R$^t$, R$^u$, R$^v$, R$^w$, R$^x$ and R$^y$ are each independently selected from the group consisting of —O-Me, —OH, —F, —Cl, —Br and —I.

More particularly, the p-type semiconductor may comprise spiro-MeOTAD or consist of spiro-MeOTAD, i.e. a compound of the formula below, commercially available from Merck KGaA, Darmstadt, Germany:

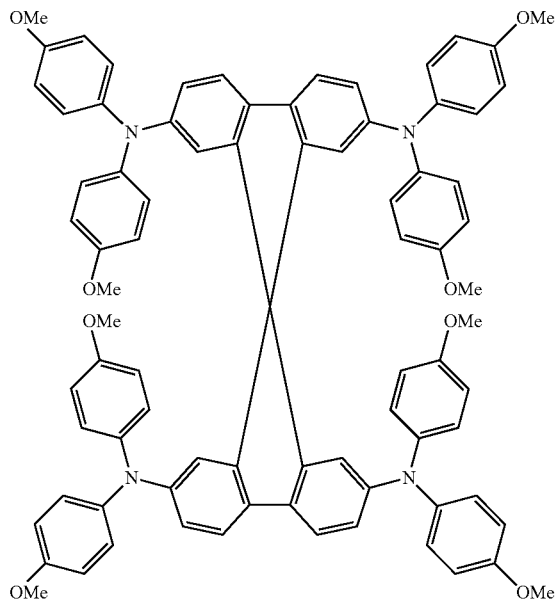 [SMILES: COc1ccc(N(c2ccc(OC)cc2)c2ccc3c(c2)C2(c4cc(N(c5ccc(OC)cc5)c5ccc(OC)cc5)ccc4-3)c3cc(N(c4ccc(OC)cc4)c4ccc(OC)cc4)ccc3-c3ccc(N(c4ccc(OC)cc4)c4ccc(OC)cc4)cc32)cc1]

Alternatively or additionally, it is also possible to use other p-semiconducting compounds, especially low molecular weight and/or oligomeric and/or polymeric p-semiconducting compounds.

In an alternative embodiment, the low molecular weight organic p-type semiconductor comprises one or more compounds of the above-mentioned general formula I, for which reference may be made, for example, to PCT application number PCT/EP2010/051826. The p-type semiconductor may comprise the at least one compound of the above-mentioned general formula I additionally or alternatively to the Spiro compound described above.

The term "alkyl" or "alkyl group" or "alkyl radical" as used in the context of the present invention is understood to mean substituted or unsubstituted $C_1$-$C_{20}$-alkyl radicals in general. Preference is given to $C_1$- to $C_{10}$-alkyl radicals, particular preference to $C_1$- to $C_8$-alkyl radicals. The alkyl radicals may be either straight-chain or branched. In addition, the alkyl radicals may be substituted by one or more substituents selected from the group consisting of $C_1$-$C_{20}$-alkoxy, halogen, preferably F, and $C_6$-$C_{30}$-aryl which may in turn be substituted or unsubstituted. Examples of suitable alkyl groups are methyl, ethyl, propyl, butyl, pentyl, hexyl, heptyl and octyl, and also isopropyl, isobutyl, isopentyl, sec-butyl, tert-butyl, neopentyl, 3,3-dimethylbutyl, 2-ethylhexyl, and also derivatives of the alkyl groups mentioned substituted by $C_6$-$C_{30}$-aryl, $C_1$-$C_{20}$-alkoxy and/or halogen, especially F, for example $CF_3$.

The term "aryl" or "aryl group" or "aryl radical" as used in the context of the present invention is understood to mean optionally substituted $C_6$-$C_{30}$-aryl radicals which are derived from monocyclic, bicyclic, tricyclic or else multicyclic aromatic rings, where the aromatic rings do not comprise any ring heteroatoms. The aryl radical preferably comprises 5- and/or 6-membered aromatic rings. When the aryls are not monocyclic systems, in the case of the term "aryl" for the second ring, the saturated form (perhydro form) or the partly unsaturated form (for example the dihydro form or tetrahydro form), provided the particular forms are known and stable, is also possible. The term "aryl" in the context of the present invention thus comprises, for example, also bicyclic or tricyclic radicals in which either both or all three radicals are aromatic, and also bicyclic or tricyclic radicals in which only one ring is aromatic, and also tricyclic radicals in which two rings are aromatic. Examples of aryl are: phenyl, naphthyl, indanyl, 1,2-dihydronaphthenyl, 1,4-dihydronaphthenyl, fluorenyl, indenyl, anthracenyl, phenanthrenyl or 1,2,3,4-tetrahydronaphthyl. Particular preference is given to $C_6$-$C_{10}$-aryl radicals, for example phenyl or naphthyl, very particular preference to $C_6$-aryl radicals, for example phenyl. In addition, the term "aryl" also comprises ring systems comprising at least two monocyclic, bicyclic or multicyclic aromatic rings joined to one another via single or double bonds. One example is that of biphenyl groups.

The term "heteroaryl" or "heteroaryl group" or "heteroaryl radical" as used in the context of the present invention is understood to mean optionally substituted 5- or 6-membered aromatic rings and multicyclic rings, for example bicyclic and tricyclic compounds having at least one heteroatom in at least one ring. The heteroaryls in the context of the invention preferably comprise 5 to 30 ring atoms. They may be monocyclic, bicyclic or tricyclic, and some can be derived from the aforementioned aryl by replacing at least one carbon atom in the aryl base skeleton with a heteroatom. Preferred heteroatoms are N, O and S. The hetaryl radicals more preferably have 5 to 13 ring atoms. The base skeleton of the heteroaryl radicals is especially preferably selected from systems such as pyridine and five-membered heteroaromatics such as thiophene, pyrrole, imidazole or furan. These base skeletons may optionally be fused to one or two six-membered aromatic radicals. In addition, the term "heteroaryl" also comprises ring systems comprising at least two monocyclic, bicyclic or multicyclic aromatic rings joined to one another via single or double bonds, where at least one ring comprises a heteroatom. When the heteroaryls are not monocyclic systems, in the case of the term "heteroaryl" for at least one ring, the saturated form (perhydro form) or the partly unsaturated form (for example the dihydro form or tetrahydro form), provided the particular forms are known and stable, is also possible. The term "heteroaryl" in the context of the present invention thus comprises, for example, also bicyclic or tricyclic radicals in which either both or all three radicals are aromatic, and also bicyclic or tricyclic radicals in which only one ring is aromatic, and also tricyclic radicals in which two rings are aromatic, where at least one of the rings, i.e. at least one aromatic or one nonaromatic ring, has a heteroatom. Suitable fused heteroaromatics are, for example, carbazolyl, benzimidazolyl, benzofuryl, dibenzofuryl or dibenzothiophenyl. The base skeleton may be substituted at one, more than one or all substitutable positions, suitable substituents being the same as have already been specified under the definition of $C_6$-$C_{30}$-aryl. However, the hetaryl radicals are preferably unsubstituted. Suitable hetaryl radicals are, for example, pyridin-2-yl, pyridin-3-yl, pyridin-4-yl, thiophen-2-yl, thiophen-3-yl, pyrrol-2-yl, pyrrol-3-yl, furan-2-yl, furan-3-yl and imidazol-2-yl and the corresponding benzofused radicals, especially carbazolyl, benzimidazolyl, benzofuryl, dibenzofuryl or dibenzothiophenyl.

In the context of the invention, the term "optionally substituted" refers to radicals in which at least one hydrogen radical of an alkyl group, aryl group or heteroaryl group has been replaced by a substituent. With regard to the type of this substituent, preference is given to alkyl radicals, for example methyl, ethyl, propyl, butyl, pentyl, hexyl, heptyl and octyl, and also isopropyl, isobutyl, isopentyl, sec-butyl, tert-butyl, neopentyl, 3,3-dimethylbutyl and 2-ethylhexyl, aryl radicals, for example $C_6$-$C_{10}$-aryl radicals, especially phenyl or naphthyl, most preferably $C_6$-aryl radicals, for example phenyl, and hetaryl radicals, for example pyridin-2-yl, pyridin-3-yl, pyridin-4-yl, thiophen-2-yl, thiophen-3-yl, pyrrol-2-yl, pyrrol-3-yl, furan-2-yl, furan-3-yl and imidazol-2-yl, and also the corresponding benzofused radicals, especially carbazolyl, benzimidazolyl, benzofuryl, dibenzofuryl or dibenzothiophenyl. Further examples include the following substituents: alkenyl, alkynyl, halogen, hydroxyl.

The degree of substitution here may vary from monosubstitution up to the maximum number of possible substituents.

Preferred compounds of the formula I for use in accordance with the invention are notable in that at least two of the $R^1$, $R^2$ and $R^3$ radicals are para-OR and/or —$NR_2$ substituents. The at least two radicals here may be only —OR radicals, only —$NR_2$ radicals, or at least one —OR and at least one —$NR_2$ radical.

Particularly preferred compounds of the formula I for use in accordance with the invention are notable in that at least four of the $R^1$, $R^2$ and $R^3$ radicals are para-OR and/or —$NR_2$ substituents. The at least four radicals here may be only —OR radicals, only —$NR_2$ radicals or a mixture of —OR and —$NR_2$ radicals.

Very particularly preferred compounds of the formula I for use in accordance with the invention are notable in that all of the $R^1$, $R^2$ and $R^3$ radicals are para-OR and/or —$NR_2$ substituents. They may be only —OR radicals, only —$NR_2$ radicals or a mixture of —OR and —$NR_2$ radicals.

In all cases, the two R in the —$NR_2$ radicals may be different from one another, but they are preferably the same.

Preferably, $A^1$, $A^2$ and $A^3$ are each independently selected from the group consisting of

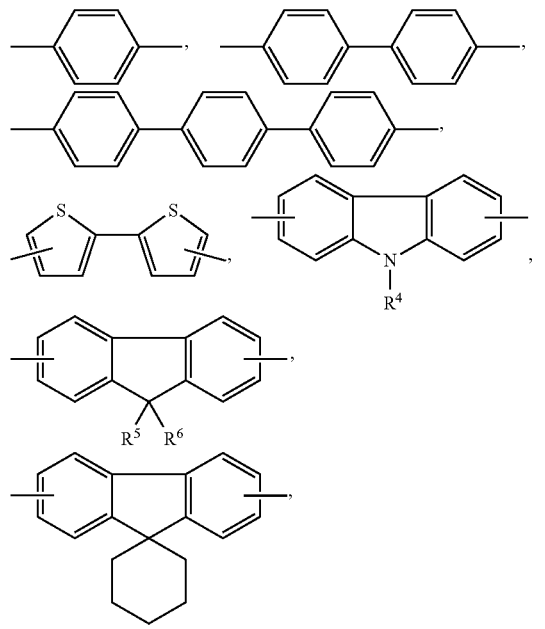

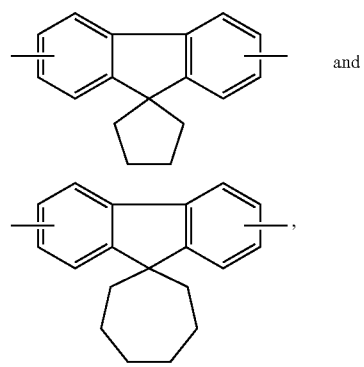

in which m is an integer from 1 to 18, $R^4$ is alkyl, aryl or heteroaryl, where $R^4$ is preferably an aryl radical, more preferably a phenyl radical, $R^5$, $R^6$ are each independently H, alkyl, aryl or heteroaryl, where the aromatic and heteroaromatic rings of the structures shown may optionally have further substitution. The degree of substitution of the aromatic and heteroaromatic rings here may vary from monosubstitution up to the maximum number of possible substituents.

Preferred substituents in the case of further substitution of the aromatic and heteroaromatic rings include the substituents already mentioned above for the one, two or three optionally substituted aromatic or heteroaromatic groups.

Preferably, the aromatic and heteroaromatic rings of the structures shown do not have further substitution.

More preferably, $A^1$, $A^2$ and $A^3$ are each independently

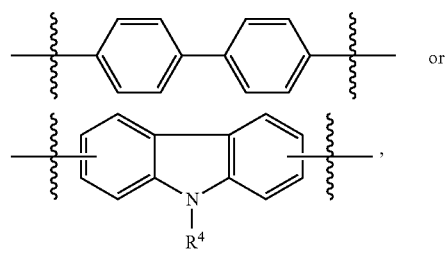

more preferably

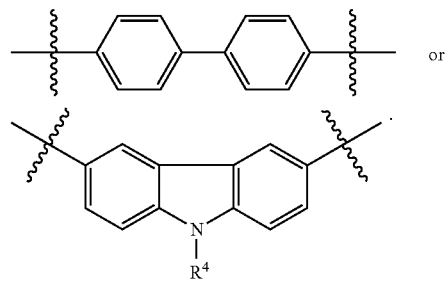

More preferably, the at least one compound of the formula (I) has one of the following structures

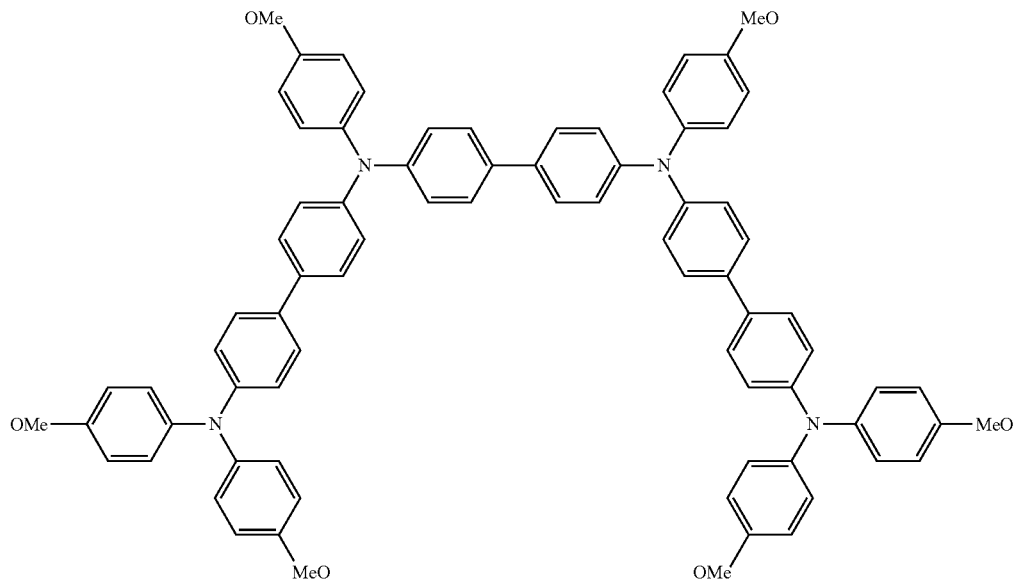
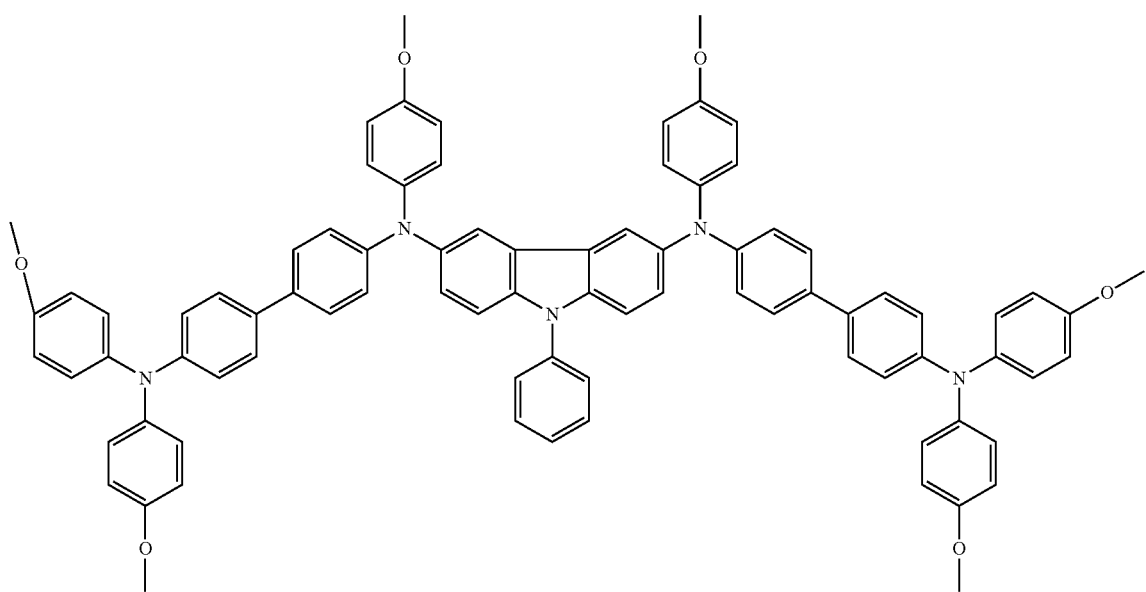

In an alternative embodiment, the organic p-type semiconductor comprises a compound of the type ID322 having the following structure:

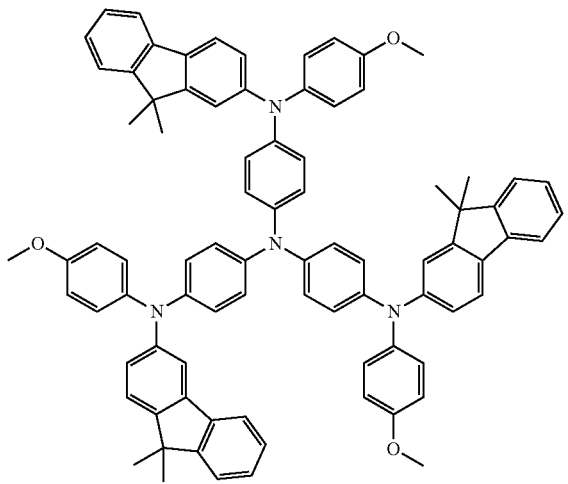 [SMILES: COc1ccc(N(c2ccc(N(c3ccc(N(c4ccc(OC)cc4)c4ccc5c(c4)C(C)(C)c4ccccc4-5)cc3)c3ccc(N(c4ccc(OC)cc4)c4ccc5c(c4)C(C)(C)c4ccccc4-5)cc3)cc2)c2ccc3c(c2)-c2ccccc2C3(C)C)cc1]

The compounds for use in accordance with the invention can be prepared by customary methods of organic synthesis known to those skilled in the art. References to relevant (patent) literature can additionally be found in the synthesis examples adduced below.

d) Second Electrode

The second electrode may be a bottom electrode facing the substrate or else a top electrode facing away from the substrate. As outlined above, the second electrode may be fully or partially transparent. As used herein, the term partially transparent refers to the fact that the second electrode may comprise transparent regions and intransparent regions.

One or more materials of the following group of materials may be used: at least one metallic material, preferably a metallic material selected from the group consisting of aluminum, silver, platinum, gold; at least one nonmetallic inorganic material, preferably LiE; at least one organic conductive or semiconductive material, preferably at least one electrically conductive polymer and, more preferably, at least one transparent electrically conductive polymer.

The second electrode may comprise at least one metal electrode, wherein one or more metals in pure form or as a mixture/alloy, such as especially aluminum or silver may be used.

Additionally or alternatively, nonmetallic materials may be used, such as inorganic materials and/or organic materials, both alone and in combination with metal electrodes. As an example, the use of inorganic/organic mixed electrodes or multilayer electrodes is possible, for example the use of LiF/Al electrodes. Additionally or alternatively, conductive polymers may be used. Thus, the second electrode of the optical sensor preferably may comprise one or more conductive polymers.

Thus, as an example, the second electrode may comprise one or more electrically conductive polymers, in combination with one or more layers of a metal. Preferably, the at least one electrically conductive polymer is a transparent electrically conductive polymer. This combination allows for providing very thin and, thus, transparent metal layers, by still providing sufficient electrical conductivity in order to render the second electrode both transparent and highly electrically conductive. Thus, as an example, the one or more metal layers, each or in combination, may have a thickness of less than 50 nm, preferably less than 40 nm or even less than 30 nm.

As an example, one or more electrically conductive polymers may be used, selected from the group consisting of: polyanaline (PANI) and/or its chemical relatives; a polythiophene and/or its chemical relatives, such as poly(3-hexylthiophene) (P3HT) and/or PEDOT:PSS (poly(3,4-ethylenedioxythiophene) poly(styrenesulfonate)). Additionally or alternatively, one or more of the conductive polymers as disclosed in EP2507286 A2, EP2205657 A1 or EP2220141 A1. For further exemplary embodiments, reference may be made to U.S. provisional application No. 61/739,173 or U.S. provisional application No. 61/708,058, the full content of all of which is herewith included by reference.

In addition or alternatively, inorganic conductive materials may be used, such as inorganic conductive carbon materials, such as carbon materials selected from the group consisting of: graphite, graphene, carbon nano-tubes, carbon nano-wires.

In addition, it is also possible to use electrode designs in which the quantum efficiency of the components is increased by virtue of the photons being forced, by means of appropriate reflections, to pass through the absorbing layers at least twice. Such layer structures are also referred to as "concentrators" and are likewise described, for example, in WO 02/101838 (especially pages 23-24).

As outlined above, the evaluation device is designed to generate at least one item of information on the longitudinal position of the object by evaluating the longitudinal sensor signal. However, Gaussian light beams may provide the same beam width at a distance z before and after the focal point, such that ambiguities in a beam profile may occur.

Generally it is known, for example from WO 2012/110924 A1 or U.S. provisional applications 61/739,173, filed on Dec. 19, 2012, 61/749,964, filed on Jan. 8, 2013, and 61/867,169, filed on Aug. 19, 2013, and WO2014/097181 A1, to overcome the occurrence of ambiguities by providing a plurality of longitudinal optical sensors, for example at least two longitudinal optical sensors, such as a stack of longitudinal optical sensors, adapted to provide the FiP effect. Thus, by evaluating signals from longitudinal optical sensors which subsequently are illuminated by the light beam, such as subsequent longitudinal optical sensors of a sensor stack, ambiguities in a beam profile may be resolved. By measuring the beam width along at least two positions, this ambiguity may be resolved, by determining whether the light beam still is narrowing or widening. By providing two or more longitudinal optical sensors having the FiP-effect, a higher accuracy may be provided. The evaluation device may be adapted to determine the widths of the light beam in the sensor regions of the at least two optical sensors, and the evaluation device may further be adapted to generate at least one item of information on a longitudinal position of an object from which the light beam propagates towards the optical detector, by evaluating the widths.

The detector according to the present invention may provide the possibility to reduce the amount of longitudinal optical sensors necessary to resolve ambiguities. With respect to the following formulas of beam optics, reference can be made to "Fundamentals of Photonics", Bahaa E. A. Saleh, Malvin Carl Teich, 1991 John Wiley & Sons, Inc., Chapter 3. Generally, an efficiency $\eta$ of the longitudinal optical sensor, in particular the power to current conversion efficiency, may be dependent on the intensity I of the incoming light:

$$\eta = C_\eta \sqrt{I} = C_\eta \sqrt{\frac{P}{A}} \qquad (1)$$

where $C_\eta$ is a constant, P is the power of the incoming light and A the illuminated area. Further, the efficiency is defined by $j=\eta \cdot P$, with j being a longitudinal optical sensor signal current. Thus, the longitudinal optical sensor signal current is given by $$j = C_\eta P^{3/2} A^{-1/2}. \qquad (2)$$

The power of a Gaussian beam is given by the Integral over the beam area A $$P = \int dA I(A)$$

$$= \int_0^\infty d\rho 2\pi \rho I^*\rho,z) \qquad (3)$$

for an optical system aligned along a z-axis with a transfer device located at z=0. At least one object may be located at a distance $z_t$. z may be an axial distance and $\rho$ may be a radial distance with $\rho=(x^2+y^2)^{1/2}$.

The longitudinal optical sensor signal current induced by a Gaussian beam of intensity I is thus given by $$j = C_\eta \int dA I(A)^{\frac{3}{2}} A^{-\frac{1}{2}} \qquad (4)$$

$$= C_\eta \int_0^\infty d\rho 2\pi \rho \frac{I(\rho,z)^{\frac{3}{2}}}{\sqrt{\pi}\rho} \qquad (5)$$

$$= 2\sqrt{\pi} C_\eta \int_0^\infty d\rho I(\rho,z)^{\frac{3}{2}}.$$

The intensity of the focused beam, $I_f$, may be given by $$I_f = I_{0f} \left(\frac{W_{0f}}{W_f}\right)^2 e^{-\frac{2}{W_f^2}\rho^2}, \qquad (6)$$

where $I_{0f}$ and $W_{0f}$ are the intensity and width at the focus and $w_f$ is the z-dependent width of the focused beam. The intensity $I_{0f}$ is dependent on the distance of the object.

For a Gaussian beam, the beam width is given by $$W_f = W_{0f} \sqrt{1 + \left(\frac{z-z_f}{z_0}\right)^2}. \qquad (7)$$

where $z_f$ is the z-coordinate of the focus and $z_0$ is the Rayleigh range. For equivalent formulas for ray optics reference can be made for example to "Fundamentals of Photonics", Bahaa E. A. Saleh, Malvin Carl Teich, 1991 John Wiley & Sons, Inc., Chapter 3.

Thus, the longitudinal optical sensor signal current in the focus is given by $$f = 2\sqrt{\pi} I_{0f}^{\frac{3}{2}} \left(\frac{W_{0f}^3}{W_f^3}\right) \int_0^\infty d\rho \exp\left(-\frac{3}{W_f^2}\rho^2\right) = \frac{\pi}{\sqrt{3}} I_{0f}^{\frac{3}{2}} W_{0f}^3 \frac{1}{W_f^2} \qquad (8)$$

In ray optics, these formulae are given by $$I_f = I_{0f} \left(\frac{W_{0f}}{W_f}\right)^2 (1 - \Theta(\rho - W_f)) \qquad (9)$$

$$j = 2\sqrt{\pi} C_\eta I_{0f}^{\frac{3}{2}} W_{0f}^3 \frac{1}{W_f^2}, \qquad (10)$$

where $\Theta$ is the Heaviside step function.

Thus, for Gaussian and classical beams, the longitudinal optical sensor signal current is given by $$j = C_{FiP} I_{0f}^{\frac{3}{2}} \frac{1}{W_f^2}, \qquad (12)$$

where $C_{FiP}$ is a constant. At the focus, the longitudinal optical sensor signal current is given by $$j_{focal} = C_{FiP} I_{0f}^{\frac{3}{2}} \frac{1}{W_{0f}^2} \qquad (13)$$

Thus, generally the longitudinal optical sensor signal current may be written as $$j = j_{focal} \frac{W_{0f}^2}{W_f^2}. \qquad (14)$$

The longitudinal optical sensor signal current may decrease with growing distance from the focus $z_f$.

Two longitudinal optical sensor signal currents $j(z, z_f)$ and $j(z, z'_f)$ of the same object at two different distances $z_f$ and $z'_f$ normalized to their focus current $j_{focal}(z_f)$, $j_{focal}(z'_f)$ respectively, may be considered. These curves may intersect at $z=z_{cross}$ if $$\frac{j_{FiP}(z, z_f)}{j_{focus}(z_f)} = \frac{j_{FiP}(z, z'_f)}{j_{focus}(z'_f)}, \qquad (15)$$

$$W_f^2(z, z_f) = W_f^2(z, z'_f) \qquad (16)$$

For a Gaussian beam the equation simplifies to $$(z_{cross} - z_f)^2 = (z_{cross} - z'_f)^2 \qquad (17)$$

$$z_{cross} = \frac{1}{2} \frac{z_f'^2 - z_f^2}{z_f' - z_f}. \qquad (18)$$

Although the intersection of the curves remains dependent on the focus position of each curve, astonishingly, it was found, that for a given optical system, the differences in $z_{cross}$ for different focal lengths are small, and $z_{cross}$ falls into a region where the longitudinal optical sensor current is less z-dependent. Further, in general, a given optical system is limited to a certain optical range. Astonishingly, within a typical range of an optical system, a small z range or point close to the focus, the focal length or the focal plane was found, where all normalized current curves intersect. Thus, measuring the longitudinal optical sensor current at this position or within this intersection range may yield to the normalization of the curve, which is $j_{focal}$. As outlined above, the focal longitudinal optical sensor may be spaced apart from the focal plane by a distance ±ε, wherein |ε|≤0.2·f, with f being the focal length of the transfer device. For example, |ε|≤0.1·f, preferably |ε|≤0.05·f, more preferably |ε|≤0.02·f, and most preferably |ε|≤0.2·f. The at least one focal longitudinal optical sensor may be arranged to the focal plane such that the at least one focal longitudinal optical sensor lies within the range or point where the curves intersect. Further, placing the at least one focal longitudinal optical sensor within this intersection range may avoid alignment and adjustment due to focus changes with movement of the object, since the intersection range may be only system dependent.

The evaluation device may be adapted to evaluate at least one longitudinal sensor signal $j_{focal}$ of the focal longitudinal optical sensor and to derive a theoretical longitudinal sensor signal $j_{image}$ of a hypothetical longitudinal optical sensor in the image plane. The evaluation device may be adapted to use, for determining the theoretical longitudinal sensor signal $j_{image}$, an assumption that the theoretical longitudinal sensor signal $j_{image}$ is proportional to the longitudinal sensor signal $j_{focal}$ of the focal longitudinal optical sensor. The evaluation device, for determining the theoretical longitudinal sensor signal $j_{image}$, may be adapted to use the following relationship:

$$\frac{j_{image}}{j_{focal}} = const. \tag{19}$$

with const. being a predetermined or determinable constant. The evaluation device, for determining the theoretical longitudinal sensor signal $j_{image}$, may be adapted to use the following relationship:

$$\frac{j_{image}}{j_{focal}} = c(h_{target}, f_{lens}, l_{lens}) \tag{20}$$

with $c(h_{target}, f_{lens}, l_{lens})$ being a predetermined or determinable function dependent on the size $h_{target}$ of the object, in particular for a light point having a diameter, $h_{target}$ may be the diameter of the light point, the focal length $f_{lens}$ of the transfer device, and the aperture $l_{lens}$ of the transfer device. If the focal longitudinal optical sensor current $j_{focal}$ is determined and $c(h_{target}, f_{lens}, l_{lens})$ is known, the theoretical sensor signal $j_{image}$ can be determined. Thus, it may be avoided to place a longitudinal optical sensor in or close to the image plane to determine the sensor signal in the image plane. Further, it may be possible to reduce the amount of longitudinal optical sensors necessary to resolve ambiguities. If the predetermined or determinable function dependent on the size $h_{target}$ of the object, the focal length $f_{lens}$ of the transfer device, and the aperture $l_{lens}$ of the transfer device is known, one, two or three longitudinal optical sensors, including the focal longitudinal optical sensor, are sufficient for determining a longitudinal position of the at least one object. Thus, a stack of longitudinal optical sensors including no more than three longitudinal optical sensors is, basically, sufficient for a precise measurement of the longitudinal position of the at least one object. Still, however, it is possible to use more than three longitudinal optical sensors.

Reducing the number of longitudinal optical sensors as compared to other sensor stacks provides several advantages. Thus, system costs may be reduced since the overall number of components may be reduced. Further, the complexity of the detector in general may be reduced, thereby providing the possibility of reducing the overall size of the detector as well as the overall error rate of the detector. Further, optical qualities may be improved since, by reducing the number of longitudinal optical sensors within a sensor stack, longitudinal optical sensors having a lower transparency and, thus, having a higher quantum efficiency may be used. This is due to the fact that in sensor stacks having a large number of optical sensors, optical sensors having a high transparency will have to be used in order for the light beam to reach even the last optical sensor within the stack. By reducing the number of longitudinal optical sensors within the stack, each longitudinal optical sensor may be designed to absorb an increased amount of light and, thus, may produce a higher longitudinal optical sensor signal. Thereby, the signal-to-noise ratio may be improved and the accuracy of the determination of the position of the at least one object may be increased. It shall further be noted that, besides the longitudinal optical sensors, the sensor stack may comprise one or more other types of sensors and/or one or more other elements, such as at least one transversal optical sensor and/or at least one other type of optical elements such as a lens. Further, the stack may comprise at least one imaging device, such as an image detector like e.g. a CCD and/or a CMOS chip.

To determine a full curve of the longitudinal optical sensor signal current, and especially to determine the focus position $z_f$, at least two measurements of the longitudinal optical sensor signal current may be necessary. In general, if the focus position $z_f$ is completely unknown, two measurements are necessary, since two z-values can be assigned to each longitudinal optical sensor signal current, due to the symmetry of the curve. However, if a range of possible $z_f$ values is known, one measurement may be sufficient, i.e., if the measurement is known to be always between $z_f$ and the transfer device. This may further reduce the number of optical sensors in a stack.

For general objects, the size of the object $h_{target}$ may be unknown. The size of the object may be determined by a pixelated CMOS detector and/or an unpixelated inorganic diode. In a pixelated CMOS detector, pixels may be counted to determine the size of the object. In an unpixelated diode, e.g. an unpixelated Si-diode, a diode current may only be dependent on the number of photons. The size of the object may be given by the ratio between the diode current and the intensity dependent longitudinal optical sensor signal current.

In one embodiment, the detector may comprise a hybrid organic/inorganic detector. The hybrid organic/inorganic detector may comprise a combination of detectors from the group consisting of: a combination of a longitudinal optical sensor, in particular an organic longitudinal optical sensor, and a CMOS detector; a combination of a longitudinal detector, in particular an organic longitudinal optical sensor, and a diode, in particular a photodiode, e.g. Si—, Ge—, etc. photodiode; a longitudinal optical sensor comprising a sensor stack and CMOS detector.

For example, the detector may comprise at least one longitudinal optical sensor and a CMOS detector. In this embodiment, the properties of the optics $f_{lens}$ and $l_{lens}$ may be known, but not the size of the object, which may be determined by counting pixels of the pixelated CMOS detector. For example, the detector may comprise a sensor stack and a CMOS detector, which may be used to determine the object size. However, with respect to sensor stacks used in prior art, here a reduced number of sensors within the stack may be needed.

In a further embodiment, the detector may comprise a purely organic detector. The organic detector may comprise a combination of detectors from the group consisting of: a sensor stack; a combination of pixelated and unpixelated longitudinal optical sensors; a combination of a lightfield camera, a pixelated focal longitudinal optical sensor and a further pixelated longitudinal optical sensor placed apart from the focal plane. For example, the detector may comprise a combination of pixelated and unpixelated longitudinal optical sensors, wherein the object size may be determined using the pixelated longitudinal optical sensors.

In a further embodiment, the detector may comprise a camera based on several pixelated CMOS chips behind the transfer device. For example beam splitting elements may send pictures to the CMOS chips at different distances from the transfer device. One of the CMOS chips may be arranged in the focal plane of the transfer device. Distances of the object may be determined by calculating photons per area from a signal intensity and the size of the object, which was determined for example by pixel counting. This arrangement may allow calculating further information in the picture plane. Further embodiments are feasible in principle.

The detector may comprise at least one illumination source for illuminating the object. The illumination source can be embodied in various ways. Thus, the illumination source can be for example part of the detector in a detector housing. Alternatively or additionally, however, the at least one illumination source can also be arranged outside a detector housing, for example as a separate light source. The illumination source can be arranged separately from the object and illuminate the object from a distance. However, embodiments are feasible, wherein the object may, additionally or alternatively, be illuminated by ambient light. Ambient light may be present due to additional light source such as artificial light source or natural light source. The light source may further comprise a light beam homogenizer and/or a light pipe homogenizer. The light source may be or may comprise at least one homogeneous light source and/or may be or may comprise at least one structured light source and/or patterned light source. As an example, a structures or patterned light source may be provided by using one or more spatial light modulators (SLMs), such as one or more of a liquid crystal spatial light modulator and/or one or more micromechanical mirror devices such as using DLP® technology.

The illumination light preferably may have a wavelength in the infrared spectral range. The illumination source can comprise in particular one or a plurality of the following illumination sources: a laser, in particular a laser diode, for example an IR laser diode with output wavelength in the infrared part of the electromagnetic spectrum, although in principle, alternatively or additionally, other types of lasers can also be used; a light emitting diode; an incandescent lamp; an organic light source, in particular an organic light emitting diode. The infrared part of the electromagnetic spectrum preferably refers to a spectral range of 780 nm to 1 mm, preferably 780 nm to 3.0 µm. Alternatively or additionally, other illumination sources can also be used. It is particularly preferred if the illumination source is designed to generate one or more light beams having a Gaussian beam profile, as is at least approximately the case for example in many lasers. However, other embodiments are also possible, in principle.

As used herein, the term evaluation device generally refers to an arbitrary device designed to generate the at least one item of information on the longitudinal position of the object by evaluating the longitudinal sensor signal. As an example, the evaluation device may be or may comprise one or more integrated circuits, such as one or more application-specific integrated circuits (ASICs), and/or one or more data processing devices, such as one or more computers, preferably one or more microcomputers and/or microcontrollers. Additional components may be comprised, such as one or more preprocessing devices and/or data acquisition devices, such as one or more devices for receiving and/or preprocessing of the transversal sensor signal and/or the longitudinal sensor signal, such as one or more AD-converters and/or one or more filters. Further, the evaluation device may comprise one or more data storage devices. Further, as outlined above, the evaluation device may comprise one or more interfaces, such as one or more wireless interfaces and/or one or more wire-bound interfaces.

Further, the at least one evaluation device may be formed as a separate evaluation device independent from the at least one longitudinal optical sensor, but may preferably be connected to the at least one longitudinal optical sensing order to receive the longitudinal sensor signal. Alternatively, the at least one evaluation device may fully or partially be integrated into the at least one longitudinal optical sensor.

The at least one evaluation device may be adapted to perform at least one computer program, such as at least one computer program performing or supporting generating the at least one item of information on the longitudinal position. As an example, one or more algorithms may be implemented which, by using the longitudinal sensor signal as input variables, may perform a predetermined transformation into the longitudinal position of the object. The evaluation device may comprise at least one data processing device, such as at least one microcontroller or processor. Thus, as an example, the at least one evaluation device may comprise at least one data processing device having a software code stored thereon comprising a number of computer commands.

The evaluation device can be connected to or may comprise at least one further data processing device that may be used for one or more of displaying, visualizing, analyzing, distributing, communicating or further processing of information, such as information obtained by the optical sensor and/or by the evaluation device. The data processing device, as an example, may be connected or incorporate at least one of a display, a projector, a monitor, an LCD, a TFT, a loudspeaker, a multichannel sound system, an LED pattern, or a further visualization device. It may further be connected to or incorporate at least one of a communication device or communication interface, a datalink, a timex datalink, a connector or a port, capable of sending encrypted or unencrypted information using one or more of email, text messages, telephone, bluetooth, radio, Wi-Fi, infrared or internet interfaces, ports or connections. It may further be connected to or incorporate at least one of a processor, a graphics processor, a CPU, an Open Multimedia Applications Platform (OMAP™), an integrated circuit, a system on a chip such as products from the Apple A series or the Samsung S3C2 series, a microcontroller or microprocessor, one or more memory blocks such as ROM, RAM, EEPROM, or flash memory, timing sources such as oscillators or phase-locked loops, counter-timers, real-time timers, or power-on reset generators, voltage regulators, power management circuits, or DMA controllers. Individual units may further be connected by buses such as AMBA buses and/or may contain one or more transmitters and/or receivers.

The evaluation device and/or the data processing device may be connected by or have further external interfaces or ports such as one or more of serial or parallel interfaces or ports, USB, Centronics Port, FireWire, HDMI, Ethernet, Bluetooth, RFID, radio, datalink, Wi-Fi, QSART, or SPI, or analog interfaces or ports such as one or more of ADCs or DACs, or standardized interfaces or ports to further devices such as a 2D-camera device using an RGB-interface such as CameraLink. The evaluation device and/or the data processing device may further be connected by one or more of interprocessor interfaces or ports, FPGA-FPGA-interfaces, or serial or parallel interfaces or ports. The evaluation device and the data processing device may further be connected to one or more of an optical disc drive, a CD-RW drive, a DVD+RW drive, a flash drive, a memory card, a disk drive, a hard disk drive, a solid state disk or a solid state hard disk.

The evaluation device and/or the data processing device may be connected by or have one or more further external connectors such as one or more of phone connectors, RCA connectors, VGA connectors, hermaphrodite connectors, USB connectors, HDMI connectors, 8P8C connectors, BCN connectors, IEC 60320 C14 connectors, optical fiber connectors, D-subminiature connectors, RF connectors, coaxial connectors, SCART connectors, XLR connectors, and/or may incorporate at least one suitable socket for one or more of these connectors.

Possible embodiments of a device such as a single device incorporating one or more of the detectors according to the present invention, the evaluation device or the data processing device, such as incorporating one or more of the optical sensor, optical systems, evaluation device, communication device, data processing device, interfaces, system on a chip, display devices, or further electronic devices, are: mobile phones, personal computers, tablet PCs, televisions, game consoles or further entertainment devices. In a further embodiment, the 3D-camera functionality which will be outlined in further detail below may be integrated in devices that are available with conventional 2D-digital cameras, without a noticeable difference in the housing or appearance of the device, where the noticeable difference for the user may only be the functionality of obtaining and or processing 3D information.

Specifically, an embodiment incorporating the detector and/or a part thereof such as the evaluation device and/or the data processing device may be: a mobile phone incorporating a display device, a data processing device, the optical sensor, optionally the sensor optics, and the evaluation device, for the functionality of a 3D camera. The detector according to the present invention specifically may be suitable for integration in entertainment devices and/or communication devices such as a mobile phone.

A further embodiment of the present invention may be an incorporation of the detector or a part thereof such as the evaluation device and/or the data processing device in a device for use in automotive, for use in autonomous driving or for use in car safety systems such as Daimler's Intelligent Drive system, wherein, as an example, a device incorporating one or more of the optical sensors, optionally one or more optical systems, the evaluation device, optionally a communication device, optionally a data processing device, optionally one or more interfaces, optionally a system on a chip, optionally one or more display devices, or optionally further electronic devices may be part of a vehicle, a car, a truck, a train, a bicycle, an airplane, a ship, a motorcycle. In automotive applications, the integration of the device into the automotive design may necessitate the integration of the optical sensor, optionally optics, or device at minimal visibility from the exterior or interior. The detector or a part thereof such as the evaluation device and/or the data processing device may be especially suitable for such integration into automotive design. Devices according to the present invention may be especially suitable for the integration in automotive application, specifically due to the possibility of reducing the amount of data generated, as compared to conventional 3D-sensing technologies.

As outlined above, the at least one illumination source is adapted to illuminate the at least one object with illumination light. For example, the at least one object may be illuminated with light through the longitudinal optical sensor. Additionally or alternatively, further be adapted to illuminate the at least one object in other ways, such as by illumination light which is not transmitted through the at least one longitudinal optical sensor. Thus, at least one illumination source may be placed outside a beam path of the detector, in order to illuminate the at least one object in an off-axis fashion.

The illumination light generally, in case an illumination through the longitudinal optical sensor takes place and/or in case a different type of illumination is used, optionally may imply at least one reflection of the illumination light before the illumination light illuminates the at least one object. Thus, generally, the detector may further comprise at least one reflective element, wherein the reflective element is adapted to reflect the illumination light before illuminating the object. The use of at least one reflective element generally implies several advantages. Thus, generally, by using at least one reflective element, an adjustment of an orientation of the illumination light, such as an illumination light beam, may be performed by adjusting the at least one reflective element. Further, the at least one reflective element, as will be outlined in further detail below, may be a wavelength-selective reflective element, the reflection properties of which may depend on the wavelength. Thus, generally, the wavelength-selective reflective element may be or may comprise at least one infrared reflective element which exhibits reflective properties in the infrared spectral region, whereas, in other spectral regions such as the visible spectral region, no reflective properties or significantly lower reflective properties as compared to the infrared spectral region may be present. Thus, generally, the at least one illumination source may comprise at least one infrared illumination source for illuminating the at least one object with infrared illumination light, and the at least one reflective element may comprise at least one reflective element exhibiting reflective properties in the infrared spectral region, such as a so-called "hot" mirror.

When illuminating the at least one object with illumination light, be it through the at least one longitudinal optical sensor and/or be it in a different fashion, the at least one illumination light may be fixed in direction and/or space and/or may be adjustable or movable in direction and/or space. Thus, as an example, the reflective element may be or may comprise at least one movable reflective element adapted to be adjusted to at least two different positions, wherein, in the at least two different positions, the illumination light is reflected into different directions. As used herein, the term "position" generally may refer to any type of absolute position and/or any type of orientation of the movable mirror. Thus, at least one longitudinal translation of the movable mirror and/or at least one rotational movement of the at least one movable mirror may be feasible.

Thus, as an example, the at least one movable reflective element may be a reflective element the orientation of which may be adjusted to at least one first orientation and at least one second orientation being different from the at least one first orientation. The adjustment may take place in a stepwise or a continuous fashion.

In case the at least one reflective element comprises at least one movable reflective element, the movable reflective element may be a single movable reflective element or may be or may comprise a plurality of movable reflective elements. Thus, the at least one reflective element may comprise a plurality of movable reflective elements, such as a plurality of movable mirrors, preferably a plurality of micro-mirrors. Thus, as an example, the at least one movable reflective element may comprise a plurality of micro-mirrors, specifically an area of micro-mirrors, such as micro-mirrors based on piezo technology. As an example, micro-mirrors as used in projection technology may be used, such as micro-mirrors available for beamers or other types of projectors. As an example, digital light processing (DLP®) technology, such as the light processing technology available from Texas Instruments, may be used. More specifically, at least one DLP®-chip may be used. More generally, a reflective spatial light modulator may be used and/or the at least one movable reflective element may comprise at least one reflective spatial light modulator.

By using a plurality of movable reflective elements, the illumination light may be subdivided into a plurality of illumination light beams, the position/orientation of which, preferably, may individually be controlled by the plurality of movable reflective elements. Thereby, as an example, a projection of various patterns and/or a modulation of points and/or patterns of the illumination light beams are feasible. In case a plurality of movable reflective elements is used, an individual control of the movable reflective elements may take place, such as an individual control at different control frequencies. Thereby, an illumination of the at least one object by the plurality of illumination light beams and/or by a pattern of illumination light beams at different frequencies is feasible. Consequently, the illumination may take place in a modulated fashion, such as by periodically controlling the movable reflective element at different modulation frequencies. The illumination may then be resolved by the detector, such as by the one or more FiP-sensors contained therein, such as by demodulating one or more of the detector signals and/or by a frequency analysis.

By using a plurality, specifically an array, of movable reflective elements, specifically an array of mirrors and/or a reflective spatial light modulator, and more specifically a DLP® array, a projection of illumination light patterns may be performed, such as for projecting generic patterns and/or specialized patterns into a field of view of the detector, such as for covering a complete or partial measurement space of the detector.

Further, by using the plurality of movable reflective elements, more specifically an array of movable reflective elements, such as an array of mirrors, a reflective spatial light modulator and/or a DLP® array, the plurality of movable reflective elements may be used for projecting points and/or patterns of the illumination light into space, specifically into a field of view of the detector, such as into an image of a camera, specifically for following one or more specific objects in space, such as for following limbs, toys or other object or parts thereof.

In case a pattern and/or array of the movable reflective element is used, such as one or more DLP® chips, the pattern itself may be a generic pattern or may be a dedicated pattern for the detector, such as a pattern dependent on a RGB-camera picture.

In case the at least one reflective element is or comprises at least one movable reflective element, the at least one movable reflective element may be adapted to scan the illumination light through at least one scan region in space. Again, the scanning process may take place in a continuous fashion or in a stepwise fashion. Thus, as an example, the at least one movable reflective element may comprise at least one movable mirror, such as a galvo-scanner or any other type of movable mirror, the position and/or orientation of which may be adjusted.

In case at least one movable reflective element is used, the adjustment of the at least one movable reflective element may take place in a manual fashion and/or in an automatic fashion. Thus, as an example, the at least one detector may comprise at least one actuator adapted for adjusting the position of the at least one movable mirror. As an example, the at least one actuator may be or may comprise at least one adjustment screw and/or at least one other type of actuator, such as at least one piezo actuator.

The at least one optional movable reflective element, as an example, may comprise a matrix of movable reflective elements. Thus, as an example, a micromechanical mirror device may be used, comprising an array of movable micro-mirrors, such as by using the so-called DLP® technology by Texas Instruments. By using one or more movable reflective elements, one or more patterns and/or fringes may be generated and/or projected.

As outlined above, the illumination source generally and specifically may be adapted to emit illumination light in one or more of the visible spectral range, the infrared spectral range and the ultraviolet spectral range. Specifically, the illumination light may be illumination light in the infrared spectral range. Thus, as outlined above, the reflective element may be adapted to reflect light in the infrared spectral range, wherein light in the visible spectral range is transmitted. Other combinations of reflective properties in the different spectral ranges are feasible. Specifically, the at least one reflective element may comprise at least one movable reflective element having reflective properties in the infrared spectral range, such as a movable infrared mirror, specifically a movable "hot" mirror.

The at least one reflective element generally may be an arbitrary element adapted to fully or partially reflect or redirect the illumination light in space. As the skilled person will recognize, various types of reflective elements are generally known and may be used herein. Specifically, the reflective element may be selected from the group consisting of: a mirror; a semitransparent mirror; a mirror or semi-transparent mirror reflecting only specific spectral regions, such as light in the infrared spectral range; a prism; a dichroitic mirror; a beam splitter cube. Combinations of the named elements and/or other types of reflective elements are feasible. Specifically, as will be outlined in further detail below, the at least one reflective element may exhibit beam-splitting properties, and, thus, the at least one reflective element, be it a rigid reflective element or a movable reflective element, may fully or partially be identical to at least one beam-splitting device which may be present in the detector.

The use of at least one reflective element, specifically the use of at least one movable reflective element, more specifically the use of at least one movable reflective element having reflective properties in the infrared spectral range, provides a large number of advantages, as partially outlined above. Thus, as an example, current distance sensors as commercially available e.g. in the field of gaming, generally may project a point pattern into the space to be analyzed.

The point pattern may be monitored by using at least one camera, and appropriate measurement algorithms may be applied. This process requires a significant amount of computing power. Contrarily, the detector according to the present invention, provides an easy way of simplifying the detection process. The illumination light, such as infrared illumination light, more specifically a single infrared light beam, may be moved through the space to be analyzed, by using the movable reflective element such as a movable infrared mirror. In this setup, the required computational resources may significantly be reduced as compared to conventional detectors.

Thus, as outlined above, a scanning process may be applied. The movable mirror allows for reading out e.g. line patterns, square patterns or other patterns. Thus, the detector, specifically the detector comprising one or more longitudinal optical sensors, more specifically comprising one or more organic solar cells and/or DSCs and/or sDSCs, may provide a direct and fast longitudinal information such as a distance information. The movable reflective element, such as the movable mirror, generally may be adapted for tracking the at least one object by adjusting the at least one position of the at least one movable reflective element according to the position of the object. Thereby, the detector may be adapted for tracking and/or analyzing specific objects, such as humans, faces, limbs or other movable objects or combinations of movable object.

The at least one object may comprise or may be combined with at least one beacon device, also referred to as a target device, which may be adapted to emit at least one light beam and/or to transmit at least one light beam towards the detector. For potential embodiments of the at least one beacon device, reference may be made e.g. to WO 2012/110924 A1. Other embodiments are feasible. Thus, generally, the at least one beacon device may be or may comprise at least one passive beacon device adapted to reflect light such as the illumination light and/or may be or may comprise at least one active device adapted for emitting light. Thus, generally, one or more actively emitting target devices and/or reflecting targets devices may be used, specifically in combination with a movable reflective device. In the setup, as an example, a movable infrared light beam may be used as illumination light and/or as a part of the illumination light, and the detector may be adapted to measure patterns and/or specific regions in space and/or may be adapted to track specific objects.

As will be outlined in further detail below, the detector may further comprise at least one imaging device such as at least one camera, more specifically a full-color camera such as an RGB-camera. In this setup, the movable infrared illumination light, such as the movable infrared light beam may be used in order to analyze regions in the RGB-picture that appear specifically important, such as moving and/or changing objects. This feature may be achieved via simple picture analysis algorithms. Thereby, a fast and simple tracking of faces, limbs or other movable and objects may be feasible.

In the context of gaming, as will be outlined in further detail below, such as in the context of game consoles and/or augmented reality applications, the detector according to the present invention, specifically having the at least one movable reflective element, provides additional advantages. Thus, current image sensors are generally incapable of analyzing the distance of objects in space. Consequently, these types of sensors generally are limited in their interpretation of the augmented reality information. Thus, commercially available image sensors and detectors generally are incapable of analyzing depth information. These sensors or detectors are capable of detecting a 2D position. However, since no depth information of objects such as hands, feet or other body parts are available, the augmented reality generally is influenced by the 2D-image, only. Contrarily, in the context of the present invention, a tracking of objects in space becomes feasible, specifically in the context of machine control, gaming or augmented reality. Still, as outlined above, the invention may be performed by using standard computational resources or, generally, low computational resources low.

The detector further may comprise at least one imaging device, wherein the imaging device may be adapted such that the light beam traveling from the object to the detector passes through with the longitudinal optical sensor before impinging on the imaging device.

As used herein, an imaging device is generally understood as a device which can generate a one-dimensional, a two-dimensional, or a three-dimensional image of the object or of a part thereof. In particular, the imaging device can be completely or partly used as a camera. For example, the imaging device may be a camera selected from the group consisting of: an RGB camera, i.e. a camera which is designed to deliver three basic colors which are designated as red, green, and blue, on three separate connections; an IR camera, i.e. a camera which is designed to record parts of the light beam in the infrared spectral range; although in principle, alternatively or additionally, other types of cameras can also be used. Other embodiments of the imaging device are also possible.

The imaging device may be designed to image a plurality of partial regions of the object successively and/or simultaneously. By way of example, a partial region of the object can be a one-dimensional, a two-dimensional, or a three-dimensional region of the object which is delimited for example by a resolution limit of the imaging device and from which electromagnetic radiation emerges.

In this context, imaging should be understood to mean that the electromagnetic radiation which emerges from the respective partial region of the object is fed into the imaging device, for example by means of at least one optional transfer device of the detector.

In particular, the imaging device can be designed to image sequentially, for example by means of a scanning method, in particular using at least one row scan and/or line scan, the plurality of partial regions sequentially. However, other embodiments are also possible, for example embodiments in which a plurality of partial regions is simultaneously imaged. The imaging device is designed to generate, during this imaging of the partial regions of the object, signals, preferably electronic signals, associated with the partial regions. The signal may be an analogue and/or a digital signal. By way of example, an electronic signal can be associated with each partial region. The electronic signals can accordingly be generated simultaneously or else in a temporally staggered manner. By way of example, during a row scan or line scan, it is possible to generate a sequence of electronic signals which correspond to the partial regions of the sample, which are strung together in a line, for example. Further, the imaging device may comprise one or more signal processing devices, such as one or more filters and/or analogue-digital-converters for processing and/or preprocessing the electronic signals.

The imaging device may comprise a camera chip, for example a CCD chip and/or CMOS chip. Preferably, the imaging device may comprise an inorganic imaging device. The imaging device may comprise a matrix of pixels. As used herein, a pixel generally refers to a light-sensitive element of the imaging device. As used here, a "matrix" generally refers to an arrangement of a plurality of the pixels in space, which may be a linear arrangement or an areal arrangement. Thus, generally, the matrix preferably may be selected from the group of: a one-dimensional matrix; a two-dimensional matrix. Most preferably, the matrix is a rectangular matrix having pixels arranged in rows and columns. The imaging device may comprise a chip selected from the group consisting of a CMOS chip and a CCD chip. Further the imaging device may be adapted to resolve colors. The at least one imaging device may be or may comprise at least one full-color CCD chip and/or at least one full-color CMOS chip. In a preferred embodiment, the imaging device may be an RGB camera and/or an IR camera.

The detector further may comprise at least one beam-splitting device, wherein the beam splitting device may be adapted to separate the illumination light emitted by the illumination source before passing the longitudinal optical sensor from the light beam traveling from the object to the detector after passing the longitudinal optical sensor. As used here, a beam splitting device is a device adapted to split the light beam emitted by the illumination device into two or more light beams and to deflect the light beam in the direction of the optical axis, in particular parallel to the direction of the optical axis. The beam splitting device may be selected from the group consisting of: a semitransparent mirror; a mirror or semi-transparent mirror reflecting only specific spectral regions, such as light in the infrared spectral range; a prism; a dichroitic mirror; a beam splitter cube.

As outlined above, the at least one optional beam-splitting device may fully or partially be identical with the at least one optional reflective element. Thus, as outlined above, the beam-splitting device may be or may comprise at least one movable reflective element adapted to be adjusted to at least two different positions, wherein, in the at least two different positions, the illumination light is reflected into different directions. Specifically, the at least one beam-splitting device may be or may comprise at least one infrared reflective element, more specifically at least one movable infrared reflective element.

Therein, the position and/or orientation of the at least one light beam traveling from the object to the detector after passing the longitudinal optical sensor may be kept at least substantially unchanged when passing the at least one reflective element, specifically when passing the at least one movable reflective element. Thus, specifically, the at least one movable reflective element may be adapted such that, when moving the movable reflective element, a position and/or orientation of the illumination light is changed by the movement of the movable reflective element, whereas a position and/or orientation of the light beam may be kept at least substantially independent from the movement of the movable reflective element.

The longitudinal sensor signal may further dependent on a modulation frequency of the light beam. In particular, the FiP-effect may depend on or may be emphasized by an appropriate modulation of the light beam, as disclosed in WO 2012/110924 A1. Specifically in case the at least one longitudinal optical sensor provides the above-mentioned FiP-effect, the sensor signal of longitudinal the optical sensor may be dependent on a modulation frequency of the light beam. As an example, the FiP-effect may be used with modulation frequencies of 0.1 Hz to 10 kHz.

The illumination source may be adapted to periodically modulate at least one optical property of the illumination light. Thus, the illumination source may be adapted to emit the light beam in a modulated way and/or an additional modulation device, which may be adapted to periodically modulated at least one optical property of the illumination light, may be used. additionally or alternatively, the detector may comprise at least one modulation device for periodically modulating at least one optical property of the illumination light. For example, the at least one optical property may be selected from the group consisting of an amplitude and a phase of the illumination light. The modulation device, as an example, may comprise a spatial light modulator, preferably a micro-mirror device and more preferably a DLP® device. Other modulation devices may be used. The modulation may be used for one or more different purposes, such as for enhancing and/or enabling the FiP-effect and/or for identifying one or more illumination sources emitting at a specific modulation frequency. The latter purpose may be used for distinguishing between two or more different modulated light beams at different modulation frequencies. For further details, reference may be made to EP 13171900.7, filed on Jun. 13, 2013.

The illumination source is adapted to send out at least two light beams having differing optical properties. For example, the at least two light beams may have a differing spectral property. For example, the spectral property of the light beams may be a color and/or a polarization of the portion of the light beam. Preferably, the at least two light beams are modulated with different modulation frequencies.

The at least one longitudinal sensor signal may be further dependent on a modulation frequency of the light beam. The evaluation device preferably may be adapted for performing the frequency analysis by demodulating the longitudinal sensor signal with different modulation frequencies. The modulation of the light beams send out by the illumination source and the demodulation of the longitudinal sensor signals by the evaluation device preferably take place with the same set of modulation frequencies. For this purpose, the evaluation device may contain one or more demodulation devices, such as one or more frequency mixing devices, one or more frequency filters such as one or more low-pass filters or one or more lock-in amplifiers and/or Fourier-analyzers. The evaluation device preferably may be adapted to perform a discrete or continuous Fourier analysis over a predetermined and/or adjustable range of frequencies.

The evaluation device may comprise one or more electronic components, such as one or more frequency mixing devices and/or one or more filters, such as one or more band-pass filters and/or one or more low-pass filters. Thus, as an example, the evaluation device may comprise at least one lock-in amplifier or, preferably, a set of lock-in amplifiers, for performing the frequency analysis. Thus, as an example, in case a set of modulation frequencies is provided, the evaluation device may comprise a separate lock-in amplifier for each modulation frequency of the set of modulation frequencies or may comprise one or more lock-in amplifiers adapted for performing a frequency analysis for two or more of the modulation frequencies, such as sequentially or simultaneously. Lock-in amplifiers of this type generally are known in the art.

The evaluation device may be designed to generate the at least one item of information on the longitudinal position of the object from at least one predefined relationship between the geometry of the illumination of the sensor region by the light beam and a relative positioning of the object with respect to the detector. The predefined relationship between the geometry of the illumination of the sensor region by the light beam and the relative positioning of the object with respect to the detector may take account of a known power of the illumination. The known relationship may be stored in the evaluation device as an algorithm and/or as one or more calibration curves. As an example, specifically for Gaussian beams, a relationship between a beam diameter or a beam waist and a position of the object may easily be derived by using the Gaussian relationship between the beam waist and a longitudinal coordinate. The predefined relationship between the geometry of the illumination of the sensor region by the light beam and the relative positioning of the object with respect to the detector may take account of a modulation frequency with which the illumination is modulated.

The detector may comprise at least one further optical device, wherein the optical device comprises at least one element having one or both of a focusing or a defocusing effect onto at least one of the illumination light and the light beam. The at least one further optical device may fully or partially be positioned in one or more of the following positions In a beam path in between the illumination source and the longitudinal optical sensor;
In a beam path between the longitudinal optical sensor and the object;
In a beam path in between the longitudinal optical sensor and an imaging device.

The at least one further optical device may be adapted such that the light beam traveling from the object to the detector passes through the longitudinal optical sensor before passing the optical device and impinging on the imaging device.

The illumination light may travel at least partially substantially parallel to the optical axis of the detector. As used herein, the term "substantially parallel" refers to a beam axis which deviates not more than ±20°, preferably not more than ±10°, more preferably not more than ±5°, from the optical axis. The longitudinal optical sensor, the illumination source and, optionally, the imaging device are arranged coaxially with regard to the optical axis of the detector.

The at least one longitudinal optical sensor, preferably the at least one focal longitudinal optical sensor, may comprise at least one semiconductor detector. The semiconductor detector may be an organic semiconductor comprising at least one organic material. The semiconductor detector may be selected from the group consisting of an organic solar cell, a dye solar cell, a dye-sensitized solar cell, a solid dye solar cell, a solid dye-sensitized solar cell. In case a plurality of longitudinal optical sensors is provided, one or more of the longitudinal optical sensors preferably may be or may comprise at least one organic semiconductor detector and/or at least one inorganic semiconductor detector. Most preferably, the semiconductor detector may be an organic semiconductor detector comprising at least one organic material. Still, other embodiments are feasible. Thus, combinations of one or more organic semiconductor detectors and/or one or more inorganic semiconductor detectors are feasible.

The longitudinal optical sensor, in particular the focal longitudinal optical sensor and e.g. at least one further longitudinal optical sensor, and the transfer device specifically may be arranged on one common optical axis. For example, the at least one object may be illuminated by the at least one illumination source, which may be arranged on the common optical axis too, or which may be arranged apart from the common optical axis. The longitudinal optical sensor and the transfer device may be arranged such that light originating from the illuminated at least one object may travel through the transfer device before impinging on the longitudinal optical sensor. Between the at least one transfer device and the longitudinal optical sensor one or more reflective elements may be arranged, for example one or more beam splitter, which may reflect light partly from the common optical axis, e.g. to further detector such as CMOS detectors or cameras.

In one embodiment, the illumination source, the transfer device and the longitudinal optical sensor and/or a stack of longitudinal optical sensors may be arranged on one axis. This alignment may allow making the detector compact and less expensive. The light travelling from the illumination source to the object may impinge and pass the longitudinal optical sensor, which may generate a longitudinal sensor signal. Then the light may be reflected by the object, may travel trough the at least one transfer device and will impinge on the longitudinal optical sensor again. The longitudinal sensor signal may change due to the impinging light travelling from the object to the longitudinal optical sensor. The change in the longitudinal sensor signal may allow to determine the position of the at least one object.

For simultaneously determining the position of the at least one object and recording images, for example color videos, the longitudinal optical sensor may be arranged in front of an imaging device, for example a RGB camera. In this embodiment, the illumination source, for example a focused IR lamp, may be arranged displaced from the common optical axis, because of the opacity of the imaging device and the illumination source. The illumination light may be transferred to the common axis by mirrors which may be configured to reflect light in the infrared range of the electromagnetic spectrum and are light transmissive for light in the visible range of the electromagnetic spectrum. The infrared part of the electromagnetic spectrum generally refers to a spectral range of 780 nm to 1 mm, preferably 780 nm to 3.0 µm. The visible range of the electromagnetic spectrum generally refers to a spectral range of 380 nm to 780 nm, preferably 380 nm to 640 nm.

The detector may be used to determine more than one position of one or more objects. The illumination source may be configured to emit several concentrated light beams, each modulated with a different modulation frequency. The determined longitudinal sensor signal may be evaluated by Fourier transformation. Thus, it may be possible to determine the contribution of each illuminated point and/or region of the object with the same longitudinal optical sensor by using Fourier transformation.

Further, the detector, in particular the longitudinal optical sensor, may be configured to determine an x- and/or y-co-ordinate of the object. Thus, as outlined above, the detector may comprise one or more transversal optical sensors.

In a further aspect of the present invention, a human-machine interface for exchanging at least one item of information between a user and a machine is disclosed. The human-machine interface comprises at least one detector according to the present invention, such as according to one or more of the embodiments disclosed above or disclosed in further detail below. The human-machine interface is designed to generate at least one item of geometrical information of the user by means of the detector. The human-machine interface is designed to assign to the geometrical information at least one item of information, in particular at least one control command.

As used herein, the term "human-machine interface" generally refers to an arbitrary device or combination of devices adapted for exchanging at least one item of information, specifically at least one item of electronic information, between a user and a machine such as a machine having at least one data processing device. The generation of the item of information may be effected by a body posture and/or a movement of a user. The exchange of information may be performed in a unidirectional fashion and/or in a bidirectional fashion. Specifically, the human-machine interface may be adapted to allow for a user to provide one or more commands to the machine in a machine-readable fashion.

In a further aspect of the invention, an entertainment device for carrying out at least one entertainment function is disclosed. The entertainment device comprises at least one human-machine interface according to the present invention, such as disclosed in one or more of the embodiments disclosed above or disclosed in further detail below. The entertainment device is designed to enable at least one item of information to be input by player, i.e. a user using the entertainment device for entertainment purposes, by means of the human-machine interface, wherein the entertainment device is designed to vary the entertainment function in accordance with the information.

As used herein, an "entertainment device" is a device which may serve the purpose of leisure and/or entertainment of one or more users, in the following also referred to as one or more players. As an example, the entertainment device may serve the purpose of gaming, preferably computer gaming. Additionally or alternatively, the entertainment device may also be used for other purposes, such as for exercising, sports, physical therapy or motion tracking in general. Thus, the entertainment device may be implemented into a computer, a computer network or a computer system or may comprise a computer, a computer network or a computer system which runs one or more gaming software programs.

The entertainment device comprises at least one human-machine interface according to the present invention, such as according to one or more of the embodiments disclosed above and/or according to one or more of the embodiments disclosed below. The entertainment device is designed to enable at least one item of information to be input by a player by means of the human-machine interface. The at least one item of information may be transmitted to and/or may be used by a controller and/or a computer of the entertainment device.

The at least one item of information preferably may comprise at least one command adapted for influencing the course of a game. Thus, as an example, the at least one item of information may include at least one item of information on at least one orientation of the player and/or of one or more body parts of the player, thereby allowing for the player to simulate a specific position and/or orientation and/or action required for gaming. As an example, one or more of the following movements may be simulated and communicated to a controller and/or a computer of the entertainment device: dancing; running; jumping; swinging of a racket; swinging of a bat; swinging of a club; pointing of an object towards another object, such as pointing of a toy gun towards a target.

The entertainment device as a part or as a whole, preferably a controller and/or a computer of the entertainment device, is designed to vary the entertainment function in accordance with the information. Thus, as outlined above, a course of a game might be influenced in accordance with the at least one item of information. Thus, the entertainment device might include one or more controllers which might be separate from the evaluation device of the at least one detector and/or which might be fully or partially identical to the at least one evaluation device or which might even include the at least one evaluation device. Preferably, the at least one controller might include one or more data processing devices, such as one or more computers and/or microcontrollers.

In a further aspect of the present invention, a tracking system for tracking a position of at least one movable object is disclosed. The tracking system comprises at least one detector according to the present invention, such as disclosed in one or more of the embodiments given above or given in further detail below. The tracking system further comprises at least one track controller, wherein the track controller is adapted to track a series of positions of the object at specific points in time. For example the series of positions of the object may be tracked by recording groups of data or data pairs, each group of data or data pair comprising at least one position information and at least one time information. The track controller may be adapted to determine from the series of positions a movement of the object.

As used herein, a "tracking system" is a device which is adapted to gather information on a series of past positions of the at least one object and/or at least one part of the object. Additionally, the tracking system may be adapted to provide information on at least one predicted future position and/or orientation of the at least one object or the at least one part of the object. The tracking system may have at least one track controller, which may fully or partially be embodied as an electronic device, preferably as at least one data processing device, more preferably as at least one computer or microcontroller. Again, the at least one track controller may fully or partially comprise the at least one evaluation device and/or may be part of the at least one evaluation device and/or may fully or partially be identical to the at least one evaluation device.

The tracking system may be adapted to initiate one or more actions of the tracking system itself and/or of one or more separate devices. For the latter purpose, the tracking system, preferably the track controller, may have one or more wireless and/or wire-bound interfaces and/or other types of control connections for initiating at least one action. Preferably, the at least one track controller may be adapted to initiate at least one action in accordance with at least one actual position of the object. As an example, the action may be selected from the group consisting of: a prediction of a future position of the object; pointing at least one device towards the object; pointing at least one device towards the detector; illuminating the object; illuminating the detector.

As an example of application of a tracking system, the tracking system may be used for continuously pointing at least one first object to at least one second object even though the first object and/or the second object might move. Potential examples, again, may be found in industrial applications, such as in robotics and/or for continuously working on an article even though the article is moving, such as during manufacturing in a manufacturing line or assembly line. Additionally or alternatively, the tracking system might be used for illumination purposes, such as for continuously illuminating the object by continuously pointing an illumination source to the object even though the object might be moving. Further applications might be found in communication systems, such as in order to continuously transmit information to a moving object by pointing a transmitter towards the moving object.

The tracking system specifically may be part of a local or global positioning system. Additionally or alternatively, the tracking system may be part of a visible light communication system. Other uses are feasible.

The devices according to the present invention, i.e. the detector, the human-machine interface, the entertainment device, the tracking system or the camera, specifically may be used in combination with a local or global positioning system, such as for indoor or outdoor navigation. As an example, one or more devices according to the present invention may be combined with software/database-combinations such as Google Maps® or Google Street View®. Devices according to the present invention may further be used to analyze the distance to objects in the surrounding, the position of which can be found in the database.

From the distance to the position of the known object, the local or global position of the user may be calculated.

In a further aspect of the present invention, a camera for imaging at least one object is disclosed. The camera comprises at least one detector according to the present invention, such as disclosed in one or more of the embodiments given above or given in further detail below.

Thus, specifically, the present application may be applied in the field of photography. Thus, the detector may be part of a photographic device, specifically of a digital camera. Specifically, the detector may be used for 3D photography, specifically for digital 3D photography. Thus, the detector may form a digital 3D camera or may be part of a digital 3D camera. As used herein, the term "photography" generally refers to the technology of acquiring image information of at least one object. As further used herein, a "camera" generally is a device adapted for performing photography. As further used herein, the term "digital photography" generally refers to the technology of acquiring image information of at least one object by using a plurality of light-sensitive elements adapted to generate electrical signals indicating an intensity and/or color of illumination, preferably digital electrical signals. As further used herein, the term "3D photography" generally refers to the technology of acquiring image information of at least one object in three spatial dimensions. Accordingly, a 3D camera is a device adapted for performing 3D photography. The camera generally may be adapted for acquiring a single image, such as a single 3D image, or may be adapted for acquiring a plurality of images, such as a sequence of images. Thus, the camera may also be a video camera adapted for video applications, such as for acquiring digital video sequences.

Thus, generally, the present invention further refers to a camera, specifically a digital camera, more specifically a 3D camera or digital 3D camera, for imaging at least one object. As outlined above, the term imaging, as used herein, generally refers to acquiring image information of at least one object. The camera comprises at least one detector according to the present invention. The camera, as outlined above, may be adapted for acquiring a single image or for acquiring a plurality of images, such as image sequence, preferably for acquiring digital video sequences. Thus, as an example, the camera may be or may comprise a video camera. In the latter case, the camera preferably comprises a data memory for storing the image sequence.

As used within the present invention, the expression "position" generally refers to at least one item of information regarding one or more of an absolute position and an orientation of one or more points of the object. Thus, specifically, the position may be determined in a coordinate system of the detector, such as in a Cartesian coordinate system. Additionally or alternatively, however, other types of coordinate systems may be used, such as polar coordinate systems and/or spherical coordinate systems.

In a further aspect of the present invention, a method for determining a position of at least one object is disclosed, specifically a method for determining a position of at least one object. The method comprises the following steps, which may be performed in the given order or in a different order. Further, two or more or even all of the method steps may be performed simultaneously and/or overlapping in time. Further, one, two or more or even all of the method steps may be performed repeatedly. The method may further comprise additional method steps.

The method comprises the following method steps:
imaging the object into an image plane by using at least one transfer device, the transfer device having a focal plane,
providing at least one longitudinal optical sensor of a detector, wherein the longitudinal optical sensor has at least one sensor region, wherein the longitudinal optical sensor is at least partially transparent, and generating at least one longitudinal sensor signal, wherein the at least one longitudinal sensor signal is dependent on an illumination of the sensor region by at least one light beam traveling from the object to the detector, wherein the longitudinal sensor signal, given the same total power of the illumination, is dependent on a beam cross-section of the light beam in the sensor region, and
generating at least one item of information on a longitudinal position of the object by evaluating the longitudinal sensor signal,
wherein the at least one longitudinal optical sensor comprises a focal longitudinal optical sensor, wherein the focal longitudinal optical sensor at least substantially is arranged in the focal plane.

The method may comprise using the detector according to the present invention, such as disclosed in one or more of the embodiments given above or given in further detail below. Thus, with regard to definitions and potential embodiments of the method, reference may be made to the detector. Still, other embodiments are feasible.

As outlined above, see (15) and (16), when considering two longitudinal optical sensor signal currents $j(z, z_f)$ and $j(z, z'_f)$ of the same object at two different distances $z_f$ and $z'_f$ normalized to their focus current $j_{focal}, j_{focal}(z'_f)$ respectively, these curves may intersect at $z=z_{cross}$ if $$\frac{j_{FiP}(z, z_f)}{j_{focus}(z_f)} = \frac{j_{FiP}(z, z'_f)}{j_{focus}(z'_f)}, \qquad (21)$$

$$W_f^2(z, z_f) = W_f^2(z, z'_f)$$

As outlined above, see (17) and (18), for a Gaussian beam these simplifies to $$(z_{cross} - z_f)^2 = (z_{cross} - z'_f)^2 \qquad (22)$$

$$z_{cross} = \frac{1}{2} \frac{z'^2_f - z^2_f}{z'_f - z_f}.$$

Further, as outlined above, although the intersection of the curves remains dependent on the focus position of each curve, astonishingly, it was found that for a given optical system, the differences in $z_{cross}$ for different focal lengths are small, and $z_{cross}$ falls into a region where the longitudinal optical sensor current is less z-dependent. In general, a given optical system is limited to a certain optical range. Astonishingly, within a typical range of an optical system, a small z range or point close to the focus was found, where all normalized current curves intersect. Thus, measuring the longitudinal optical sensor current at this position or within this intersection range may yield to the normalization of the curve, which is $j_{focal}$. The focal longitudinal optical sensor may be spaced apart from the focal plane by a distance $\pm\varepsilon$, wherein $|\varepsilon| \leq 0.2 \cdot f$, with f being the focal length of the transfer device. For example, the longitudinal optical sensor may be spaced apart from the focal plane by $|\varepsilon| \leq 0.1 \cdot f$, preferably $|\varepsilon| \leq 0.05 \cdot f$, more preferably $|\varepsilon| \leq 0.02 \cdot f$, and most preferably $|\varepsilon| \leq 0.01 \cdot f$. The at least one focal longitudinal optical sensor may be arranged to the focal plane such that the at least one focal longitudinal optical sensor lies within the range or point where the curves intersect. Further, placing the at least one focal longitudinal optical sensor within this intersection range may avoid alignment and adjustment due to focus changes with movement of the object, since the intersection range may be only system dependent.

The method may further comprise evaluating at least one longitudinal sensor signal $j_{focal}$ of the focal longitudinal optical sensor and to derive a theoretical longitudinal sensor signal $j_{image}$ of a hypothetical longitudinal optical sensor in the image plane. For determining the theoretical longitudinal sensor signal $j_{image}$, a predetermined or determinable relationship between the longitudinal sensor signal $j_{focal}$ of the focal longitudinal optical sensor and the theoretical longitudinal sensor signal $j_{image}$ may be used. In particular, it has been found that, for determining the theoretical longitudinal sensor signal $j_{image}$, an assumption that the theoretical longitudinal sensor signal $j_{image}$ is proportional to the longitudinal sensor signal $j_{focal}$ of the focal longitudinal optical sensor may be used. For example, for determining the theoretical longitudinal sensor signal $j_{image}$, above-mentioned equation (19) may be used:

$$\frac{j_{image}}{j_{focal}} = const. \tag{19}$$

with const. being a predetermined or determinable constant. Preferably, for determining the theoretical longitudinal sensor signal $j_{image}$, above-mentioned equation (20) may be used:

$$\frac{j_{image}}{j_{focal}} = c(h_{target}, f_{lens}, l_{lens}) \tag{20}$$

with $c(h_{target}, f_{lens}, l_{lens})$ being a predetermined or determinable function dependent on the size $h_{target}$ of the object, the focal length $f_{lens}$ of the transfer device, and the aperture $l_{lens}$ of the transfer device. If the focal longitudinal optical sensor current $j_{focal}$ is determined and $c(h_{target}, f_{lens}, l_{lens})$ is known, the theoretical sensor signal $j_{image}$ can be determined. Thus, it may not be avoided to place a longitudinal optical sensor in or close to the image plane to determine the sensor signal in the image plane. Further, it may be possible to reduce the amount of longitudinal optical sensors necessary to resolve ambiguities. If the predetermined or determinable function dependent on the size $h_{target}$ of the object, the focal length $f_{lens}$ of the transfer device, and the aperture $l_{lens}$ of the transfer device is known, at least one longitudinal optical sensor may be sufficient to measure the position of the at least one object.

As outlined above, the possibility of reducing the number of longitudinal optical sensors or keeping the number of longitudinal optical sensors within the sensor stack low provides a plurality of advantages, including an improved system stability, improved measurement results, lower complexity of the system and reduced costs.

To determine a full curve of the longitudinal optical sensor signal current, and especially to determine the focus position $z_f$, at least two measurements of the longitudinal optical sensor signal current may be necessary. In general, if the focus position $z_f$ is completely unknown, two measurements are necessary, since two z-values can be assigned to each longitudinal optical sensor signal current, due to the symmetry of the curve. However, if a range of possible $z_f$ values is known, one measurement might be enough, i.e., if the measurement is known to be always between $z_f$ and the transfer device.

For general objects, the size of the object $h_{target}$ may be unknown. The size of the object may be determined by a pixelated CMOS detector and/or an unpixelated inorganic diode. In a pixelated CMOS detector, pixels may be counted to determine the size of the object. In an unpixelated diode, e.g. an unpixelated Si-diode, a diode current may only dependent on the number of photons. The size of the object may be given by the ratio between the diode current and the intensity dependent longitudinal optical sensor signal current. Further, the sensor signal may be influenced by the size of the object and may further be dependent on the contrast of the object. For general objects, the value of $h_{target}$ may therefore be obtained by analyzing the number and intensity of pixel values on a CMOS detector.

For further details and embodiments, especially of the focal longitudinal optical sensor and the derivation of the formulae outlined above, reference may be made to the description of the detector. Still, other embodiments are feasible.

In the generation step, the item of information on the longitudinal position may be generated by considering an input signal of the illumination source. The illumination light may travel from the illumination source to the object and may impinge on its path on a side of the longitudinal optical sensor facing the illumination source. The longitudinal detector may generate a longitudinal sensor signal dependent on the power of the impinging illumination light to which it is referred to as input signal of the illumination source. The illumination light may pass through the longitudinal optical sensor and may illuminate the at least one object, which may reflect the illumination light. The reflected light may travel back to the longitudinal optical sensor and may impinge on its path on the other side of the longitudinal optical sensor facing the object. The longitudinal detector may generate a longitudinal sensor signal dependent on the power of the impinging reflected light. The at least one item of information on the longitudinal position of the object may be generated from the longitudinal sensor signal. For this, the input signal of the illumination source may be subtracted from the longitudinal sensor signal.

In a further aspect of the present invention, a use of the detector according to the present invention, such as disclosed in one or more of the embodiments discussed above and/or as disclosed in one or more of the embodiments given in further detail below, is disclosed, for a purpose of use, selected from the group consisting of: a position measurement in traffic technology; an entertainment application; a security application; a human-machine interface application; a tracking application; a photography application; an imaging application or camera application; a mapping application for generating maps of at least one space, such as at least one space selected from the group of a room, a building and a street; a use in combination with at least one time-of-flight measurement.

Thus, generally, the detector according to the present invention may be applied in various fields of uses. Specifically, the detector may be applied for a purpose of use, selected from the group consisting of: a position measurement in traffic technology; an entertainment application; a security application; a human-machine interface application; a tracking application; a photography application; a mapping application for generating maps of at least one space, such as at least one space selected from the group of a room, a building and a street; a mobile application; an optical head-mounted display; a webcam; an audio device; a dolby surround audio system; a computer peripheral device; a gaming application; a camera or video application; a security application; a surveillance application; an automotive application; a transport application; a medical application; a sports' application; a machine vision application; a vehicle application; an airplane application; a ship application; a spacecraft application; a building application; a construction application; a cartography application; a manufacturing application; a use in combination with at least one time-of-flight detector. Additionally or alternatively, applications in local and/or global positioning systems may be named, especially landmark-based positioning and/or navigation, specifically for use in cars or other vehicles (such as trains, motorcycles, bicycles, trucks for cargo transportation), robots or for use by pedestrians. Further, indoor positioning systems may be named as potential applications, such as for household applications and/or for robots used in manufacturing technology.

Thus, as for the optical detectors and devices disclosed in WO 2012/110924 A1 or in U.S. provisional applications 61/739,173, filed on Dec. 19, 2012, 61/749,964, filed on Jan. 8, 2013, and 61/867,169, filed on Aug. 19, 2013, and WO2014/097181 A1, the detector, the detector system, the human-machine interface, the entertainment device, the tracking system or the camera according to the present invention (in the following simply referred to as "the devices according to the present invention") may be used for a plurality of application purposes, such as one or more of the purposes disclosed in further detail in the following.

Thus, firstly, the devices according to the present invention may be used in mobile phones, tablet computers, wearable computers, laptops, smart panels or other stationary or mobile computer or communication applications. Thus, the devices according to the present invention may be combined with at least one active light source, such as a light source emitting light in the visible range or infrared spectral range, in order to enhance performance. The at least one optional active light source may be or may comprise at least one permanently emitting light source or may be or may comprise at least one discontinuously emitting light source. The latter case, as an example, may be realized by using at least one flash. As an example, the devices according to the present invention may be used as cameras and/or sensors, such as in combination with mobile software for scanning environment, objects and living beings. The devices according to the present invention may even be combined with 2D cameras, such as conventional cameras, in order to increase imaging effects. The devices according to the present invention may further be used for surveillance and/or for recording purposes or as input devices to control mobile devices, especially in combination with voice and/or gesture recognition and/or eye tracking. Thus, specifically, the devices according to the present invention acting as human-machine interfaces, also referred to as input devices, may be used in mobile applications, such as for controlling other electronic devices or components via the mobile device, such as the mobile phone. As an example, the mobile application including at least one device according to the present invention may be used for controlling a television set, a game console, a music player or music device or other entertainment devices.

Further, the devices according to the present invention may be used in webcams or other peripheral devices for computing applications. Thus, as an example, the devices according to the present invention may be used in combination with software for imaging, recording, surveillance, scanning or motion detection. As outlined in the context of the human-machine interface and/or the entertainment device, the devices according to the present invention are particularly useful for giving commands by facial expressions and/or body expressions. The devices according to the present invention can be combined with other input generating devices like e.g. a mouse, a keyboard, a touchpad, microphone, an eye tracker etc. Further, the devices according to the present invention may be used in applications for gaming, such as by using a webcam. Further, the devices according to the present invention may be used in virtual training applications and/or video conferences Further, the devices according to the present invention may be used in mobile audio devices, television devices and gaming devices, as partially explained above. Specifically, the devices according to the present invention may be used as controls or control devices for electronic devices, entertainment devices or the like. Further, the devices according to the present invention may be used for eye detection or eye tracking, such as in 2D- and 3D-display techniques, especially with transparent displays for virtual and/or augmented reality applications and/or for recognizing whether a display is being looked at and/or from which perspective a display is being looked at.

Further, the devices according to the present invention may be used in or as a digital camera. As an example for potential embodiments which may make use of one or more devices according to the present invention, digital still cameras and/or reflex cameras such as SLR cameras may be used. Additionally or alternatively, cameras using one or more dye-sensitized solar cells may be realized, such as one or more devices disclosed in WO2014/097181 A1. For these applications, reference may be made to the use of the devices according to the present invention in mobile applications such as mobile phones and/or smart phones, as disclosed above.

Further, the devices according to the present invention may be used for security or surveillance applications. Thus, as an example, at least one device according to the present invention can be combined with one or more digital and/or analog electronics that will give a signal if an object is within or outside a predetermined area (e.g. for surveillance applications in banks or museums). Specifically, the devices according to the present invention may be used for optical encryption. Detection by using at least one device according to the present invention can be combined with other detection devices to complement wavelengths, such as with IR, x-ray, UV-VIS, radar or ultrasound detectors. The devices according to the present invention may further be combined with at least one active infrared light source and/or at least one active structured light source to allow detection in low-light surroundings.

Further, given the ease and accuracy of 3D detection by using the devices according to the present invention, the devices according to the present invention generally may be used for facial, body and person recognition and identification. Therein, the devices according to the present invention may be combined with other detection means for identification or personalization purposes such as passwords, finger prints, iris detection, voice recognition or other means. Thus, generally, the devices according to the present invention may be used in security devices and other personalized applications.

Further, the devices according to the present invention may be used as 3D barcode readers for product identification.

In addition to the security and surveillance applications mentioned above, the devices according to the present invention generally can be used for surveillance and monitoring of spaces and areas. Thus, the devices according to the present invention may be used for surveying and monitoring spaces and areas and, as an example, for triggering or executing alarms in case prohibited areas are violated. Thus, generally, the devices according to the present invention may be used for surveillance purposes in building surveillance or museums, optionally in combination with other types of sensors, such as in combination with motion or heat sensors, in combination with image intensifiers or image enhancement devices and/or photomultipliers.

Further, the devices according to the present invention may advantageously be applied in camera applications such as video and camcorder applications. Thus, the devices according to the present invention may be used for motion capture and 3D-movie recording. Therein, the devices according to the present invention generally provide a large number of advantages over conventional optical devices. Thus, the devices according to the present invention generally require a lower complexity with regard to optical components. Thus, as an example, the number of lenses may be reduced as compared to conventional optical devices, such as by providing the devices according to the present invention having one lens only. Due to the reduced complexity, very compact devices are possible, such as for mobile use. Conventional optical systems having two or more lenses with high quality generally are voluminous, such as due to the general need for voluminous beam-splitters. As a further advantage in potential applications of devices according to the present invention for motion capturing, the simplified combination of several cameras in order to cover a scene may be named, since absolute 3D information may be obtained. This also may simplify merging scenes recorded by two or more 3D-cameras. Further, the devices according to the present invention generally may be used for focus/autofocus devices, such as autofocus cameras. Further, the devices according to the present invention may also be used in optical microscopy, especially in confocal microscopy.

Further, the devices according to the present invention generally are applicable in the technical field of automotive technology and transport technology. Thus, as an example, the devices according to the present invention may be used as distance and surveillance sensors, such as for adaptive cruise control, emergency brake assist, lane departure warning, surround view, blind spot detection, rear cross traffic alert, and other automotive and traffic applications. Further, the devices according to the present invention can also be used for velocity and/or acceleration measurements, such as by analyzing a first and second time-derivative of position information gained by using the detector according to the present invention. This feature generally may be applicable in automotive technology, transportation technology or general traffic technology. Applications in other fields of technology are feasible. A specific application in an indoor positioning system may be the detection of positioning of passengers in transportation, more specifically to electronically control the use of safety systems such as airbags. The use of an airbag may be prevented in case the passenger is located as such, that the use of an airbag will cause a severe injury.

Applications in other fields of technology are feasible. For use in automotive systems, devices according to the present invention may be connected to one or more electronic control units of the vehicle and may enable further connections via controller area networks and the like. For testing purposes in automotive or other complex applications, especially for use in combination with further sensors and/or actuators, the integration in hardware-in-the-loop simulation systems is possible.

In these or other applications, generally, the devices according to the present invention may be used as standalone devices or in combination with other sensor devices, such as in combination with radar and/or ultrasonic devices. Specifically, the devices according to the present invention may be used for autonomous driving and safety issues. Further, in these applications, the devices according to the present invention may be used in combination with infrared sensors, radar sensors, which are sonic sensors, two-dimensional cameras or other types of sensors. The devices according to the present invention specifically may be used in combination with recognition software, such as standard image recognition software. Thus, signals and data as provided by the devices according to the present invention typically are readily processable and, therefore, generally require lower calculation power than established stereovision systems such as LIDAR. Given the low space demand, the devices according to the present invention such as cameras may be placed at virtually any place in a vehicle, such as on a window screen, on a front hood, on bumpers, on lights, on mirrors or other places the like. Various detectors according to the present invention such as one or more detectors based on the effect disclosed within the present invention can be combined, such as in order to allow autonomously driving vehicles or in order to increase the performance of active safety concepts. Thus, various devices according to the present invention may be combined with one or more other devices according to the present invention and/or conventional sensors, such as in the windows like rear window, side window or front window, on the bumpers or on the lights.

A combination of at least one device according to the present invention such as at least one detector according to the present invention with one or more rain detection sensors is also possible. This is due to the fact that the devices according to the present invention generally are advantageous over conventional sensor techniques such as radar, specifically during heavy rain. A combination of at least one device according to the present invention with at least one conventional sensing technique such as radar may allow for a software to pick the right combination of signals according to the weather conditions.

Further, the devices according to the present invention generally may be used as break assist and/or parking assist and/or for speed measurements. Speed measurements can be integrated in the vehicle or may be used outside the vehicle, such as in order to measure the speed of other cars in traffic control. Further, the devices according to the present invention may be used for detecting free parking spaces in parking lots.

Further, the devices according to the present invention may be used in the fields of medical systems and sports. Thus, in the field of medical technology, surgery robotics, e.g. for use in endoscopes, may be named, since, as outlined above, the devices according to the present invention may require a low volume only and may be integrated into other devices. Specifically, the devices according to the present invention having one lens, at most, may be used for capturing 3D information in medical devices such as in endoscopes. Further, the devices according to the present invention may be combined with an appropriate monitoring software, in order to enable tracking and analysis of movements. These applications are specifically valuable e.g. in medical treatments and long-distance diagnosis and telemedicine. Further, applications for positioning the body of patients in tomography or radiotherapy are possible, or for measuring the body shape of patients before surgery, to detect diseases, or the like.

Further, the devices according to the present invention may be applied in the field of sports and exercising, such as for training, remote instructions or competition purposes. Specifically, the devices according to the present invention may be applied in the fields of dancing, aerobic, football, soccer, basketball, baseball, cricket, hockey, track and field, swimming, polo, handball, volleyball, rugby, sumo, judo, fencing, boxing etc. The devices according to the present invention can be used to detect the position of a ball, a bat, a sword, motions, etc., both in sports and in games, such as to monitor the game, support the referee or for judgment, specifically automatic judgment, of specific situations in sports, such as for judging whether a point or a goal actually was made.

The devices according to the present invention further may be used in rehabilitation and physiotherapy, in order to encourage training and/or in order to survey and correct movements. Therein, the devices according to the present invention may also be applied for distance diagnostics.

Further, the devices according to the present invention may be applied in the field of machine vision. Thus, one or more of the devices according to the present invention may be used e.g. as a controlling unit for autonomous driving and or working of robots. In combination with moving robots, the devices according to the present invention may allow for autonomous movement and/or autonomous detection of failures in parts. The devices according to the present invention may also be used for manufacturing and safety surveillance, such as in order to avoid accidents including but not limited to collisions between robots, production parts and living beings. In robotics, the safe and direct interaction of humans and robots is often an issue, as robots may severely injure humans when they are not recognized. Devices according to the present invention may help robots to position objects and humans better and faster and allow a safe interaction. One particular advantage of the devices according to the present invention is the low likelihood of signal interference. Therefore, multiple sensors can work at the same time in the same environment, without the risk of signal interference. Thus, the devices according to the present invention generally may be useful in highly automated production environments like e.g. but not limited to automotive, mining, steel, etc. The devices according to the present invention can also be used for quality control in production, e.g. in combination with other sensors like 2-D imaging, radar, ultrasound, IR etc., such as for quality control or other purposes. Further, the devices according to the present invention may be used for assessment of surface quality, such as for surveying the surface evenness of a product or the adherence to specified dimensions, from the range of micrometers to the range of meters. Other quality control applications are feasible. In a manufacturing environment, the devices according to the present invention are especially useful for processing natural products such as food or wood, with a complex 3-dimensional structure to avoid large amounts of waste material. Further, devices according to the present invention may be used for monitoring the filling level of tanks, silos etc. Further, devices according to the present invention may be used for communication purposes, such as for visible light communications.

Further, the devices according to the present invention may be used in the polls, airplanes, ships, spacecraft and other traffic applications. Thus, besides the applications mentioned above in the context of traffic applications, tracking systems for aircraft, vehicles and the like may be named. The use of at least one device according to the present invention, such as at least one detector according to the present invention, for monitoring the speed and/or the direction of moving objects is feasible. Specifically, the tracking of fast moving objects on land, sea and in the air including space may be named. The at least one device according to the present invention, such as the at least one detector according to the present invention, specifically may be mounted on a still-standing and/or on a moving device. An output signal of the at least one device according to the present invention can be combined e.g. with a guiding mechanism for autonomous or guided movement of another object. Thus, applications for avoiding collisions or for enabling collisions between the tracked and the steered object are feasible. The devices according to the present invention generally are useful and advantageous due to the low calculation power required and due to the instant response of the detection system. The devices according to the present invention are particularly useful but not limited to e.g. speed control and air traffic control devices.

The devices according to the present invention generally may be used in various applications, including guidance for ships in harbors or in dangerous areas, and for aircraft at landing or starting. Therein, fixed, known active and/or passive targets may be used for precise guidance. The same can be used for vehicles driving in dangerous but well defined routes, such as mining vehicles.

Further, as outlined above, the devices according to the present invention may be used in the field of gaming. Thus, the devices according to the present invention can be used with multiple objects of the same or of different size, color, shape, etc., such as for movement detection in combination with software that incorporates the movement into its content. In particular, applications are feasible in implementing movements into graphical output. Further, applications of the devices according to the present invention for giving commands are feasible, such as by using one or more of the devices according to the present invention for gesture or facial recognition. The devices according to the present invention may be combined with an active system in order to work under e.g. low-light conditions or in other situations in which enhancement of the surrounding conditions is required. Additionally or alternatively, a combination of one or more of the devices according to the present invention with one or more IR or VIS light sources is possible. A combination of a detector according to the present invention with special devices is also possible, which can be distinguished easily by the system and its software, e.g. and not limited to, a special color, shape, relative position to other devices, speed of movement, light, frequency used to modulate light sources on the device, surface properties, material used, reflection properties, transparency degree, absorption characteristics, etc. The device can, amongst other possibilities, resemble a stick, a racquet, a club, a gun, a knife, a wheel, a ring, a steering wheel, a bottle, a ball, a glass, a vase, a spoon, a fork, a cube, a dice, a figure, a puppet, a teddy, a beaker, a pedal, a hat, a pair of glasses, a helmet, a switch, a glove, jewelry, a musical instrument or an auxiliary device for playing a musical instrument, such as a plectrum, a drumstick or the like. Other options are feasible.

Further, the devices according to the present invention generally may be used in the field of building, construction and cartography. Thus, generally, one or more devices according to the present invention may be used in order to measure and/or monitor environmental areas, e.g. countryside or buildings. Therein, one or more of the devices according to the present invention may be combined with other methods and devices or can be used solely in order to monitor progress and accuracy of building projects, changing objects, houses, etc. The devices according to the present invention can be used for generating three-dimensional models of scanned environments, in order to construct maps of rooms, streets, houses, communities or landscapes, both from ground or from air. Potential fields of application may be construction, cartography, real estate management, land surveying or the like.

One or more devices according to the present invention can further be used for scanning of objects, such as in combination with CAD or similar software, such as for additive manufacturing and/or 3D printing. Therein, use may be made of the high dimensional accuracy of the devices according to the present invention, e.g. in x-, y- or z-direction or in any arbitrary combination of these directions, such as simultaneously. Further, the devices according to the present invention may be used in inspections and maintenance, such as pipeline inspection gauges.

As outlined above, the devices according to the present invention may further be used in manufacturing, quality control or identification applications, such as in product identification or size identification (such as for finding an optimal place or package, for reducing waste etc.). Further, the devices according to the present invention may be used in logistics applications. Thus, the devices according to the present invention may be used for optimized loading or packing containers or vehicles. Further, the devices according to the present invention may be used for monitoring or controlling of surface damages in the field of manufacturing, for monitoring or controlling rental objects such as rental vehicles, and/or for insurance applications, such as for assessment of damages. Further, the devices according to the present invention may be used for identifying a size of material, object or tools, such as for optimal material handling, especially in combination with robots and/or for ensuring quality or accuracy in a manufacturing process, such as the accuracy of product size or volume or the optical precision of a manufactured lens. Further, the devices according to the present invention may be used for process control in production, e.g. for observing filling level of tanks. Further, the devices according to the present invention may be used for maintenance of production assets like, but not limited to, tanks, pipes, reactors, tools etc. Further, the devices according to the present invention may be used for analyzing 3D-quality marks. Further, the devices according to the present invention may be used in manufacturing tailor-made goods such as tooth inlays, dental braces, prosthesis, clothes or the like. The devices according to the present invention may also be combined with one or more 3D-printers for rapid prototyping, 3D-copying or the like.

Further, the devices according to the present invention may be used for detecting the shape of one or more articles, such as for anti-product piracy and for anti-counterfeiting purposes.

Summarizing the above-mentioned findings, the following embodiments are preferred within the present invention:

Embodiment 1: A detector for determining a position of at least one object, comprising:
at least one transfer device for imaging the object into an image plane, the transfer device having a focal plane,
at least one longitudinal optical sensor, wherein the longitudinal optical sensor has at least one sensor region, wherein the longitudinal optical sensor is at least partially transparent, wherein the longitudinal optical sensor is designed to generate at least one longitudinal sensor signal in a manner dependent on an illumination of the sensor region by at least one light beam propagating from the object to the detector, wherein the longitudinal sensor signal, given the same total power of the illumination, is dependent on a beam cross-section of the light beam in the sensor region; and
at least one evaluation device, wherein the evaluation device is designed to generate at least one item of information on a longitudinal position of the object by evaluating the longitudinal sensor signal, wherein the at least one longitudinal optical sensor comprises a focal longitudinal optical sensor, wherein the focal longitudinal optical sensor at least substantially is arranged in the focal plane.

Embodiment 2: The detector according to the preceding embodiment, wherein the focal longitudinal optical sensor is spaced apart from the focal plane by a distance $\pm\varepsilon$, wherein $|\varepsilon| \leq 0.2 \cdot f$, with f being the focal length of the transfer device.

Embodiment 3: The detector according to the preceding embodiment, wherein $|\varepsilon| \leq 0.1 \cdot f$, preferably $|\varepsilon| \leq 0.05 \cdot f$, more preferably $|\varepsilon| \leq 0.02 \cdot f$, and most preferably $|\varepsilon| \leq 0.01 \cdot f$.

Embodiment 4: The detector according to any one of the preceding embodiments, wherein the evaluation device is adapted to evaluate at least one longitudinal sensor signal $j_{focal}$ of the focal longitudinal optical sensor and to derive a theoretical longitudinal sensor signal $j_{image}$ of a hypothetical longitudinal optical sensor in the image plane.

Embodiment 5: The detector according to the preceding embodiment, wherein the evaluation device is adapted to use, for determining the theoretical longitudinal sensor signal $j_{image}$ a predetermined or determinable relationship between the longitudinal sensor signal $j_{focal}$ of the focal longitudinal optical sensor and the theoretical longitudinal sensor signal $j_{image}$.

Embodiment 6: The detector according to any one of the two preceding embodiments, wherein the evaluation device is adapted to use, for determining the theoretical longitudinal sensor signal $j_{image}$, an assumption that the theoretical longitudinal sensor signal $j_{image}$ is proportional to the longitudinal sensor signal $j_{focal}$ of the focal longitudinal optical sensor.

Embodiment 7: The detector according to the preceding embodiment, wherein the evaluation device, for determining the theoretical longitudinal sensor signal $j_{iamge}$, is adapted to use the following relationship:

$$\frac{j_{image}}{j_{focal}} = const.,$$

with const. being a predetermined or determinable constant.

Embodiment 8: The detector according to any one of the two preceding embodiments, wherein the evaluation device, for determining the theoretical longitudinal sensor signal $j_{image}$, is adapted to use the following relationship:

$$\frac{j_{image}}{j_{focal}} = c(h_{target}, f_{lens}, l_{lens}),$$

with $c(h_{target}, f_{lens}, l_{lens})$ being a predetermined or determinable function dependent on the size $h_{target}$ of the object, the focal length $l_{lens}$ of the transfer device, and the aperture $l_{lens}$ of the transfer device.

Embodiment 9: The detector according to any one of the preceding embodiments, wherein the at least one longitudinal optical sensor, besides the focal longitudinal optical sensor, comprises at least one further longitudinal optical sensor.

Embodiment 10: The detector according to the preceding embodiment, wherein the at least one longitudinal optical sensor comprises a stack of longitudinal optical sensors.

Embodiment 11: The detector according to the preceding embodiment, wherein the focal longitudinal optical sensor forms part of the stack of longitudinal optical sensors.

Embodiment 12: The detector according to any one of the two preceding embodiments, wherein the stack of longitudinal optical sensors comprises no more than three longitudinal optical sensors.

Embodiment 13: The detector according to any one of the three preceding embodiments, wherein the stack is composed of longitudinal optical sensors being arranged such that the sensor regions of the longitudinal optical sensors are oriented essentially perpendicular to an optical axis of the detector.

Embodiment 14: The detector according to any one of the five preceding embodiments wherein the transfer device comprises at least one optical element selected from the group consisting of: a lens, a focusing mirror, a defocusing mirror.

Embodiment 15: The detector according to any one of the preceding embodiments, wherein the detector further comprises at least one imaging device, wherein the imaging device is adapted such that the light beam traveling from the object to the detector passes through the longitudinal optical sensor before impinging on the imaging device.

Embodiment 16: The detector according to the preceding embodiment, wherein the imaging device comprises a camera chip.

Embodiment 17: The detector according to any one of the two preceding embodiment, wherein the imaging device comprises an inorganic imaging device.

Embodiment 18: The detector according to any one of the three preceding embodiments, wherein the imaging device comprises a matrix of pixels.

Embodiment 19: The detector according to any one of the four preceding embodiments, wherein the imaging device comprises a chip selected from the group consisting of a CMOS chip and a CCD chip.

Embodiment 20: The detector according to any one of the five preceding embodiments, wherein the imaging device is adapted to resolve colors.

Embodiment 21: The detector according to the preceding embodiment, wherein the imaging device is a full-color CCD or CMOS chip.

Embodiment 22: The detector according to any one of the preceding embodiments, wherein the longitudinal sensor signal is further dependent on a modulation frequency of the light beam.

Embodiment 23: The detector according to any one of the preceding embodiments, wherein the detector further comprises at least one illumination source for illuminating the object.

Embodiment 24: The detector according to the preceding embodiment, wherein the Illumination source is adapted to periodically modulate at least one optical property of the illumination light.

Embodiment 25: The detector according to the preceding embodiment, wherein the at least one optical property is selected from the group consisting of an amplitude and a phase of the illumination light.

Embodiment 26: The detector according to any one of the three preceding embodiments, wherein the detector comprises at least one modulation device for periodically modulating at least one property of the illumination light.

Embodiment 27: The detector according to the preceding embodiment, wherein the modulation device comprises a spatial light modulator, preferably a micro-mirror device and more preferably a DLP® device.

Embodiment 28: The detector according to any one of the preceding embodiments, wherein the light beam at least partially propagates substantially parallel to an optical axis of the detector.

Embodiment 29: The detector according to any one of the preceding embodiments, wherein the at least one longitudinal optical sensor, preferably the at least one focal longitudinal optical sensor, comprises at least one semiconductor detector.

Embodiment 30: The detector according to the preceding embodiment, wherein the semiconductor detector is an organic semiconductor detector comprising at least one organic material.

Embodiment 31: The detector according to any one of the two preceding embodiments, wherein the semiconductor detector is selected from the group consisting of an organic solar cell, a dye solar cell, a dye-sensitized solar cell, a solid dye solar cell, a solid dye-sensitized solar cell.

Embodiment 32: The detector according to any of the preceding embodiments, wherein the at least one longitudinal optical sensor, preferably the at least one organic semiconductor detector, comprises at least one first electrode, at least one n-semiconducting metal oxide, at least one dye, at least one p-semiconducting organic material, preferably a solid p-semiconducting organic material, and at least one second electrode.

Embodiment 33: The detector according to the preceding embodiment, wherein both the first electrode and the second electrode are transparent.

Embodiment 34: The detector according to any one of the preceding embodiments, wherein the evaluation device is designed to generate the at least one item of information on the longitudinal position of the object from at least one predefined relationship between a geometry of an illumination of the sensor region by the light beam and a relative positioning of the object with respect to the detector.

Embodiment 35: The detector according to the preceding embodiment, wherein the predefined relationship between the geometry of the illumination of the sensor region by the light beam and the relative positioning of the object with respect to the detector is taking account of a known power of the illumination.

Embodiment 36: The detector according to any one of the two preceding embodiment, wherein the predefined relationship between the geometry of the illumination of the sensor region by the light beam and the relative positioning of the object with respect to the detector is taking account of a modulation frequency with which the light beam is modulated.

Embodiment 37: A human-machine interface for exchanging at least one item of information between a user and a machine, wherein the human-machine interface comprises at least one detector according to any one of the preceding embodiments, wherein the human-machine interface is designed to generate at least one item of geometrical information of the user by means of the detector, wherein the human-machine interface is designed to assign to the geometrical information at least one item of information, in particular at least one control command.

Embodiment 38: The human-machine interface according to the preceding embodiment, wherein the generation of the item of information is effected by a body posture and/or a movement of a user.

Embodiment 39: An entertainment device for carrying out at least one entertainment function, wherein the entertainment device comprises at least one human-machine interface according to any one of the two preceding embodiments, wherein the entertainment device is designed to enable at least one item of information to be input by a player by means of the human-machine interface, wherein the entertainment device is designed to vary the entertainment function in accordance with the information.

Embodiment 40: A tracking system for tracking the position of at least one movable object, the tracking system comprising a detector according to any one of the preceding embodiments relating to a detector, the tracking system further comprising at least one track controller, wherein the track controller is adapted to track a series of positions of the object at specific points in time.

Embodiment 41: The tracking system according to the preceding embodiment, wherein the track controller is adapted to determine from the series of positions a movement of the object.

Embodiment 42: The tracking system according to any one of the two preceding embodiments, wherein the tracking system is part of a local or global positioning system.

Embodiment 43: The tracking system according to any one of the three preceding embodiments, wherein the tracking system is part of a visible light communication system.

Embodiment 44: A camera for imaging at least one object, the camera comprising at least one detector according to any one of the preceding embodiments referring to a detector.

Embodiment 45: A method for determining a position of at least one object, the method comprising:
- imaging the object into an image plane by using at least one transfer device, the transfer device having a focal plane,
- providing at least one longitudinal optical sensor, wherein the longitudinal optical sensor has at least one sensor region, wherein the longitudinal optical sensor is at least partially transparent, and generating at least one longitudinal sensor signal by using the at least one longitudinal optical sensor, wherein the at least one longitudinal sensor signal is dependent on an illumination of the sensor region by at least one light beam propagating from the object to the longitudinal optical sensor, specifically to a detector comprising the at least one longitudinal optical sensor, wherein the longitudinal sensor signal, given the same total power of the illumination, is dependent on a beam cross-section of the light beam in the sensor region; and
- generating at least one item of information on a longitudinal position of the object by evaluating the longitudinal sensor signal, wherein the at least one longitudinal optical sensor comprises a focal longitudinal optical sensor, wherein the focal longitudinal optical sensor at least substantially is arranged in the focal plane.

Embodiment 46: The method according to the preceding embodiment, wherein the method comprises using the detector according to any one of the preceding embodiments referring to a detector.

Embodiment 47: The method according to any one of the preceding embodiments relating to a method, wherein the focal longitudinal optical sensor is spaced apart from the focal plane by a distance $\pm\varepsilon$, wherein $|\varepsilon|\leq0.2\cdot f$, with f being the focal length of the transfer device.

Embodiment 48: The method according to the preceding embodiment, wherein $|\varepsilon|\leq0.1\cdot f$, preferably $|\varepsilon|\leq0.05\cdot f$, more preferably $|\varepsilon|\leq0.02\cdot f$, and most preferably $|\varepsilon|\leq0.01\cdot f$.

Embodiment 49: The method according to any one of the preceding embodiment relating to a method, the method further comprises evaluating at least one longitudinal sensor signal $j_{focal}$ of the focal longitudinal optical sensor and to derive a theoretical longitudinal sensor signal $j_{image}$ of a hypothetical longitudinal optical sensor in the image plane.

Embodiment 50: The method according to the preceding embodiment, wherein, for determining the theoretical longitudinal sensor signal $j_{image}$ a predetermined or determinable relationship between the longitudinal sensor signal $j_{focal}$ of the focal longitudinal optical sensor and the theoretical longitudinal sensor signal $j_{image}$ is used.

Embodiment 51: The method according to any one of the two preceding embodiments, wherein, for determining the theoretical longitudinal sensor signal $j_{image}$, an assumption that the theoretical longitudinal sensor signal $j_{image}$ is proportional to the longitudinal sensor signal $j_{focal}$ of the focal longitudinal optical sensor is used.

Embodiment 52: The method according to the preceding embodiment, wherein, for determining the theoretical longitudinal sensor signal $j_{image}$, the following relationship is used:

$$\frac{j_{image}}{j_{focal}} = const.,$$

with const. being a predetermined or determinable constant.

Embodiment 53: The method according to any one of the two preceding embodiments, wherein, for determining the theoretical longitudinal sensor signal $j_{image}$, the following relationship is used:

$$\frac{j_{image}}{j_{focal}} = c(h_{target}, f_{lens}, l_{lens}),$$

With $c(h_{target}, f_{lens}, l_{lens})$ being a predetermined or determinable function dependent on the size $h_{target}$ of the object, the focal length $f_{lens}$ of the transfer device, and the aperture $l_{lens}$ of the transfer device.

Embodiment 54: The method according to any one of the preceding embodiments relating to a method, wherein the at least one longitudinal optical sensor, besides the focal longitudinal optical sensor, comprises at least one further longitudinal optical sensor.

Embodiment 55: The method according to the preceding embodiment, wherein the at least one longitudinal optical sensor comprises a stack of longitudinal optical sensors.

Embodiment 56: The method according to the preceding embodiment, wherein the focal longitudinal optical sensor forms part of the stack of longitudinal optical sensors.

Embodiment 57: The method according to any one of the two preceding embodiments, wherein the stack of longitudinal optical sensors comprises no more than three longitudinal optical sensors.

Embodiment 58: The method according to any one of the three preceding embodiments, wherein the stack is composed of longitudinal optical sensors being arranged such that the sensor regions of the longitudinal optical sensors are oriented essentially perpendicular to an optical axis, specifically an optical axis of a detector used by the method.

Embodiment 59: The method according to any one of the preceding embodiments relating to a method, wherein the transfer device comprises at least one optical element selected from the group consisting of: a lens, a focusing mirror, a defocusing mirror.

Embodiment 60: The method according to any one of the preceding embodiments relating to a method, wherein the method further comprises using at least one imaging device, wherein the imaging device is adapted such that the light beam traveling from the object to the detector passes through the longitudinal optical sensor before impinging on the imaging device.

Embodiment 61: The method according to the preceding embodiment, wherein the imaging device comprises a camera chip.

Embodiment 62: The method according to any one of the two preceding embodiments, wherein the imaging device comprises an inorganic imaging device.

Embodiment 63: The method according to any one of the three preceding embodiments, wherein the imaging device comprises a matrix of pixels.

Embodiment 64: The method according to any one of the four preceding embodiments, wherein the imaging device comprises a chip selected from the group consisting of a CMOS chip and a CCD chip.

Embodiment 65: The method according to any one of the five preceding embodiments, wherein the imaging device is adapted to resolve colors.

Embodiment 66: The method according to the preceding embodiment, wherein the imaging device is a full-color CCD or CMOS chip.

Embodiment 67: The method according to any one of the preceding embodiments relating to a method, wherein the longitudinal sensor signal is further dependent on a modulation frequency of the light beam.

Embodiment 68: The method according to any one of the preceding embodiments relating to a method, wherein the method further comprises using at least one illumination source for illuminating the object.

Embodiment 69: The method according to the preceding embodiment, wherein the Illumination source is adapted to periodically modulate at least one optical property of the illumination light.

Embodiment 70: The method according to the preceding embodiment, wherein the at least one optical property is selected from the group consisting of an amplitude and a phase of the illumination light.

Embodiment 71: The method according to any one of the preceding embodiments relating to a method, wherein the light beam at least partially propagates substantially parallel to an optical axis, specifically an optical axis of a detector used by the method.

Embodiment 72: The method according to any one of the preceding embodiments relating to a method, wherein the at least one longitudinal optical sensor, preferably the at least one focal longitudinal optical sensor, comprises at least one semiconductor detector.

Embodiment 73: The method according to the preceding embodiment, wherein the semiconductor detector is an organic semiconductor detector comprising at least one organic material.

Embodiment 74: The method according to any one of the two preceding embodiments, wherein the semiconductor detector is selected from the group consisting of an organic solar cell, a dye solar cell, a dye-sensitized solar cell, a solid dye solar cell, a solid dye-sensitized solar cell.

Embodiment 75: The method according to any one of the preceding embodiments relating to a method, wherein the at least one longitudinal optical sensor comprises at least one first electrode, at least one n-semiconducting metal oxide, at least one dye, at least one p-semiconducting organic material, preferably a solid p-semiconducting organic material, and at least one second electrode.

Embodiment 76: The method according to the preceding embodiment, wherein both the first electrode and the second electrode are transparent.

Embodiment 77: The method according to any one of the preceding embodiments relating to a method, wherein the at least one item of information on the longitudinal position of the object is generated by using at least one predefined relationship between a geometry of an illumination of the sensor region by the light beam and a relative positioning of the object with respect to the longitudinal optical sensor and/or a detector comprising the longitudinal optical sensor.

Embodiment 78: The method according to the preceding embodiment, wherein the predefined relationship between the geometry of the illumination of the sensor region by the light beam and the relative positioning of the object with respect to the longitudinal optical sensor and/or a detector comprising the longitudinal optical sensor is taking account of a known power of the illumination.

Embodiment 79: The method according to any one of the two preceding embodiments, wherein the predefined relationship between the geometry of the illumination of the sensor region by the light beam and the relative positioning of the object with respect to the longitudinal optical sensor and/or a detector comprising the longitudinal optical sensor is taking account of a modulation frequency with which the light beam is modulated.

Embodiment 80: A use of the detector according to any one of the preceding embodiments relating to a detector, for a purpose of use, selected from the group consisting of: a position measurement in traffic technology; an entertainment application; a security application; a safety application; a human-machine interface application; a tracking application; a photography application; an imaging application or camera application; a mapping application for generating maps of at least one space; a use in combination with at least one time-of-flight measurement; a positioning system, specifically a local or global positioning system; a communication system, specifically a visible communication system.

BRIEF DESCRIPTION OF THE FIGURES

Further optional details and features of the invention are evident from the description of preferred exemplary embodiments which follows in conjunction with the dependent claims. In this context, the particular features may be implemented alone or in any reasonable combination. The invention is not restricted to the exemplary embodiments. The exemplary embodiments are shown schematically in the figures. Identical reference numerals in the individual figures refer to identical elements or elements with identical function, or elements which correspond to one another with regard to their functions.

In the figures:

FIG. 1 B shows an exemplary embodiment of the detector according to the present invention;

FIG. 2 B shows longitudinal sensor signal curves for different focus positions normalized to a corresponding longitudinal sensor signal of the focal longitudinal optical sensor;

FIG. 2 C shows a magnification of an intersection range of FIG. 2B; and

EXEMPLARY EMBODIMENTS

Figure 1A:
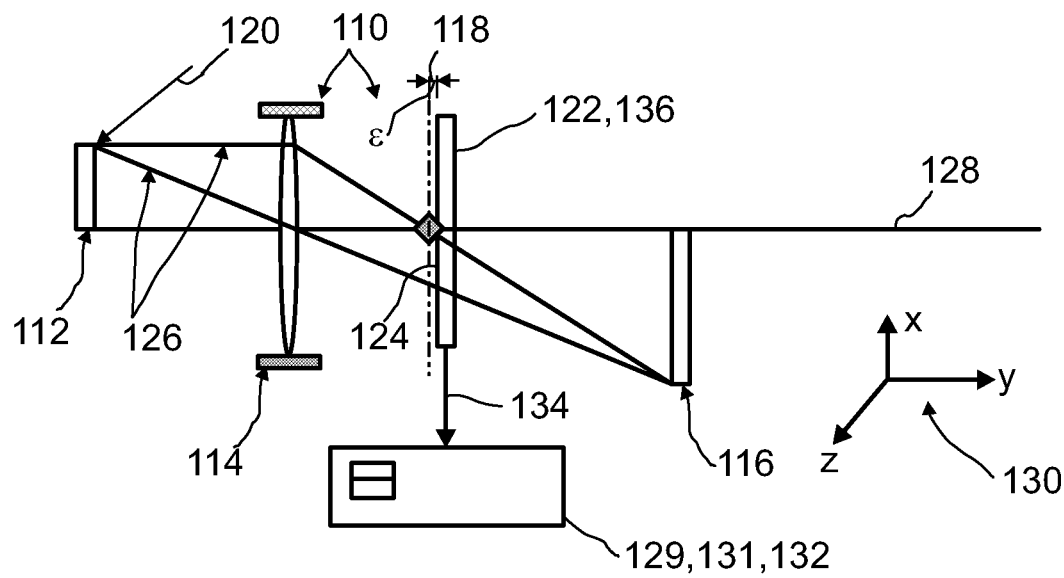
FIG. 1 A shows an exemplary embodiment of a detector according to the present invention.
Figure 1B:
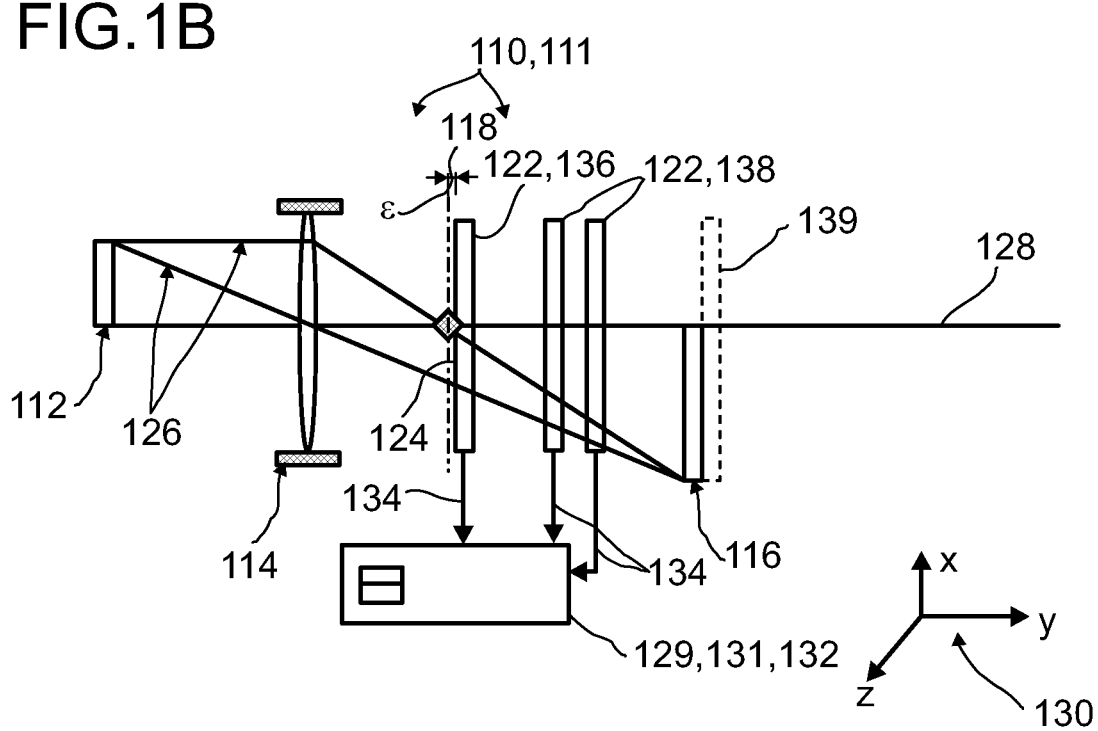

In FIG. 1 A, an exemplary embodiment of a detector 110 for determining a position of at least one object 112 is depicted. The detector 110 in this embodiment or other embodiments of the present invention, may be a stand-alone-detector or may be combined with one or more other detectors. As an example, the detector 110 may form a camera or may be part of a camera. Additionally or alternatively, the detector 110 may be part of a human-machine interface, an entertainment device or a tracking system. Other applications are feasible.

The detector 110 comprises at least one transfer device 114 for imaging the object into an image plane 116. The transfer device 114 has a focal plane 118. The transfer device 114 may have focusing or defocusing effects onto the light beam 126. The transfer device 114 may be realized as one or more of a focusing lens; a defocusing lens; a camera lens; a curved mirror; a diaphragm. In this embodiment, the transfer device 114 may be or may comprise a lens.

The object 112 may be illuminated by illumination light 120. The illumination light 120 may be ambient light from a natural and/or an artificial light source. Additionally or alternatively, the detector 110 may comprise at least one illumination source, for example a laser, in particular an IR laser diode, a light-emitting diode, an incandescent lamp, an organic light source, in particular an organic light-emitting diode. The illumination source may emit illumination light 120, which may illuminate the object 112. For example, the illumination source may be adapted to send out at least two light beams having differing optical properties, for example the at least two light beams may be modulated with different modulation frequencies.

Further, the detector 110 comprises at least one longitudinal optical sensor 122. The detector 110 may comprise one or more longitudinal optical sensors 122. The longitudinal optical sensor 122 has at least one sensor region 124. The longitudinal optical sensor 122 is at least partially transparent. The illuminated object 112 may reflect the impinging light. Thus, at least one light beam 126 may travel from the object 112 to the detector 110. The longitudinal optical sensor 122 is designed to generate at least one longitudinal sensor signal in a manner dependent on an illumination of the sensor region 124 by at least one light beam 126 traveling from the object 112 to the detector 110. The at least one longitudinal optical sensor 122 may be a FiP-sensor, as discussed above and as discussed in further detail e.g. in WO 2012/110924 A1. Thus, the longitudinal sensor signal, given the same total power of the illumination, is dependent on a beam cross-section of a light beam 126 in the sensor region 124.

An axis orthogonally to a surface of the longitudinal optical sensor 122 may define an optical axis 128. The optical axis 128 defines a longitudinal axis or z-axis, wherein a plane perpendicular to the optical axis 128 defines an x-y-plane. Thus, in FIG. 1 A, a coordinate system 130 is shown, which may be a coordinate system of the detector 110 and in which, fully or partially, at least one item of information regarding the position of the object 112 may be determined.

Further, the detector 110 comprises an evaluation device 129 designed to generate at least one item of information on a longitudinal position of the object 112 by evaluating the longitudinal sensor signal. The evaluation device 129 may contain one or more data processing devices 130 and/or one or more data memories 132. The evaluation device 129 may be adapted to perform a frequency analysis, in particular a Fourier analysis, of the longitudinal sensor signal. Thus, in case the detector comprises at least one illumination source, the illumination source may send out more than one light beam of illumination light, each light beam modulated with a different modulation frequency, the evaluation device 129 may be adapted to determine the signal components of the longitudinal sensor signal of each light beam. The evaluation device 129 may be connected to the longitudinal optical sensors 122 and if present the illumination source by one or more connectors 134. Further, the connector 134 may comprise one or more drivers and/or one or more measurement devices for generating sensor signals.

The longitudinal optical sensor 122 comprises a focal longitudinal optical sensor 136. The focal longitudinal optical sensor 126 at least substantially is arranged in the focal plane 118. The focal longitudinal optical sensor 136 may be spaced apart from the focal plane 118 by a distance ±ε, wherein $|\varepsilon| \leq 0.2 \cdot f$, with f being the focal length of the transfer device 114. In particular, $|\varepsilon| \leq 0.1 \cdot f$, preferably $|\varepsilon| \leq 0.05 \cdot f$, more preferably $|\varepsilon| \leq 0.02 \cdot f$, and most preferably $|\varepsilon| \leq 0.01 \cdot f$.

The components of the detector 110 may fully or partially be embodied in one or more housings. Thus, the longitudinal optical sensor 122, the transfer device 114 and if present the illumination source may be encased fully or partially within the same housing and/or may fully or partially be encased within separate housings. Further, the evaluation device 129 may fully or partially be integrated into the longitudinal optical sensors 122 and/or into the housing. Additionally or alternatively, the evaluation device 129 may fully or partially be designed as a separate, independent device.

In FIG. 1 B, in addition to the explanations given above with regard to FIG. 1A, another embodiment of the detector 110 is shown. In this embodiment, the detector 118 may comprise a plurality of longitudinal optical sensors 122, which are arranged in a sensor stack 138. The focal longitudinal optical sensor 136 may be arranged apart from the sensor stack 138 or may form part of the sensor stack 138. The stack 138 of longitudinal optical sensors 122 may comprise no more than three longitudinal optical sensors 122. The stack 138 may be composed of longitudinal optical sensors 122 being arranged such that the sensor regions 124 of the longitudinal optical sensors 122 are oriented essentially perpendicularly to an optical axis 128 of the detector 110. For further description of the detector 110 reference can be made to the description of the embodiment shown in FIG. 1 A.

As outlined above, the detector 110, specifically the stack 138, besides the longitudinal optical sensors 122, may comprise one or more additional elements. Thus, as an example, the detector 110, specifically the stack 138, may comprise one or more imaging devices. Thus, as an example, the detector 110 and/or the stack 138 may comprise one or more imaging devices, as symbolically depicted by reference number 139 in FIG. 1 B. The one or more optional imaging devices 139, as an example, may comprise one or more organic and/or one or more inorganic imaging devices such as pixelated imaging devices. As an example, one or more CMOS and/or CCD imaging devices such as CMOS and/or CCD camera chips may be used. Thus, the detector 110 by itself or in conjunction with one or more additional components may be embodied as a camera 111.

Figure 2A:
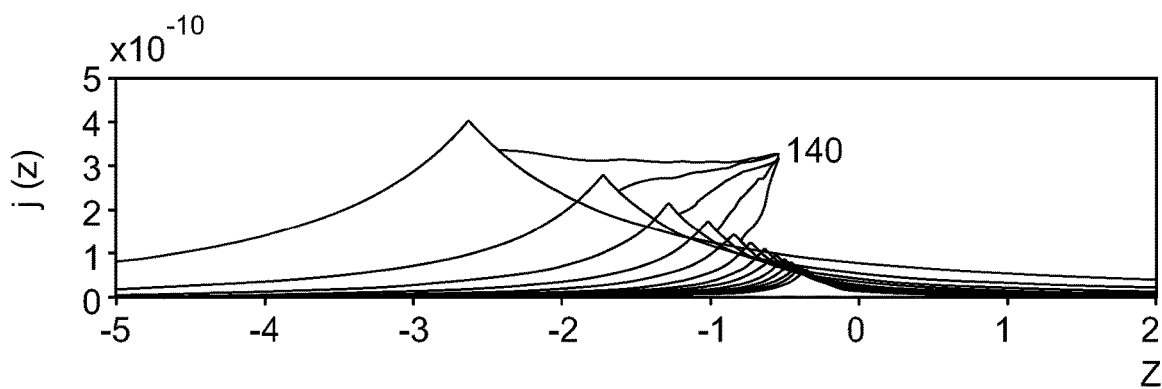
FIG. 2 A shows longitudinal sensor signal curves for different focus positions.

In FIG. 2A, longitudinal sensor signal curves j(z) for different focus positions $z_f$ as a function of z are shown. The curves have been calculated for classical ray optics for identical optical systems. As outlined above, the longitudinal optical sensor signal current may decrease with growing distance from the focus $z_f$. Further, as outlined above, two longitudinal optical sensor signal currents j (z, $z_f$) and j (z, $z'_f$) of the same object 112 at two different distances $z_f$ and $z'_f$ normalized to their focus current $j_{focal}$ ($z_1$), $j_{focal}$ ($z'_f$) respectively, may be considered. These curves, as outlined above, see equations (15) and (16), may intersect at $z=z_{cross}$ if $$\frac{j_{FiP}(z, z_f)}{j_{focus}(z_f)} = \frac{j_{FiP}(z, z'_f)}{j_{focus}(z'_f)}, \quad (15)$$

$$W_f^2(z, z_f) = W_f^2(z, z'_f). \quad (16)$$

As outlined above, see equations (17) and (18), for a Gaussian beam the equation simplifies to $$(z_{cross} - z_f)^2 = (z_{cross} - z'_f)^2 \quad (17)$$

$$z_{cross} = \frac{1}{2} \frac{z'^2_f - z^2_f}{z'_f - z_f}. \quad (18)$$

Figure 2B:
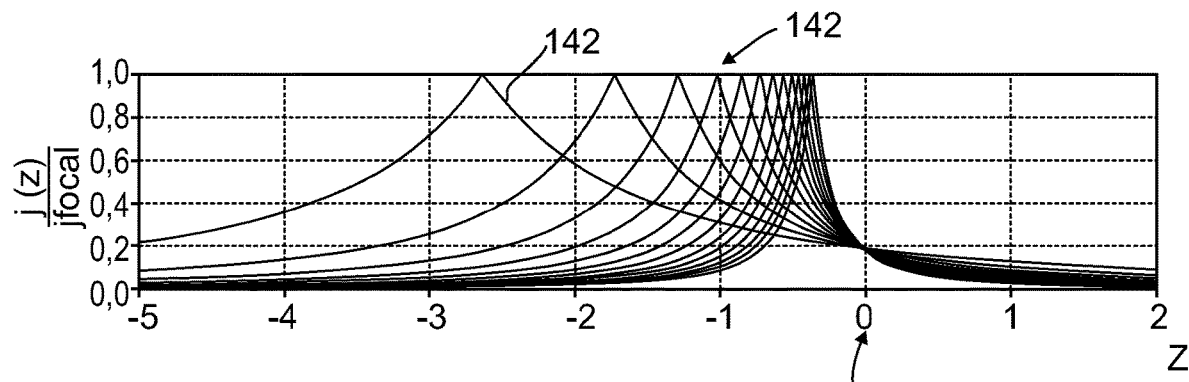
Figure 2C:
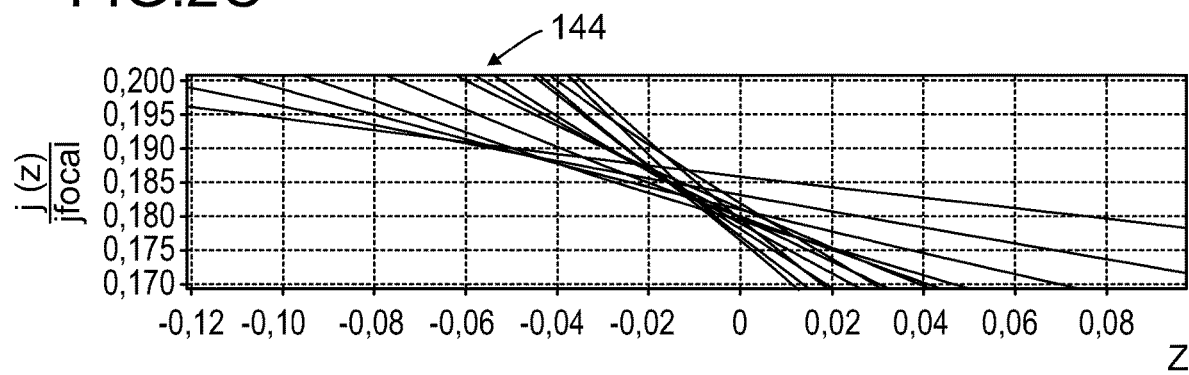

FIG. 2B shows curves 142 of the longitudinal optical sensor signal 140 for different focus positions normalized to a corresponding longitudinal sensor signal of the focal longitudinal optical sensor 136, wherein in FIG. 2C a magnification of an intersection region 144 is shown. Although theoretically the intersection of the curves 142 remains dependent on the focus position of each curve 142, astonishingly, it was found that for a given optical system, the differences in $z_{cross}$ for different focal lengths are small, and $z_{cross}$ falls into a region where the longitudinal optical sensor current is less z-dependent. Further, in general, a given optical system is limited to a certain optical range. Astonishingly, within a typical range of an optical system, a small z range or point close to the focus was found, where all normalized current curves 142 intersect. Thus, measuring the longitudinal optical sensor current at this position or within this intersection range may yield to the normalization of the curve, which is $j_{focal}$. As outlined above, the focal longitudinal optical sensor 136 may be spaced apart from the focal plane 118 by a distance ±ε, wherein |ε|≤0.2·f, with f being the focal length of the transfer device 114. For example, |ε|≤0.1·f, preferably |ε|≤0.05·f, more preferably |ε|≤0.02·f, and most preferably |ε|≤0.1·f. The at least one focal longitudinal optical sensor 136 may be arranged to the focal plane 118 such that the at least one focal longitudinal optical sensor 136 lies within the range or point where the curves 142 intersect.

The evaluation device 129 may be adapted to evaluate at least one longitudinal sensor signal $j_{focal}$ of the focal longitudinal optical sensor 136 and to derive a theoretical longitudinal sensor signal $j_{image}$ of a hypothetical longitudinal optical sensor in the image plane 116. The evaluation device 129 may be adapted to use, for determining the theoretical longitudinal sensor signal $j_{image}$, an assumption that the theoretical longitudinal sensor signal $j_{image}$ is proportional to the longitudinal sensor signal $j_{focal}$ of the focal longitudinal optical sensor 136. The evaluation on device 129, for determining the theoretical longitudinal sensor signal $j_{image}$, may be adapted to use the above-mentioned equation (19):

$$\frac{j_{image}}{j_{focal}} = const. \quad (19)$$

with const. being a predetermined or determinable constant. The evaluation device 129, for determining the theoretical longitudinal sensor signal $j_{image}$, may be adapted to use the above-mentioned equation (20):

$$\frac{j_{image}}{j_{focal}} = c(h_{target}, f_{lens}, l_{lens}) \quad (20)$$

with $c(h_{target}, f_{lens}, l_{lens})$ being a predetermined or determinable function dependent on the size $h_{target}$ of the object 112, the focal length $f_{lens}$ of the transfer device 114, and the aperture $l_{lens}$ of the transfer device 114. If the focal longitudinal optical sensor current $j_{focal}$ is determined and $c(h_{target}, f_{lens}, l_{lens})$ is known, the theoretical sensor signal $j_{image}$ can be determined. Thus, it may be avoided to place a longitudinal optical sensor 122 in or close to the image plane 116 to determine the sensor signal in the image plane 116. Further, it may be possible to reduce the amount of longitudinal optical sensors 122 necessary to resolve ambiguities.

Figure 3:
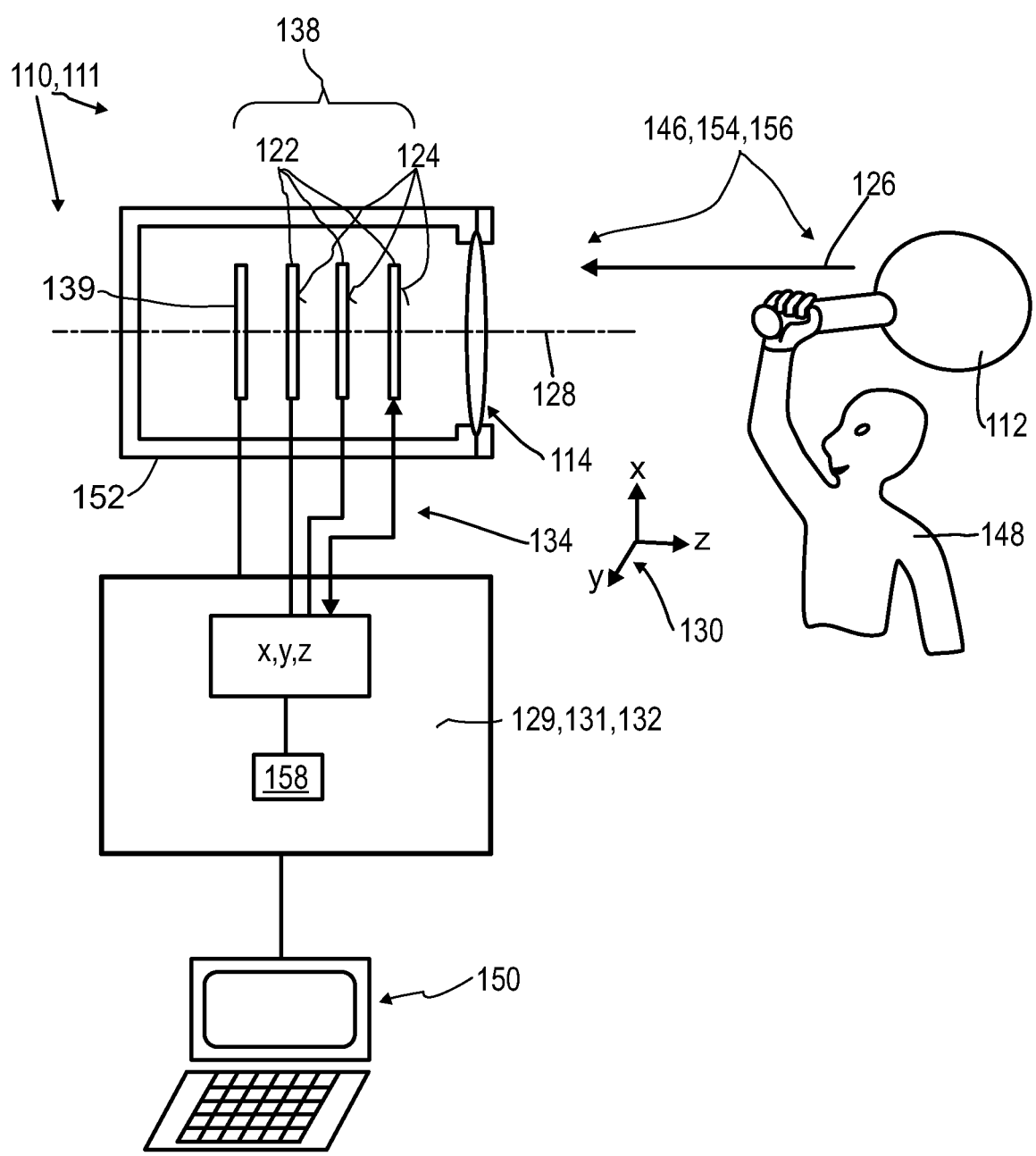
FIG. 3 shows an exemplary embodiment of the detector used in a human-machine interface, an entertainment device and a tracking system.

In FIG. 3, an exemplary embodiment of the detector 110 used in a human-machine interface 146 is shown. Again, optionally, the detector 110 may be embodied as a camera 111. The human-machine interface 146 comprises at least one detector 110. The human-machine interface 146 may be designed to generate at least one item of geometrical information of the user 148 by means of the detector 110. The human-machine interface 146 may be used to assign to the geometrical information at least one item of information, in particular at least one control command, in order to provide at least one item of information to a machine 150. In the embodiments schematically depicted in FIG. 3, the machine 150 may be a computer and/or may comprise a computer. Other embodiments are feasible. The evaluation device 129 may fully or partially be integrated into the machine 150, such as into the computer. As outlined above, the longitudinal optical sensor 122 and the transfer device 114 may be embodied within housing 152.

The human-machine interface 146 may form part of an entertainment device 154. The machine 150, specifically the computer, may also form part of the entertainment device 154. Thus, by means of the user 148 functioning as the object 112, the user 148 may input at least one item of information, such as at least one control command, into the computer, thereby varying an entertainment function, such as controlling the course of a computer game.

Further, a tracking system 156 for tracking the position of at least one movable object 112 is depicted. The tracking system 156 comprises the detector 110 and, further, at least one track controller 158. The track controller 158 may fully or partially form part of the computer of the machine 150. The track controller 158 is adapted to track a movement of the object 112 from a series of positions of the object 112 at specific points in time.

LIST OF REFERENCE NUMBERS

- 110 detector
- 111 camera
- 112 object
- 114 transfer device
- 116 image plane
- 118 focal plane
- 120 illumination light
- 122 longitudinal optical sensor
- 124 sensor region
- 126 light beam
- 128 optical axis
- 129 evaluation device
- 130 coordinate system
- 131 data processing device
- 132 data memories
- 134 connector
- 136 focal longitudinal optical sensor
- 138 sensor stack
- 139 Imaging device
- 140 curves of longitudinal sensor signal
- 142 curves
- 144 intersection region
- 146 human-machine interface
- 148 user
- 150 machine
- 152 housing
- 154 entertainment device
- 156 tracking system
- 158 track controller

The invention claimed is:

1. A detector for determining a position of at least one object, the detector comprising:
   at least one transfer device for imaging the object into an image plane, the transfer device having a focal plane,
   at least one longitudinal optical sensor, wherein the longitudinal optical sensor has at least one sensor region, wherein the longitudinal optical sensor is at least partially transparent, wherein the longitudinal optical sensor is designed to generate at least one longitudinal sensor signal in a manner dependent on an illumination of the sensor region by at least one light beam propagating from the object to the detector, wherein the longitudinal sensor signal, given the same total power of the illumination, is dependent on a beam cross-section of the light beam in the sensor region; and
   at least one evaluation device, wherein the evaluation device is designed to generate at least one item of information on a longitudinal position of the object by evaluating the longitudinal sensor signal,
   wherein the at least one longitudinal optical sensor comprises a focal longitudinal optical sensor, wherein the focal longitudinal optical sensor at least substantially is arranged in the focal plane, and
   wherein the focal longitudinal optical sensor is spaced apart from the focal plane by a distance $\pm \varepsilon$, wherein $|\varepsilon| \leq 0.2 \cdot f$, with f being the focal length of the transfer device.

2. The detector according to claim 1, wherein the evaluation device is adapted to evaluate at least one longitudinal sensor signal $j_{focal}$ of the focal longitudinal optical sensor and to derive a theoretical longitudinal sensor signal $j_{image}$ of a hypothetical longitudinal optical sensor in the image plane.

3. The detector according to claim 2, wherein the evaluation device is adapted to use, for determining the theoretical longitudinal sensor signal $j_{image}$, a predetermined or determinable relationship between the longitudinal sensor signal $j_{focal}$ of the focal longitudinal optical sensor and the theoretical longitudinal sensor signal $j_{image}$.

4. The detector according to claim 2, wherein the evaluation device is adapted to use, for determining the theoretical longitudinal sensor signal $j_{image}$, an assumption that the theoretical longitudinal sensor signal $j_{image}$ is proportional to the longitudinal sensor signal $j_{focal}$ of the focal longitudinal optical sensor.

5. The detector according to claim 4, wherein the evaluation device, for determining the theoretical longitudinal sensor signal $j_{image}$, is adapted to use the following relationship:

$$\frac{j_{image}}{j_{focal}} = const.,$$

with const. being a predetermined or determinable constant.

6. The detector according to claim 4, wherein the evaluation device, for determining the theoretical longitudinal sensor signal $j_{image}$, is adapted to use the following relationship:

$$\frac{j_{image}}{j_{focal}} = c(h_{target}, f_{lens}, l_{lens}),$$

with $c(h_{target}, f_{lens}, l_{lens})$ being a predetermined or determinable function dependent on the size $h_{target}$ of the object, the focal length $f_{lens}$ of the transfer device, and the aperture $l_{lens}$ of the transfer device.

7. The detector according to claim 1, wherein the at least one longitudinal optical sensor, besides the focal longitudinal optical sensor, comprises at least one further longitudinal optical sensor.

8. The detector according to claim 7, wherein the at least one longitudinal optical sensor comprises a stack of longitudinal optical sensors.

9. The detector according to claim 8, wherein the focal longitudinal optical sensor forms part of the stack of longitudinal optical sensors.

10. The detector according to claim 8, wherein the stack of longitudinal optical sensors comprises no more than three longitudinal optical sensors.

11. The detector according to claim 1, wherein the at least one longitudinal optical sensor comprises at least one semiconductor detector, wherein the semiconductor detector is an organic semiconductor detector comprising at least one organic material.

12. The detector according to claim 11, wherein the semiconductor detector is at least one member selected from the group consisting of an organic solar cell, a dye solar cell, a dye-sensitized solar cell, a solid dye solar cell, and a solid dye-sensitized solar cell.

13. The detector according to claim 1, wherein the at least one longitudinal optical sensor comprises at least one first electrode, at least one n-semiconducting metal oxide, at least one dye, at least one p-semiconducting organic material, and at least one second electrode.

14. A human-machine interface for exchanging at least one item of information between a user and a machine, wherein the human-machine interface comprises at least one detector according to claim 1, wherein the human-machine interface is designed to generate at least one item of geometrical information of the user with the detector, wherein the human-machine interface is designed to assign to the geometrical information at least one item of information.

15. An entertainment device for carrying out at least one entertainment function, wherein the entertainment device comprises at least one human-machine interface according to claim 14, wherein the entertainment device is designed to enable at least one item of information to be input by a player with the human-machine interface, wherein the entertainment device is designed to vary the entertainment function in accordance with the information.

16. A tracking system for tracking a position of at least one movable object, the tracking system comprising a detector according to claim 1, the tracking system further comprising at least one track controller, wherein the track controller (158) is adapted to track a series of positions of the object at specific points in time.

17. A camera for imaging at least one object, the camera comprising at least one detector according to claim 1.

18. A method for determining a position of at least one object, the method comprising:
    imaging the object into an image plane by using at least one transfer device, the transfer device having a focal plane,
    providing at least one longitudinal optical sensor, wherein the longitudinal optical sensor has at least one sensor region, wherein the longitudinal optical sensor is at least partially transparent, and generating at least one longitudinal sensor signal by using the at least one longitudinal optical sensor, wherein the at least one longitudinal sensor signal is dependent on an illumination of the sensor region by at least one light beam propagating from the object to the longitudinal optical sensor, wherein the longitudinal sensor signal, given the same total power of the illumination, is dependent on a beam cross-section of the light beam in the sensor region, and
    generating at least one item of information on a longitudinal position of the object by evaluating the longitudinal sensor signal,
    wherein the at least one longitudinal optical sensor comprises a focal longitudinal optical sensor, wherein the focal longitudinal optical sensor at least substantially is arranged in the focal plane, and
    wherein the focal longitudinal optical sensor is spaced apart from the focal plane by a distance ±ε, wherein |ε|≤0.2·f, with f being the focal length of the transfer device.

19. The method according to claim 18, wherein said imaging is carried out with a detector, the detector comprising:
    at least one transfer device for imaging the object into an image plane, the transfer device having a focal plane,
    at least one longitudinal optical sensor, wherein the longitudinal optical sensor has at least one sensor region, wherein the longitudinal optical sensor is at least partially transparent, wherein the longitudinal optical sensor is designed to generate at least one longitudinal sensor signal in a manner dependent on an illumination of the sensor region by at least one light beam propagating from the object to the detector, wherein the longitudinal sensor signal, given the same total power of the illumination, is dependent on a beam cross-section of the light beam in the sensor region; and
    at least one evaluation device, wherein the evaluation device is designed to generate at least one item of information on a longitudinal position of the object by evaluating the longitudinal sensor signal,
    wherein the at least one longitudinal optical sensor comprises a focal longitudinal optical sensor, wherein the focal longitudinal optical sensor at least substantially is arranged in the focal plane.

20. The method according to claim 18, the method further comprising evaluating at least one longitudinal sensor signal $j_{focal}$ of the focal longitudinal optical sensor and to derive a theoretical longitudinal sensor signal $j_{image}$ of a hypothetical longitudinal optical sensor in the image plane.

21. The method according to claim 20, wherein, for determining the theoretical longitudinal sensor signal $j_{image}$, a predetermined or determinable relationship between the longitudinal sensor signal $j_{focal}$ of the focal longitudinal optical sensor and the theoretical longitudinal sensor signal $j_{image}$ is used.

22. The method according to claim 20, wherein, for determining the theoretical longitudinal sensor signal $j_{image}$, an assumption that the theoretical longitudinal sensor signal $j_{image}$ is proportional to the longitudinal sensor signal $j_{focal}$ of the focal longitudinal optical sensor (136) is used.

23. The method according to claim 22, wherein, for determining the theoretical longitudinal sensor signal $j_{image}$, the following relationship is used:

$$\frac{j_{image}}{j_{focal}} = const.,$$

with const. being a predetermined or determinable constant.

24. The method according to claim 22, wherein, for determining the theoretical longitudinal sensor signal $j_{image}$, the following relationship is used:

$$\frac{j_{image}}{j_{focal}} = c(h_{target}, f_{lens}, l_{lens}),$$

with $c(h_{target}, f_{lens}, l_{lens})$ being a predetermined or determinable function dependent on the size $h_{target}$ of the object, the focal length $f_{lens}$ of the transfer device, and the aperture $l_{lens}$ of the transfer device.

25. The method according to claim 18, wherein the at least one longitudinal optical sensor, besides the focal longitudinal optical sensor, comprises at least one further longitudinal optical sensor.

26. The method according to claim 25, wherein the at least one longitudinal optical sensor comprises a stack of longitudinal optical sensors.

27. The method according to claim 26, wherein the focal longitudinal optical sensor forms part of the stack of longitudinal optical sensors.

28. The method according to claim 26, wherein the stack of longitudinal optical sensors comprises no more than three longitudinal optical sensors.

29. A method of determining a longitudinal position of an object in a field, the method comprising detecting the longitudinal position of the object with a detector according to claim 1,
   wherein the field is at least one of a position measurement in traffic technology; an entertainment application; a security application; a safety application; a human-machine interface application; a tracking application; a photography application; an imaging application or camera application; a mapping application for generating maps of at least one space; a use in combination with at least one time-of-flight measurement; a positioning system; and a communication system.

30. The human-machine interface of claim 14, wherein the human-machine interface is designed to assign to the geometrical information at least one control command.

* * * * *